(12) United States Patent
Ogaki et al.

(10) Patent No.: US 6,991,881 B2
(45) Date of Patent: Jan. 31, 2006

(54) ELECTROPHOTOGRAPHIC PHOTOSENSITIVE MEMBER, PROCESS CARTRIDGE, AND ELECTROPHOTOGRAPHIC APPARATUS

(75) Inventors: Harunobu Ogaki, Shizuoka (JP);
Akira Yoshida, Kanagawa (JP);
Takakazu Tanaka, Shizuoka (JP);
Itaru Takaya, Kanagawa (JP); Yuka Ishiduka, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/422,733

(22) Filed: Apr. 25, 2003

(65) Prior Publication Data

US 2003/0232263 A1 Dec. 18, 2003

(30) Foreign Application Priority Data

| Apr. 26, 2002 | (JP) | ...... 2002-125214 |
| May 30, 2002 | (JP) | ...... 2002-157528 |
| May 31, 2002 | (JP) | ...... 2002-158848 |

(51) Int. Cl.
*G03G 5/05* (2006.01)

(52) U.S. Cl. ............ 430/73; 430/72; 430/74; 430/75; 430/56; 430/96; 430/58.7

(58) Field of Classification Search ........... 430/58.7, 430/96, 56, 75, 72, 73, 74
See application file for complete search history.

(56) References Cited

U.S. PATENT DOCUMENTS

| 4,025,341 A | 5/1977 | Rule ............... 96/1.6 |
| 4,806,443 A | 2/1989 | Yanus et al. ............ 430/56 |
| 5,116,708 A | 5/1992 | Shikatani et al. ........ 430/59 |
| 5,654,119 A | 8/1997 | Ishii et al. ............ 430/59 |
| 5,804,343 A | 9/1998 | Umeda et al. .......... 430/59 |
| 2002/0048710 A1 | 4/2002 | Tanaka et al. .......... 430/58.8 |
| 2004/0048179 A1 | 3/2004 | Tanaka et al. .......... 430/58.7 |

FOREIGN PATENT DOCUMENTS

| EP | 0052961 | 6/1982 |
| EP | 0295126 | 12/1988 |
| EP | 0372979 | 6/1990 |
| EP | 0699654 | 3/1996 |
| EP | WO 98/06773 | 2/1998 |
| JP | 2-282263 | 11/1990 |
| JP | 3-221522 | 9/1991 |
| JP | 8-208820 | 8/1996 |
| WO | WO 99/32537 | 7/1999 |

OTHER PUBLICATIONS

Diamond, Arthur S et al. (editors) Handbook of Imaging Materials, $2^{nd}$ edition. New York: Marcel–Dekker, Inc. (Nov. 29, 2001) pp 145–164.*
Borsenberger, Paul M et al. Organic Photoreceptors for Imaging Systems. New York: Marcel–Dekker, Inc. (1993) pp. 289–292.*
Database WPI, Section Ch, Week 1995/05, Derwent Publications, AN1999–51667, XP 002276172 for JP 10–302963.

* cited by examiner

*Primary Examiner*—Christopher Rodee
(74) *Attorney, Agent, or Firm*—Fitzpatrick, Cella, Harper & Scinto

(57) ABSTRACT

The present invention relates to an electrophotographic photosensitive member having a support and provided thereon a photosensitive layer. The photosensitive layer contains a high-molecular weight charge-transporting material having a specific repeating structural unit. The high-molecular weight charge-transporting material has a weight-average molecular weight Mw of 1,500 or more and an energy level of highest occupied molecular orbital, $E_{HOMO}$, of from −8.3 eV or more to −8.0 eV or less as found by semiempirical molecular-orbital calculation. The present invention also relates to a process cartridge and an electrophotographic apparatus which have such an electrophotographic photosensitive member.

13 Claims, 1 Drawing Sheet

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

1. Field of the Invention

This invention relates to an electrophotographic photosensitive member, a process cartridge and an electrophotographic apparatus. More particularly, it relates to an electrophotographic photosensitive member having a support and provided thereon a photosensitive layer, which photosensitive layer contains a specific high-molecular weight charge-transporting material; and a process cartridge and an electrophotographic apparatus which have such an electrophotographic photosensitive member.

2. Related Background Art

Electrophotographic techniques are in wide use and application in the field of copying machines and also printers because of their advantages that images can be formed in real time and high-quality images can be obtained.

Electrophotographic photosensitive members may be given as one of typical image-holding members used in electrophotographic apparatus. Photoconductive materials used in the electrophotographic photosensitive members include inorganic photoconductive materials such as selenium, cadmium sulfide and zinc oxide. In recent years, however, organic photoconductive materials are on energetic research and development because of their advantages that, e.g., they are free from environmental pollution, promise high productivity and have readiness and future for material designing.

As a matter of course, the electrophotographic photosensitive members are required to have various properties such as electrical, mechanical and also optical properties according to electrophotographic processes to be applied. In particular, electrical and mechanical force such as charging, exposure, development, transfer and cleaning are directly or indirectly repeatedly applied to electrophotographic photosensitive members being used repeatedly. Hence, they are required to have durabilities to these.

In organic electrophotographic photosensitive members making use of organic photoconductive materials, it is usual for the organic photoconductive materials to be dissolved or dispersed in binder resins and used in the form of coating films. To form the coating films, organic photoconductive materials and binder resins are dissolved or dispersed in solvents, followed by coating and then drying.

As the binder resins, materials such as vinyl polymers such as polymethyl methacrylate, polystyrene and polyvinyl chloride, as well as polycarbonate, polyester, polyarylate, polysulfone, phenoxy resins, epoxy resins, silicone resins and copolymers of these are used.

The organic electrophotographic photosensitive members have many advantages that they have superior mass productivity and, in respect of cost, can be manufactured at a relatively low cost. It, however, is not the case that they have satisfied all requirements that are called for as electrophotographic photosensitive members.

With regard to functionality and performance as electrophotography, electrophotographic photosensitive members superior to inorganic electrophotographic photosensitive members have come to be manufactured. However, it is desired to make further improvement in respect of other performance, in particular, what concerns the durability (running performance) in the organic electrophotographic photosensitive members.

As one method of improving the running performance of organic electrophotographic photosensitive members, it is proposed to use various binder resins having superior mechanical strength. However, even though binder resins themselves have superior mechanical strength, they are used in the state a low-molecular weight charge-transporting material is mixed, and hence, the film strength inherent in the binder resins can not sufficiently be brought out. Thus, satisfactory durability (running performance) has not necessarily been achieved in respect of resistance to wear and resistance to scratching.

To make the most of the film strength inherent in the binder resins, the charge-transporting material to be added may be used in a smaller quantity. In such a case, however, a problem may arise such that electrophotographic sensitivity lowers or residual potential rises. Thus, it has not come to achievement of both the film strength and the electrophotographic performance.

For the purpose of preventing film strength from lowering due to the addition of such a low-molecular weight charge-transporting material, the use of high-molecular weight charge-transporting materials is proposed as disclosed in Japanese Patent Applications Laid-open No. 64-9964, No. 2-282263, No. 3-221522, No. 8-208820 and so forth.

However, a great deal of these are not necessarily those having sufficient resistance to wear. Even where they have film strength to a certain extent, there have been disadvantages such that they require too high production cost to be suited for practical use.

From the viewpoint of the resistance to wear of electrophotographic photosensitive members and the cost for their production, these high-molecular weight charge-transporting materials may be used in combination with insulating resins. In such a case, binder resins and high-molecular weight charge-transporting materials may have poor compatibility with each other to make it impossible to produce electrophotographic photosensitive members which can provide good image quality, or to make poor the resistance to wear.

As a high-molecular weight charge-transporting material of a different type, a high-molecular weight charge-transporting material having a repeating structural unit of triphenylamine is proposed (International Publication No. WO99/32537). The high-molecular weight charge-transporting material having this structure has so good compatibility with insulating resins that it has high mechanical strength and high mobility.

Improvement in running performance of an electrophotographic photosensitive member makes it also necessary to provide properties which are stable even in using the electrophotographic photosensitive member repeatedly over a long period of time, where, as a charge-transporting material, it is required to have properties that can not easily cause deterioration, in particular, oxidation deterioration caused by ozone, active oxygen or the like when the electrophotographic photosensitive member is charged electrostatically.

However, while the high-molecular weight charge-transporting material disclosed in the above publication (WO99/32537) has high mechanical strength, it has tended to cause the oxidation deterioration to make properties vary in repeated use in some cases.

SUMMARY OF THE INVENTION

Accordingly, an object of the present invention is to provide an electrophotographic photosensitive member having high mechanical strength and also having stable properties in repeated use. More specifically, what is aimed is to achieve longer lifetime as the electrophotographic photosensitive member and attain stable properties even in repeated use, by incorporating in the photosensitive layer of the electrophotographic photosensitive member a high-molecular weight charge-transporting material which can not easily cause any deterioration even in use over a long period of time and has high stability in electrophotographic performance.

Another object of the present invention is to provide a process cartridge and an electrophotographic apparatus which have such an electrophotographic photosensitive member.

As a result of extensive studies to solve the above problems, the present inventors have accomplished the present invention.

That is, the present invention provides an electrophotographic photosensitive member comprising a support and provided thereon a photosensitive layer, wherein;

the photosensitive layer contains a high-molecular weight charge-transporting material having a repeating structural unit represented by the following formula (1); and the high-molecular weight charge-transporting material has:

a weight-average molecular weight Mw of 1,500 or more; and an energy level of highest occupied molecular orbital, $E_{HOMO}$, of from −8.3 eV or more to −8.0 eV or less as found by semiempirical molecular-orbital calculation.

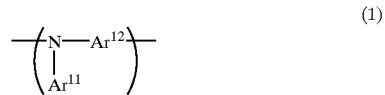
(1)

In the formula (1), $Ar^{11}$ represents a substituted or unsubstituted monovalent aromatic ring group or a substituted or unsubstituted monovalent heterocyclic ring group. $Ar^{12}$ represents a divalent group having a structure selected from the group consisting of structures represented by the following formulas (2), (2)' and (2)".

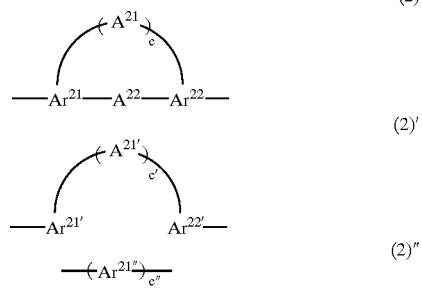

In the formula (2), $Ar^{21}$ and $Ar^{22}$ each independently represent a substituted or unsubstituted trivalent aromatic ring group or a substituted or unsubstituted trivalent heterocyclic ring group. $A^{21}$ and $A^{22}$ each independently represent a single bond, or a Group 14 element having a hydrogen atom, a substituted or unsubstituted alkyl group, a substituted or unsubstituted aryl group, a substituted or unsubstituted alkoxyl group or an electron-attracting group, or a Group 15 element having a hydrogen atom, a substituted or unsubstituted alkyl group, a substituted or unsubstituted aryl group or an electron-attracting group, or a Group 16 element. Letter symbol c represents 0 or 1 and, when c is 0, it represents that $Ar^{21}$ and $Ar^{22}$ stand combined directly.

In the formula (2)', $Ar^{21'}$ and $Ar^{22'}$ each independently represent a substituted or unsubstituted divalent aromatic ring group or a substituted or unsubstituted divalent heterocyclic ring group. $A^{21'}$ represents a Group 14 element having a hydrogen atom, a substituted or unsubstituted alkyl group, a substituted or unsubstituted aryl group, a substituted or unsubstituted alkoxyl group or an electron-attracting group, or a Group 15 element having a hydrogen atom, a substituted or unsubstituted alkyl group, a substituted or unsubstituted aryl group or an electron-attracting group, or a Group 16 element. Letter symbol c' represents 0 or 1 and, when c' is 0, it represents that $Ar^{21'}$ and $Ar^{22'}$ stand combined directly.

In the formula (2)", $Ar^{21''}$ represents a substituted or unsubstituted divalent aromatic ring group or a substituted or unsubstituted divalent heterocyclic ring group. Letter symbol c" represents an integer of 1 or more, provided that, when c" is two or more, the two or more $Ar^{21''}$'s may be the same or different.

The present invention also provides a process cartridge and an electrophotographic apparatus which have the above electrophotographic photosensitive member.

BRIEF DESCRIPTION OF THE DRAWING

FIGURE schematically illustrates an example of the construction of an electrophotographic apparatus having the electrophotographic photosensitive member of the present invention.

DETAILED DESCRIPTION OF THE PREFERRED EMBODIMENTS

Figure 1:
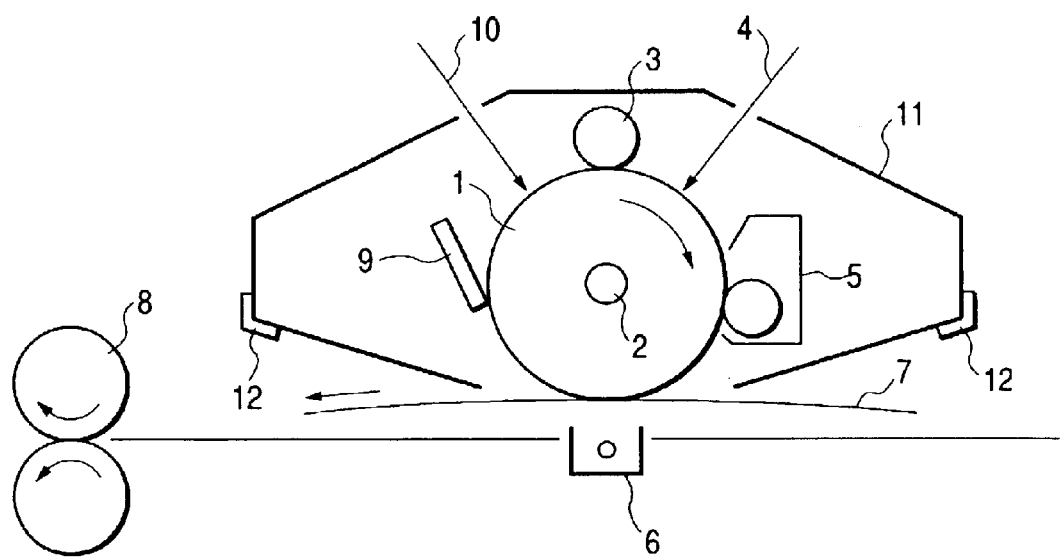

The electrophotographic photosensitive member of the present invention comprises a support and provided thereon a photosensitive layer, and the photosensitive layer contains a high-molecular weight charge-transporting material having a repeating structural unit represented by the above formula (1).

The high-molecular weight charge-transporting material has a weight-average molecular weight (Mw) of 1,500 or more, and an energy level of highest occupied molecular orbital, of from −8.3 eV or more to −8.0 eV or less (i.e., from −8.3 eV to −8.0 eV) as found by semiempirical molecular-orbital calculation.

In the present invention, as defined above, the energy level of highest occupied molecular orbital, $E_{HOMO}$, is found by semiempirical molecular-orbital calculation.

In the present invention, the "semiempirical molecular-orbital calculation" is meant to be "structure optimization calculation making use of semiempirical molecular-orbital calculation made using PM3 parameter".

In the molecular-orbital method, a wave function used in the Schroedinger's equation is approximated by the Slater type matricial equation or Gauss type matricial equation consisting of a molecular orbital expressed as a linear combination of atomic orbitals, and the molecular orbital constituting the wave function is found by the use of approximation of field, whereby various physical quantities can be calculated as the wave function or as expected values of the wave function.

It is the semiempirical molecular-orbital method that, when the molecular orbital is found by the approximation of field, in respect of the calculation of function that takes a time, the time for calculation is shortened by making approximation by the use of parameter making use of various experimental values.

In the calculation made in the present invention, the number of atoms to be calculated is large because the object on which the calculation is to be made is a high-molecular weight material, and hence the semiempirical molecular-orbital method is employed, by which the time for calculation can be shortened. A PM3 parameter set is used as semiempirical parameter, and the calculation is made using a semiempirical molecular-orbital calculation program MOPAC.

In this way, the energy level of highest occupied molecular orbital ($E_{HOMO}$) of the high-molecular weight charge-transporting material is found by the semiempirical molecular-orbital calculation program.

In the high-molecular weight charge-transporting material according to the present invention, the monovalent aromatic ring group represented by $Ar^{11}$ in the above formula (1) may include a phenyl group and a naphthyl group; and the monovalent heterocyclic ring group may include a pyridyl group, a bipyridyl group, a tripyridyl group, a furanyl group, a thiophenyl group, a benzofuranyl group, a benzothiophenyl group, a dibenzofuranyl group and a dibenzothiophenyl group.

Of these, as the aromatic ring group, a phenyl group is preferred, and as the heterocyclic ring group, a pyridyl group, a benzofuranyl group, a benzothiophenyl group, a dibenzofuranyl group and a dibenzothiophenyl group are preferred.

The substituent the substituted aromatic ring group and heterocyclic ring group of these may have, may include a hydrogen atom, an alkyl group having 1 to 8 carbon atoms, an aryl group having 6 to 12 carbon atoms, an alkoxyl group having 1 to 8 carbon atoms, an aryl ether group, an aryl thioether group, a N-(alkyl)$_2$ group, a N-(aryl)$_2$ group, a halogen atom, a fluoroalkyl group, a fluoroaryl group, a cyano group and a nitro group. Of these, a hydrogen atom, a methyl group, an ethyl group, a propyl group, a phenyl group, a methoxyl group, an ethoxyl group, a fluorine atom, a chlorine atom, a bromine atom, a trifluoromethyl group and a fluorophenyl group are preferred.

The trivalent aromatic ring group represented by $Ar^{21}$ and $Ar^{22}$ in the above formula (2) may include a phenyl group and a naphthyl group; and the trivalent heterocyclic ring group may include a pyridyl group. Of these, a phenyl group is preferred.

The substituent the substituted aromatic ring group and heterocyclic ring group of these may have may include a hydrogen atom, an alkyl group having 1 to 8 carbon atoms, an aryl group having 6 to 12 carbon atoms, an alkoxyl group having 1 to 8 carbon atoms, a halogen atom, a fluoroalkyl group, a fluoroaryl group, a cyano group and a nitro group. Of these, a hydrogen atom, a methyl group, an ethyl group, a propyl group, a phenyl group, a methoxyl group, an ethoxyl group, a fluorine atom, a chlorine atom, a bromine atom, a trifluoromethyl group and a fluorophenyl group are preferred.

The Group 14 element represented by $Ar^{21}$ and $Ar^{22}$ in the above formula (2) may include carbon, silicon, germanium and tin. Of these, carbon and silicon are preferred.

Of the substituents this Group 14 element has, the alkyl group may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a trifluoromethyl group and a fluorophenyl group. Of these, a methyl group, an ethyl group, a phenyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group, a phenyl group and a fluorine atom are preferred.

The Group 15 element represented by $Ar^{21}$ and $Ar^{22}$ in the above formula (2) may include nitrogen and phosphorus. Of these, nitrogen is preferred.

Of the substituents this Group 15 element has, the alkyl group may include a methyl group, an ethyl group and a propyl group, the aryl group may include a phenyl group and a naphthyl group, and the electron-attracting group may include a trifluoromethyl group and a fluorophenyl group. Of these, a methyl group, an ethyl group, a phenyl group and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 16 element represented by $Ar^{21}$ and $Ar^{22}$ in the above formula (2) may include oxygen, sulfur, selenium and tellurium. Of these, oxygen and sulfur are preferred.

The divalent aromatic ring group represented by $Ar^{21'}$ and $Ar^{22'}$ in the above formula (2)' may include a phenyl group and a naphthyl group; and the divalent heterocyclic ring group may include a pyridyl group. Of these, a phenyl group is preferred.

The substituent the substituted aromatic ring group and heterocyclic ring group of these may have may include a hydrogen atom, an alkyl group having 1 to 8 carbon atoms, an aryl group having 6 to 12 carbon atoms, an alkoxyl group having 1 to 8 carbon atoms, a halogen atom, a fluoroalkyl group, a fluoroaryl group, a cyano group and a nitro group. Of these, a hydrogen atom, a methyl group, an ethyl group, a propyl group, a phenyl group, a methoxyl group, an ethoxyl group, a fluorine atom, a chlorine atom, a bromine atom, a trifluoromethyl group and a fluorophenyl group are preferred.

The Group 14 element represented by $Ar^{21'}$ in the above formula (2) may include carbon, silicon, germanium and tin. Of these, carbon and silicon are preferred.

Of the substituents this Group 14 element has, the alkyl group may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a trifluoromethyl group and a fluorophenyl group. Of these, a methyl group, an ethyl group, a phenyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 15 element represented by $Ar^{21'}$ in the above formula (2) may include nitrogen and phosphorus. Of these, nitrogen is preferred.

Of the substituents this Group 15 element has, the alkyl group may include a methyl group, an ethyl group and a propyl group, the aryl group may include a phenyl group and a naphthyl group, and the electron-attracting group may include a trifluoromethyl group and a fluorophenyl group. Of these, a methyl group, an ethyl group, a phenyl group and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 16 element represented by $Ar^{21'}$ and $Ar^{22'}$ in the above formula (2)' may include oxygen, sulfur, selenium and tellurium. Of these, oxygen and sulfur are preferred.

The divalent aromatic ring group represented by $Ar^{21''}$ in the above formula (2)" may include a phenyl group and a naphthyl group; and the divalent heterocyclic ring group may include a pyridyl group. Of these, a phenyl group and a pyridyl group are preferred.

The substituent the substituted aromatic ring group and heterocyclic ring group of these may have may include a hydrogen atom, an alkyl group having 1 to 8 carbon atoms, an aryl group having 6 to 12 carbon atoms, an alkoxyl group having 1 to 8 carbon atoms, a halogen atom, a fluoroalkyl group, a fluoroaryl group, a cyano group and a nitro group. Of these, a hydrogen atom, a methyl group, an ethyl group, a propyl group, a phenyl group, a methoxyl group, an ethoxyl group, a fluorine atom, a chlorine atom, a bromine atom, a trifluoromethyl group and a fluorophenyl group are preferred.

The above high-molecular weight charge-transporting material may preferably have a repeating structural unit represented by the following formula (11).

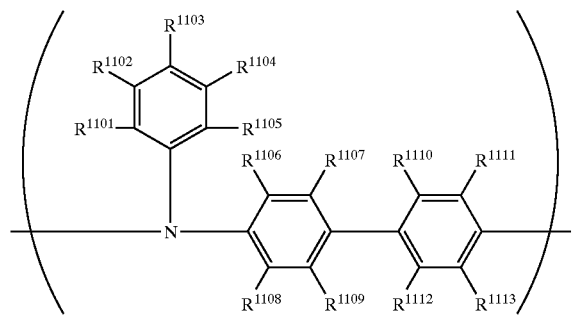

(11)

In the above formula (11), $R^{1101}$ to $R^{1113}$, each independently represent a hydrogen atom, a substituted or unsubstituted alkyl group, a substituted or unsubstituted aryl group, a substituted or unsubstituted alkoxyl group or an electron-attracting group; provided that at least one of $R^{1101}$ to $R^{1113}$ is the electron-attracting group.

The alkyl group represented by $R^{1101}$ to $R^{1113}$ in the above formula (11) may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group and, as the electron-attracting group, a fluorine atom, a trifluoromethyl group and a fluorophenyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The high-molecular weight charge-transporting material having the repeating structural unit represented by the above formula (11) may more preferably also have a repeating structural unit represented by the following formula (12).

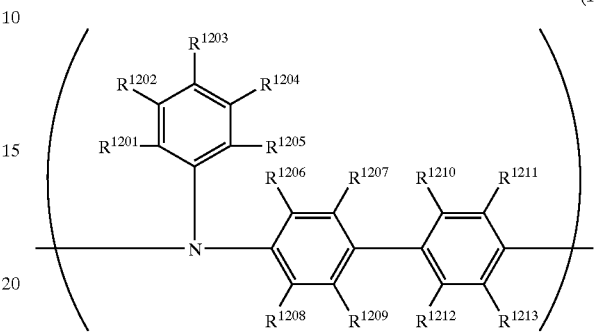

(12)

In the above formula (12), $R^{1201}$ to $R^{1213}$ each independently represent a hydrogen atom, a substituted or unsubstituted alkyl group, a substituted or unsubstituted aryl group, a substituted or unsubstituted alkoxyl group or an electron-attracting group; provided that a case or cases in which the units represented by the formulas (11) and (12) have the same structure is/are excluded.

The alkyl group represented by $R^{1201}$ to $R^{1213}$ in the above formula (12) may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group and, as the electron-attracting group, a fluorine atom, a trifluoromethyl group and a fluorophenyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The above high-molecular weight charge-transporting material may also preferably have a repeating structural unit represented by the following formula (21).

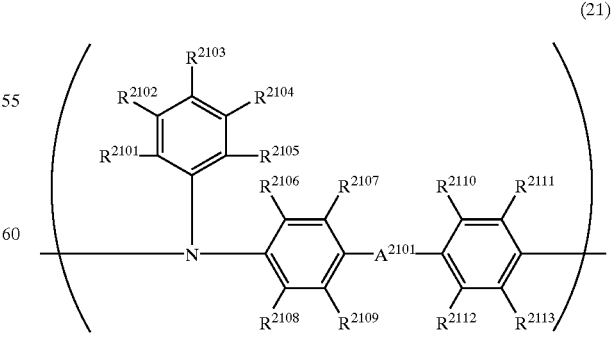

(21)

In the above formula (21), $R^{2101}$ to $R^{2113}$ each independently represent a hydrogen atom, a substituted or unsubstituted alkyl group, a substituted or unsubstituted aryl group, a substituted or unsubstituted alkoxyl group or an electron-attracting group. $A^{2101}$ represents a Group 14 element having a hydrogen atom, a substituted or unsubstituted alkyl group, a substituted or unsubstituted aryl group, a substituted or unsubstituted alkoxyl group or an electron-attracting group, or a Group 16 element.

The alkyl group represented by $R^{2101}$ to $R^{2113}$ in the above formula (21) may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 14 element represented by $A^{2101}$ in the above formula (21) may include carbon, silicon, germanium and tin. Of these, carbon and silicon are preferred.

Of the substituents this Group 14 element has, the alkyl group may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a trifluoromethyl group and a fluorophenyl group. Of these, a methyl group, an ethyl group, a phenyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 16 element represented by $A^{2101}$ in the above formula (21) may include oxygen, sulfur, selenium and tellurium. Of these, oxygen and sulfur are preferred.

The above high-molecular weight charge-transporting material may also preferably have a repeating structural unit represented by the following formula (22).

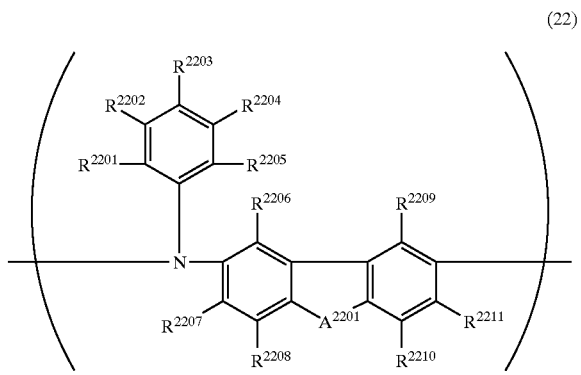

(22)

In the above formula (22), $R^{2201}$ to $R^{2211}$ each independently represent a hydrogen atom, a substituted or unsubstituted alkyl group, a substituted or unsubstituted aryl group, a substituted or unsubstituted alkoxyl group or an electron-attracting group. $A^{2201}$ represents a Group 14 element having a hydrogen atom, a substituted or unsubstituted alkyl group, a substituted or unsubstituted aryl group, a substituted or unsubstituted alkoxyl group or an electron-attracting group, or a Group 16 element.

The alkyl group represented by $R^{2201}$ to $R^{2211}$ in the above formula (22) may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 14 element represented by $A^{2201}$ in the above formula (22) may include carbon, silicon, germanium and tin. Of these, carbon and silicon are preferred.

Of the substituents this Group 14 element has, the alkyl group may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a trifluoromethyl group and a fluorophenyl group. Of these, a methyl group, an ethyl group, a phenyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 16 element represented by $A^{2201}$ in the above formula (22) may include oxygen, sulfur, selenium and tellurium. Of these, oxygen and sulfur are preferred.

In addition, the high-molecular weight charge-transporting material having at least one of the repeating structural unit represented by the above formula (21) and the repeating structural unit represented by the above formula (22) may more preferably also have a repeating structural unit represented by the following formula (23).

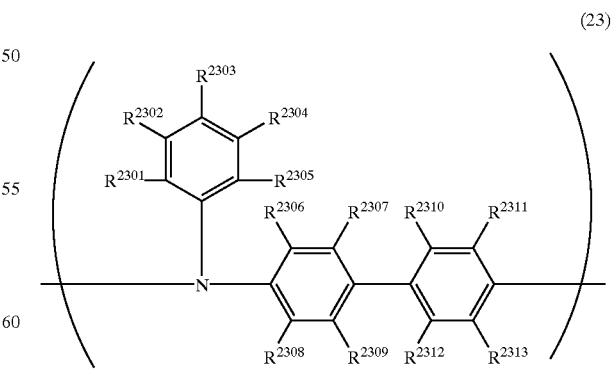

(23)

In the above formula (23), $R^{2301}$ to $R^{2313}$ each independently represent a hydrogen atom, a substituted or unsubstituted alkyl group, a substituted or unsubstituted aryl group, a substituted or unsubstituted alkoxyl group or an electron-attracting group; provided that, when the above high-molecular weight charge-transporting material also has the unit represented by the formula (12), a case or cases in which the units represented by the formulas (12) and (23) have the same structure is/are excluded.

The alkyl group represented by $R^{2301}$ to $R^{2311}$ in the above formula (23) may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The above high-molecular weight charge-transporting material may also preferably have a repeating structural unit represented by the following formula (31).

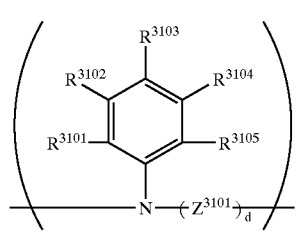

(31)

In the above formula (31), $R^{3101}$ to $R^{3105}$ each independently represent a hydrogen atom, a substituted or unsubstituted alkyl group, a substituted or unsubstituted aryl group, a substituted or unsubstituted alkoxyl group or an electron-attracting group. $Z^{3101}$ represents a substituted or unsubstituted divalent heterocyclic ring group. Letter symbol d represents an integer of 1 or more, provided that, when d is two or more, the two or more $Z^{3101}$'s may be the same or different.

The alkyl group represented by $R^{3101}$ to $R^{3105}$ in the above formula (31) may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The divalent heterocyclic ring group represented by $Z^{3101}$ in the above formula (31) may include a pyridyl group, a dibenzofuranyl group and a dibenzothiophenyl group. Of these, a pyridyl group is preferred.

The substituent the substituted heterocyclic ring group of these may have may include a hydrogen atom, a methyl group, an ethyl group, a propyl group, a phenyl group, a methoxyl group, an ethoxyl group, a fluorine atom, a chlorine atom, a bromine atom, a trifluoromethyl group and a fluorophenyl group. Of these, a hydrogen atom, a methyl group, an ethyl group and a trifluoromethyl group are preferred.

In addition, the high-molecular weight charge-transporting material having the repeating structural unit represented by the above formula (31) may more preferably also have a repeating structural unit represented by the following formula (32).

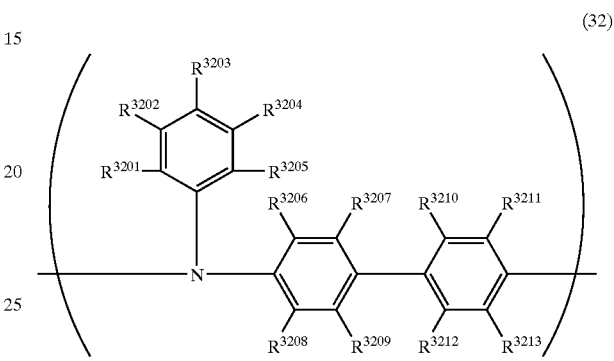

(32)

In the above formula (32), $R^{3201}$ to $R^{3213}$ each independently represent a hydrogen atom, a substituted or unsubstituted alkyl group, a substituted or unsubstituted aryl group, a substituted or unsubstituted alkoxyl group or an electron-attracting group; provided that, when the above high-molecular weight charge-transporting material also has the unit represented by the formula (12), a case or cases in which the units represented by the formulas (12) and (32) have the same structure is/are excluded, and when the above high-molecular weight charge-transporting material also has the unit represented by the formula (23), a case or cases in which the units represented by the formulas (23) and (32) have the same structure is/are excluded.

The alkyl group represented by $R^{3201}$ to $R^{3213}$ in the above formula (32) may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The above high-molecular weight charge-transporting material may also preferably have a repeating structural unit represented by the following formula (41).

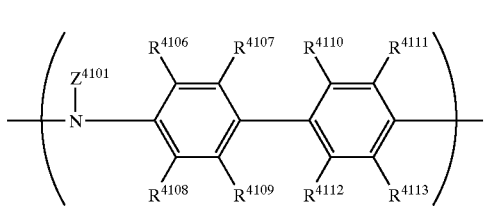

(41)

In the above formula (41), $Z^{4101}$ represents a substituted or unsubstituted monovalent heterocyclic ring group. $R^{4106}$ to $R^{4113}$ each independently represent a hydrogen atom, a substituted or unsubstituted alkyl group, a substituted or unsubstituted aryl group, a substituted or unsubstituted alkoxyl group or an electron-attracting group.

The monovalent heterocyclic ring group represented by $Z^{4101}$ in the above formula (41) may include a pyridyl group, a bipyridyl group, a tripyridyl group, a furanyl group, a thiophenyl group, a benzofuranyl group, a benzothiophenyl group, a dibenzofuranyl group and a dibenzothiophenyl group. Of these, a pyridyl group, a benzofuranyl group, a benzothiophenyl group, a dibenzofuranyl group and a dibenzothiophenyl group are preferred.

The substituent the substituted heterocyclic ring group of these may have may include a hydrogen atom, a methyl group, an ethyl group, a propyl group, a phenyl group, a methoxyl group, an ethoxyl group, a fluorine atom, a chlorine atom, a bromine atom, a trifluoromethyl group and a fluorophenyl group. Of these, a hydrogen atom, a methyl group, an ethyl group and a trifluoromethyl group are preferred.

The alkyl group represented by $R^{4106}$ to $R^{4113}$ in the above formula (41) may include a methyl group, an ethyl group and a propyl groups the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

In addition, the high-molecular weight charge-transporting material having the repeating structural unit represented by the above formula (41) may more preferably also have a repeating structural unit represented by the following formula (42).

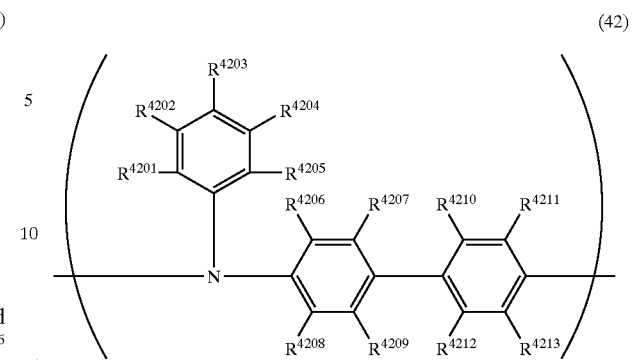

(42)

In the above formula (42), $R^{4201}$ to $R^{4213}$ each independently represent a hydrogen atom, a substituted or unsubstituted alkyl group, a substituted or unsubstituted aryl group, a substituted or unsubstituted alkoxyl group or an electron-attracting group; provided that, when the above high-molecular weight charge-transporting material also has the unit represented by the formula (12), a case or cases in which the units represented by the formulas (12) and (42) have the same structure is/are excluded, when the above high-molecular weight charge-transporting material also has the unit represented by the formula (23), a case or cases in which the units represented by the formulas (23) and (42) have the same structure is/are excluded, and when the above high-molecular weight charge-transporting material also has the unit represented by the formula (32), a case or cases in which the units represented by the formulas (32) and (42) have the same structure is/are excluded.

The alkyl group represented by $R^{4201}$ to $R^{4213}$ in the above formula (42) may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The above high-molecular weight charge-transporting material may also preferably have a repeating structural unit represented by the following formula (51).

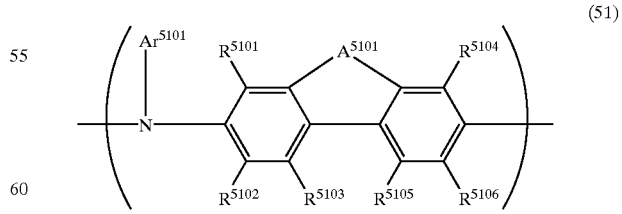

(51)

In the above formula (51), $Ar^{5101}$ represents an aromatic ring group substituted with at least one electron-attracting group, or a substituted or unsubstituted heterocyclic ring group. $R^{5101}$ to $R^{5106}$ each independently represent a hydrogen atom, a substituted or unsubstituted alkyl group, a substituted or unsubstituted aryl group, a substituted or unsubstituted alkoxyl group or an electron-attracting group. $R^{5103}$ and $R^{5105}$ may combine through a chemical species having at least one atom, to form a ring structure. $A^{5101}$ represents a Group 14 element having a hydrogen atom, a substituted or unsubstituted alkyl group, a substituted or unsubstituted aryl group, a substituted or unsubstituted alkoxyl group or an electron-attracting group, or a Group 15 element having a hydrogen atom, a substituted or unsubstituted alkyl group, a substituted or unsubstituted aryl group or an electron-attracting group, or a Group 16 element.

The aromatic ring group represented by $Ar^{5101}$ in the above formula (51) may include a phenyl group and a naphthyl group; and the heterocyclic ring group may include a pyridyl group, a bipyridyl group, a tripyridyl group, a furanyl group, a thiophenyl group, a benzofuranyl group, a benzothiophenyl group, a dibenzofuranyl group and a dibenzothiophenyl group. Of these, as the aromatic ring group, a phenyl group is preferred, and as the heterocyclic ring group, a pyridyl group, a benzofuranyl group, a benzothiophenyl group, a dibenzofuranyl group and a dibenzothiophenyl group are preferred.

The electron-attracting group the aromatic ring group has at least one may include a halogen atom, a fluoroalkyl group, a fluoroaryl group, a cyano group and a nitro group. Of these, a fluorine atom, a chlorine atom, a bromine atom, a trifluoromethyl group and a fluorophenyl group are preferred.

The substituent the substituted aromatic ring group and heterocyclic ring group of these may have other than the electron-attracting group may include a hydrogen atom, an alkyl group having 1 to 8 carbon atoms, an aryl group having 6 to 12 carbon atoms, an alkoxyl group having 1 to 8 carbon atoms, an aryl ether group, an aryl thioether group, a N-(alkyl)$_2$ group and a N-(aryl)$_2$ group. Of these, a hydrogen atom, a methyl group, an ethyl group, a propyl group, a phenyl group, a methoxyl group and an ethoxyl group are preferred.

The alkyl group represented by $R^{5101}$ to $R^{5106}$ in the above formula (51) may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

In the case when $R^{5103}$ and $R^{5105}$ combine through a chemical species having at least one atom, to form a ring structure, the chemical species having at least one atom may include a substituted or unsubstituted Group 14 element, a substituted or unsubstituted Group 15 element, a Group 16 element, a substituted or unsubstituted alkylene group and a substituted or unsubstituted alkylidene group. Of these, a substituted or unsubstituted alkylene group and a substituted or unsubstituted alkylidene group are preferred. The substituent the substituted alkylene group and alkylidene group of these may have may include a methyl group, an ethyl group, a propyl group, a phenyl group, a fluorine atom and a trifluoromethyl group. Of these, a methyl group and a phenyl group are preferred.

The Group 14 element represented by $A^{5101}$ in the above formula (51) may include carbon, silicon, germanium and tin. Of these, carbon and silicon are preferred.

Of the substituents this Group 14 element has, the alkyl group may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 15 element represented by $A^{5101}$ in the above formula (51) may include nitrogen and phosphorus. Of these, nitrogen is preferred.

Of the substituents this Group 15 element has, the alkyl group may include a methyl group, an ethyl group and a propyl group, the aryl group may include a phenyl group and a naphthyl group, and the electron-attracting group may include a fluorine atom, a chlorine atom, a bromine atom, a trifluoromethyl group and a fluorophenyl group. Of these, a methyl group, an ethyl group, a phenyl group and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 16 element represented by $A^{5101}$ in the above formula (51) may include oxygen, sulfur, selenium and tellurium. Of these, oxygen and sulfur are preferred.

In addition, the high-molecular weight charge-transporting material having the repeating structural unit represented by the above formula (51) may more preferably also have a repeating structural unit represented by the following formula (52).

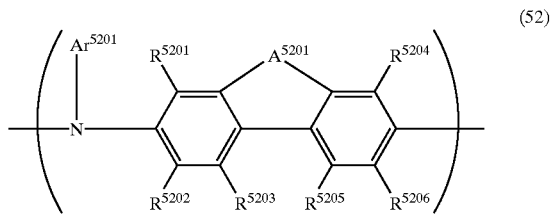

(52)

In the above formula (52), $Ar^{5201}$ represents a substituted or unsubstituted monovalent aromatic ring or a substituted or unsubstituted monovalent heterocyclic ring group. $R^{5201}$ to $R^{5206}$ each independently represent a hydrogen atom, a substituted or unsubstituted alkyl group, a substituted or unsubstituted aryl group, a substituted or unsubstituted alkoxyl group or an electron-attracting group. $R^{5203}$ and $R^{5205}$ may combine through a chemical species having at least one atom, to form a ring structure. $A^{5201}$ represents a Group 14 element having a hydrogen atom, a substituted or unsubstituted alkyl group, a substituted or unsubstituted aryl group, a substituted or unsubstituted alkoxyl group or an electron-attracting group, or a Group 15 element having a hydrogen atom, a substituted or unsubstituted alkyl group, a substituted or unsubstituted aryl group or an electron-attracting group, or a Group 16 element; provided that a case or cases in which the units represented by the formulas (51) and (52) have the same structure is/are excluded.

The aromatic ring group represented by $Ar^{5201}$ in the above formula (52) may include a phenyl group and a naphthyl group; and the heterocyclic ring group may include a pyridyl group, a bipyridyl group, a tripyridyl group, a furanyl group, a thiophenyl group, a benzofuranyl group, a benzothiophenyl group, a dibenzofuranyl group and a dibenzothiophenyl group. Of these, as the aromatic ring group, a phenyl group is preferred, and as the heterocyclic ring group, a pyridyl group, a benzofuranyl group, a benzothiophenyl group, a dibenzofuranyl group and a dibenzothiophenyl group are preferred.

The substituent the substituted aromatic ring group and heterocyclic ring group of these may have may include a hydrogen atom, an alkyl group having 1 to 8 carbon atoms, an aryl group having 6 to 12 carbon atoms, an alkoxyl group having 1 to 8 carbon atoms, a halogen atom, a fluoroalkyl group, a fluoroaryl group, a cyano group and a nitro group. Of these, a hydrogen atom, a methyl group, an ethyl group, a propyl group, a phenyl group, a methoxyl group, an ethoxyl group, a fluorine atom, a chlorine atom, a bromine atom, a trifluoromethyl group and a fluorophenyl group are preferred.

The alkyl group represented by $R^{5201}$ to $R^{5206}$ in the above formula (52) may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

In the case when $R^{5203}$ and $R^{5205}$ combine through a chemical species having at least one atom, to form a ring structure, the chemical species having at least one atom may include a substituted or unsubstituted Group 14 element, a substituted or unsubstituted Group 15 element, a Group 16 element, a substituted or unsubstituted alkylene group and a substituted or unsubstituted alkylidene group. Of these, a substituted or unsubstituted alkylene group and a substituted or unsubstituted alkylidene group are preferred. The substituent the substituted alkylene group and alkylidene group of these may have may include a methyl group, an ethyl group, a propyl group, a phenyl group, a fluorine atom and a trifluoromethyl group. Of these, a methyl group and a phenyl group are preferred.

The Group 14 element represented by $A^{5201}$ in the above formula (52) may include carbon, silicon, germanium and tin. Of these, carbon and silicon are preferred.

Of the substituents this Group 14 element has, the alkyl group may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 15 element represented by $A^{5201}$ in the above formula (52) may include nitrogen and phosphorus. Of these, nitrogen is preferred.

Of the substituents this Group 15 element has, the alkyl group may include a methyl group, an ethyl group and a propyl group, the aryl group may include a phenyl group and a naphthyl group, and the electron-attracting group may include a fluorine atom, a chlorine atom, a bromine atom, a trifluoromethyl group and a fluorophenyl group. Of these, a methyl group, an ethyl group, a phenyl group and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 16 element represented by $A^{5201}$ in the above formula (52) may include oxygen, sulfur, selenium and tellurium. Of these, oxygen and sulfur are preferred.

In addition, the high-molecular weight charge-transporting material having the repeating structural unit represented by the above formula (51) may more preferably also have a repeating structural unit represented by the following formula (53).

(53)

In the above formula (53), $Ar^{5301}$ represents a substituted or unsubstituted monovalent aromatic ring or a substituted or unsubstituted monovalent heterocyclic ring group; provided that, when the above high-molecular weight charge-transporting material also has the unit represented by the formula (31), a case or cases in which the units represented by the formulas (31) and (53) have the same structure is/are excluded, when the above high-molecular weight charge-transporting material also has the unit represented by the formula (41), a case or cases in which the units represented by the formulas (41) and (53) have the same structure is/are excluded, and when the above high-molecular weight charge-transporting material also has the unit represented by the formula (42), a case or cases in which the units represented by the formulas (42) and (53) have the same structure is/are excluded.

The monovalent aromatic ring group represented by $Ar^{5301}$ in the above formula (53) may include a phenyl group and a naphthyl group; and the monovalent heterocyclic ring group may include a pyridyl group, a bipyridyl group, a tripyridyl group, a furanyl group, a thiophenyl group, a benzofuranyl group, a benzothiophenyl group, a dibenzofuranyl group and a dibenzothiophenyl group. Of these, as the aromatic ring group, a phenyl group is preferred, and as the heterocyclic ring group, a pyridyl group, a benzofuranyl group, a benzothiophenyl group, a dibenzofuranyl group and a dibenzothiophenyl group are preferred.

In the above formula (53), $Ar^{5302}$ represents a group selected from the group consisting of the following groups (i), (ii), (iii) and (iv).

(i) A group having structure represented by the following formula (54):

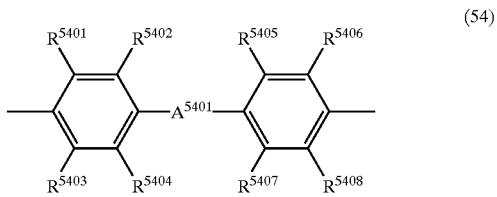

(54)

In the above formula (54), $R^{5401}$ to $R^{5408}$ each independently represent a hydrogen atom, a substituted or unsubstituted alkyl group, a substituted or unsubstituted aryl group, a substituted or unsubstituted alkoxyl group or an electron-attracting group. $A^{5401}$ represents a Group 14 element having a hydrogen atom, a substituted or unsubstituted alkyl group, a substituted or unsubstituted aryl group, a substituted or unsubstituted alkoxyl group or an electron-attracting group, or a Group 16 element; provided that, when the above high-molecular weight charge-transporting material also has the unit represented by the formula (21), a case or cases in which the units represented by the formula (21) and the formula (53) in which $Ar^{5302}$ is represented by the formula (54) have the same structure is/are excluded.

The alkyl group represented by $R^{5401}$ to $R^{5408}$ in the above formula (54) may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 14 element represented by $A^{5401}$ in the above formula (54) may include carbon, silicon, germanium and tin. Of these, carbon and silicon are preferred.

Of the substituents this Group 14 element has, the alkyl group may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 16 element represented by $A^{5401}$ in the above formula (54) may include oxygen, sulfur, selenium and tellurium. Of these, oxygen and sulfur are preferred.

(ii) A group having structure represented by the following formula (55):

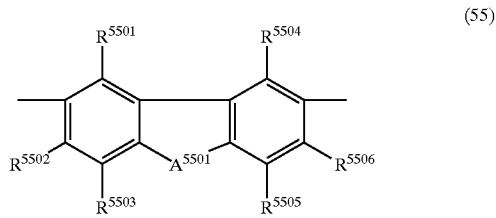

(55)

In the above formula (55), $R^{5501}$ to $R^{5506}$ each independently represent a hydrogen atom, a substituted or unsubstituted alkyl group, a substituted or unsubstituted aryl group, a substituted or unsubstituted alkoxyl group or an electron-attracting group. $A^{5501}$ represents a Group 14 element having a hydrogen atom, a substituted or unsubstituted alkyl group, a substituted or unsubstituted aryl group, a substituted or unsubstituted alkoxyl group or an electron-attracting group, or a Group 15 element having a hydrogen atom, a substituted or unsubstituted alkyl group, a substituted or unsubstituted aryl group, a substituted or unsubstituted alkoxyl group or an electron-attracting group, or a Group 16 element; provided that, when the above high-molecular weight charge-transporting material also has the unit represented by the formula (22), a case or cases in which the units represented by the formula (22) and the formula (53) in which $Ar^{5302}$ is represented by the formula (55) have the same structure is/are excluded.

The alkyl group represented by $R^{5501}$ to $R^{5506}$ in the above formula (55) may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 14 element represented by $A^{5501}$ in the above formula (55) may include carbon, silicon, germanium and tin. Of these, carbon and silicon are preferred.

Of the substituents this Group 14 element has, the alkyl group may include a methyl group, an ethyl group and a propyl group, the aryl group may include a phenyl group and a naphthyl group, the alkoxyl group may include a methoxyl group and an ethoxyl group, and the electron-attracting group may include a fluorine atom, a chlorine atom, a bromine atom, a trifluoromethyl group and a fluorophenyl group. Of these, a methyl group, an ethyl group, a phenyl group, a methoxyl group, a fluorine atom and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 15 element represented by $A^{5501}$ in the above formula (55) may include nitrogen and phosphorus. Of these, nitrogen is preferred.

Of the substituents this Group 15 element has, the alkyl group may include a methyl group, an ethyl group and a propyl group, the aryl group may include a phenyl group and a naphthyl group, and the electron-attracting group may include a fluorine atom, a chlorine atom, a bromine atom, a trifluoromethyl group and a fluorophenyl group. Of these, a methyl group, an ethyl group, a phenyl group and a trifluoromethyl group are preferred.

The substituent the substituted alkyl group, aryl group and alkoxyl group of these may have may include a methyl group, an ethyl group, a propyl group, a phenyl group, a fluorine atom and a trifluoromethyl group. Of these, a methyl group and a phenyl group are preferred.

The Group 16 element represented by $A^{5501}$ in the above formula (55) may include oxygen, sulfur, selenium and tellurium. Of these, oxygen and sulfur are preferred.

(iii) A substituted or unsubstituted divalent aromatic ring group, or a polymer thereof.

(iv) A substituted or unsubstituted divalent heterocyclic ring group, or a polymer thereof.

Specific examples of the high-molecular weight charge-transporting material having the repeating structural unit represented by the above formula (11) are given below.

(11-1)

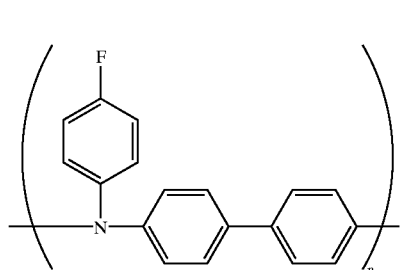

(11-2)

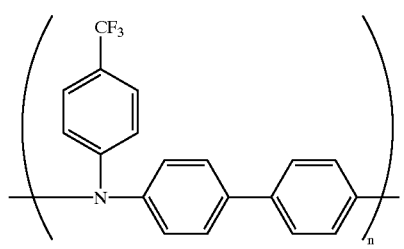

(11-3)

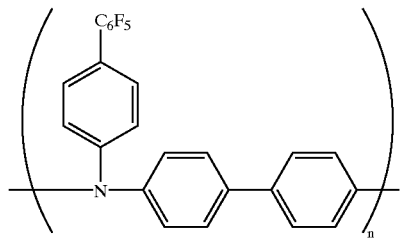

(11-4)

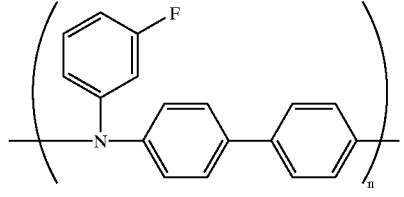

(11-5)

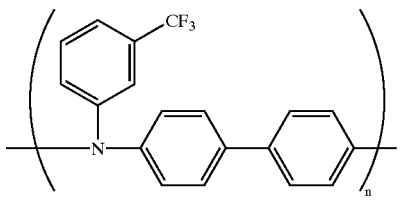

(11-6)

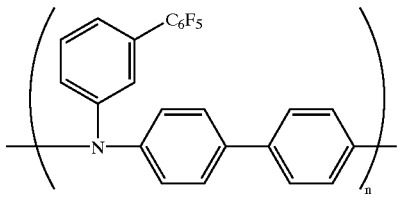

(11-7)

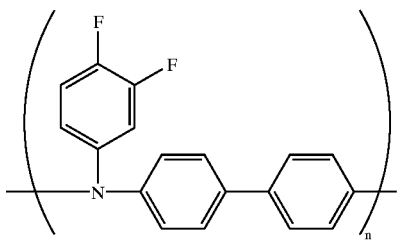

(11-8)

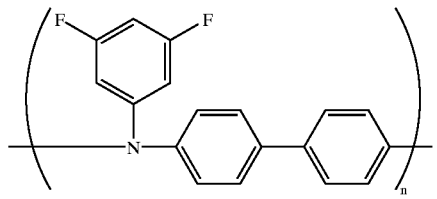

(11-9)

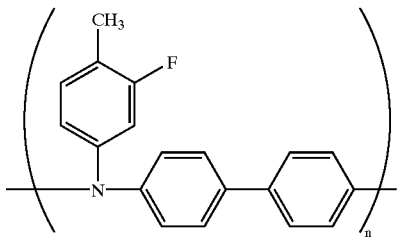

(11-10)

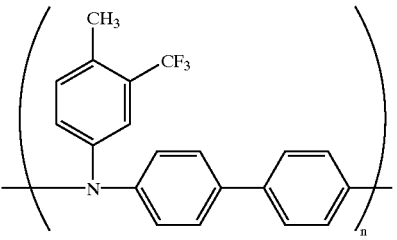

(11-11)

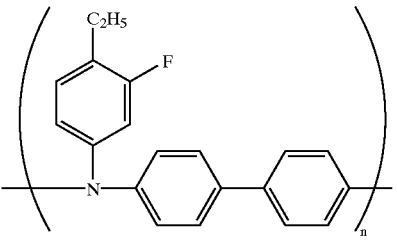

(11-12) 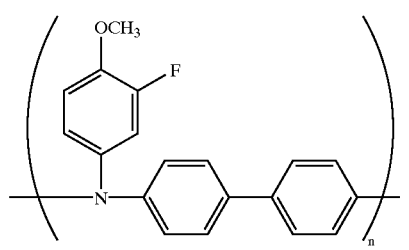
(11-13) 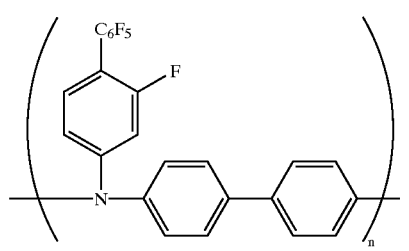
(11-14) 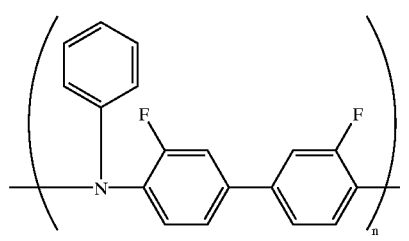
(11-15) 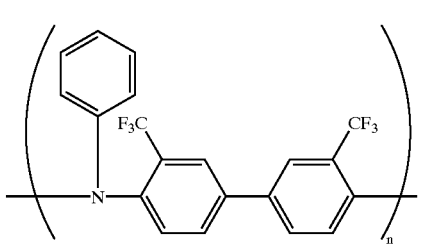
(11-16) 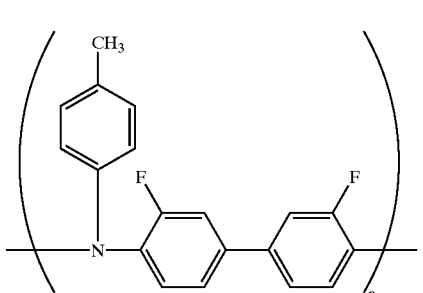
(11-17) 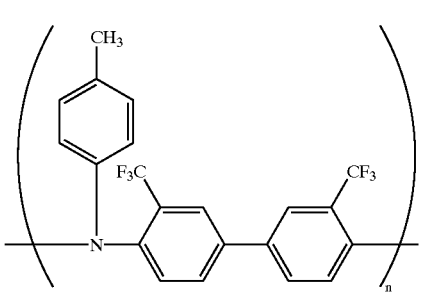
(11-18) 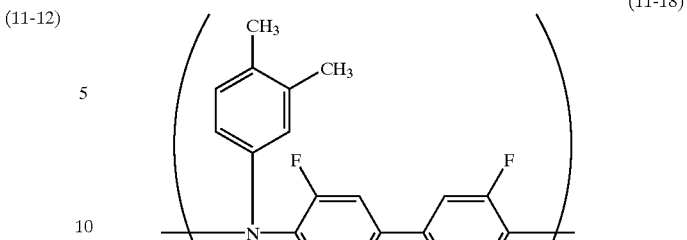
(11-19) 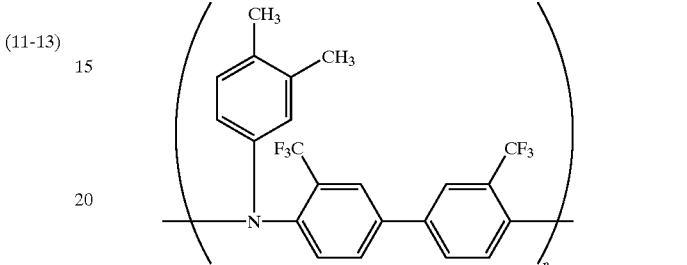
(11-20) 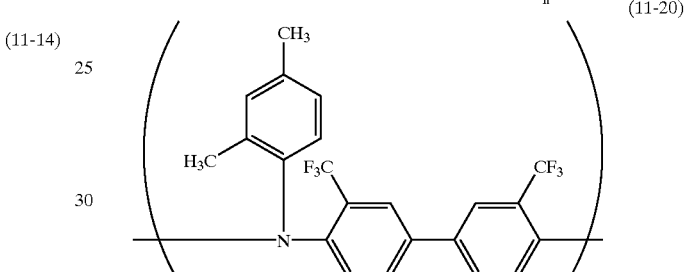
(11-21) 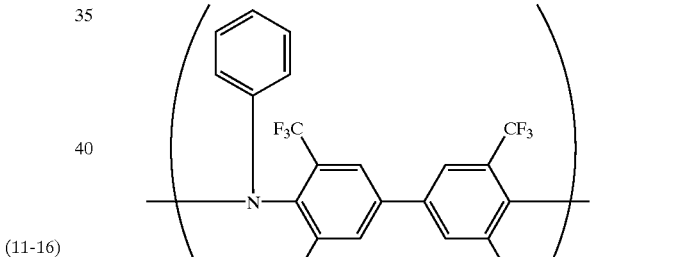
(11-22) 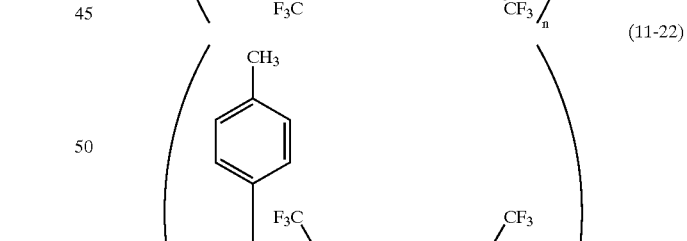
Of these, (11-1), (11-2), (11-4), (11-5), (11-9), (11-10), (11-14), (11-15), (11-16), (11-17), (11-18), (11-19) and (11-20) are preferred.
Specific examples of the high-molecular weight charge-transporting material having the repeating structural unit represented by the above formula (11) and the repeating structural unit represented by the above formula (12) are given below.

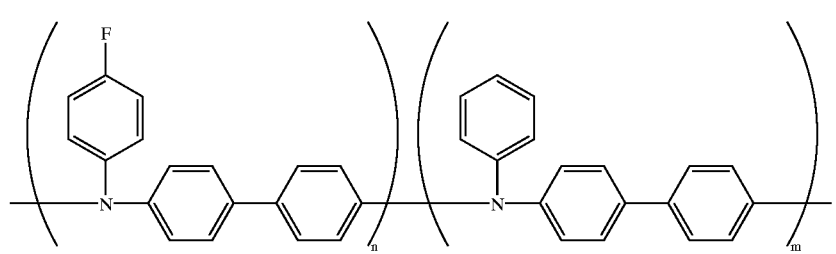
(13-1)
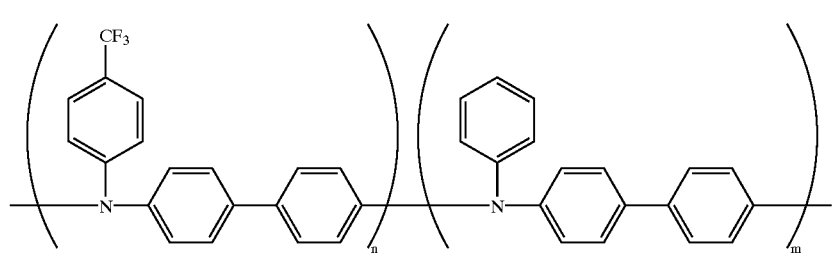
(13-2)
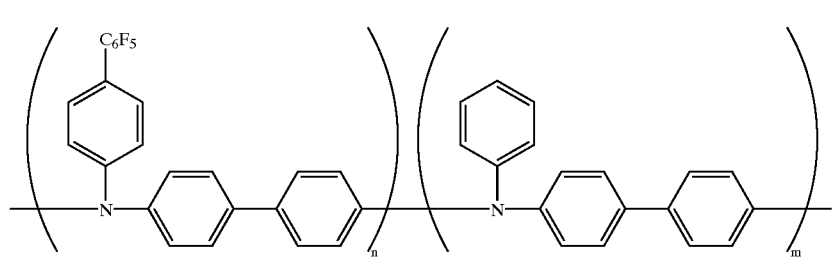
(13-3)
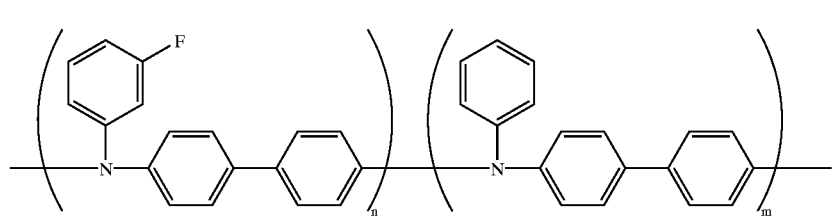
(13-4)
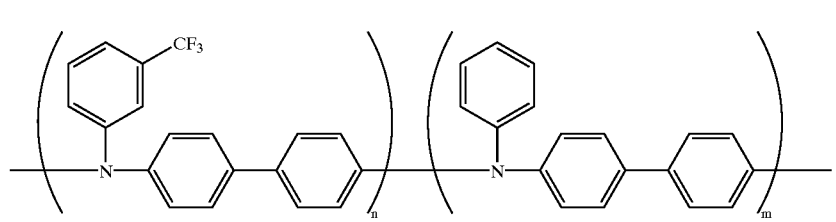
(13-5)
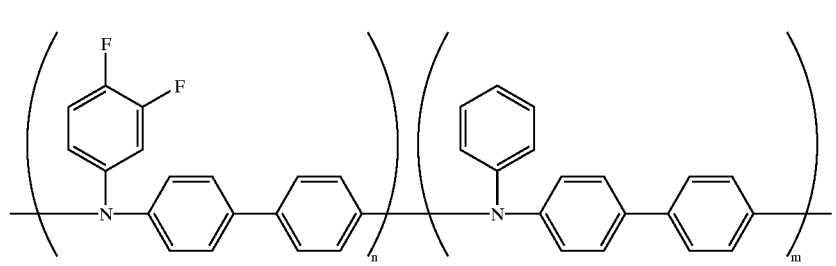
(13-6)

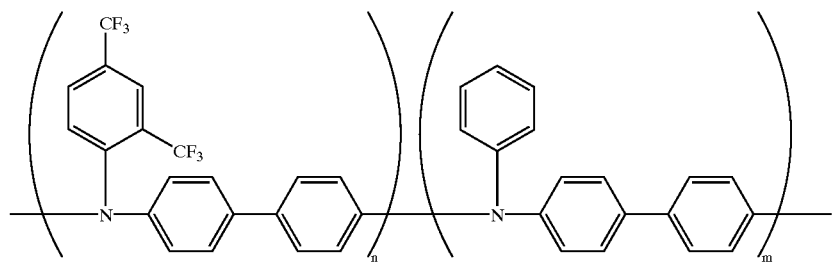
(13-7)
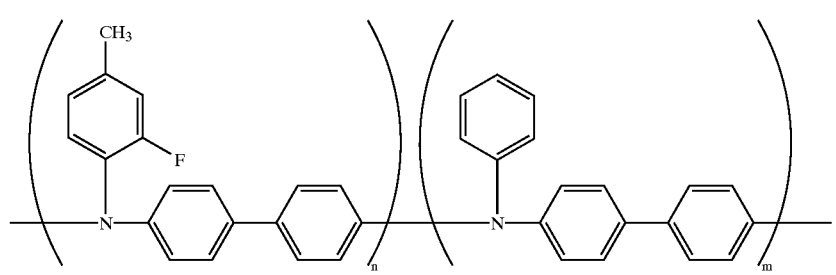
(13-8)
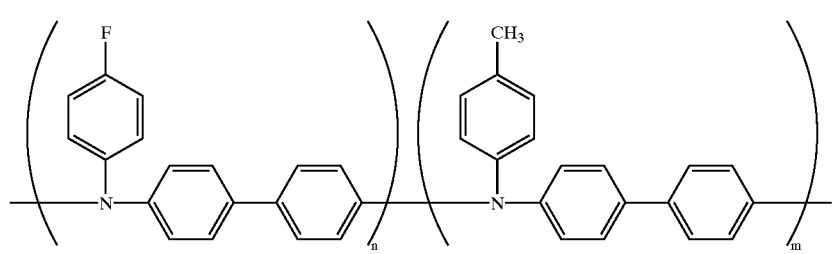
(13-9)
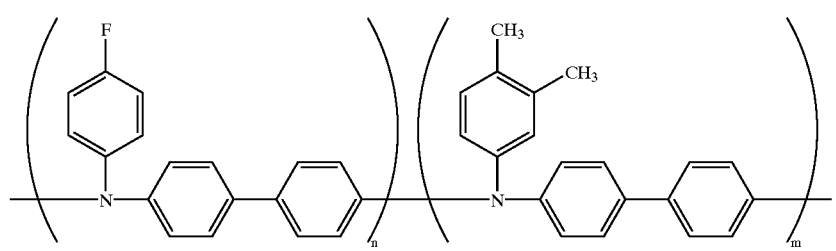
(13-10)
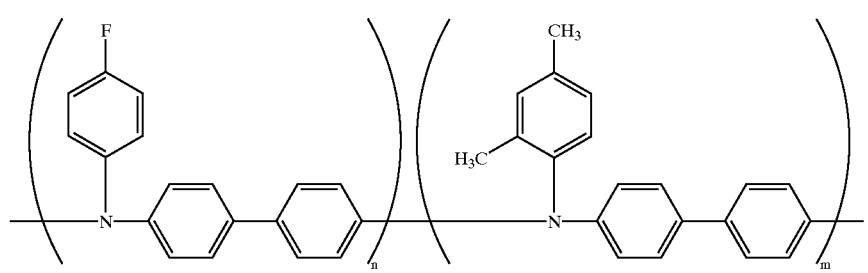
(13-11)
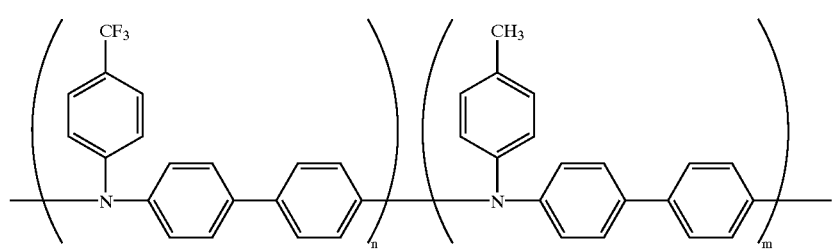
(13-12)

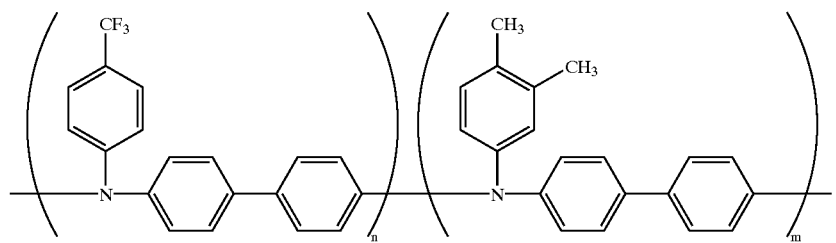
(13-13)
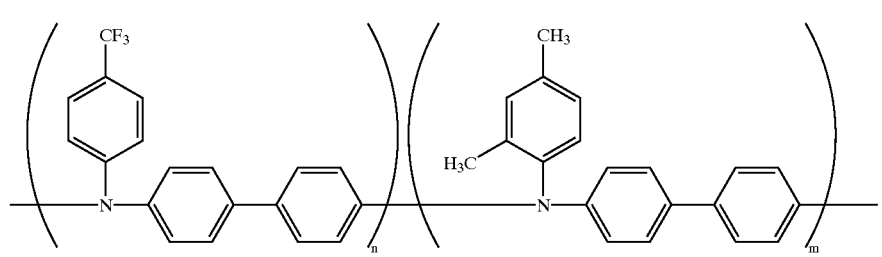
(13-14)
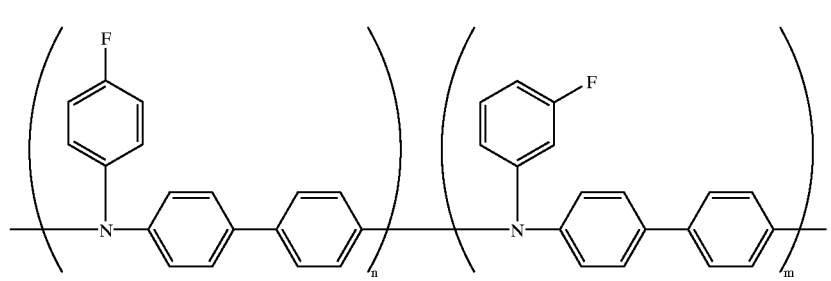
(13-15)
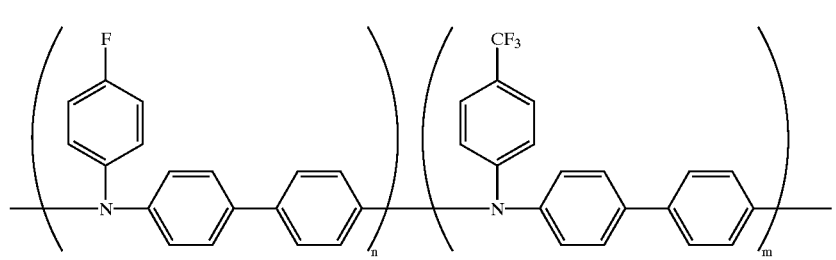
(13-16)
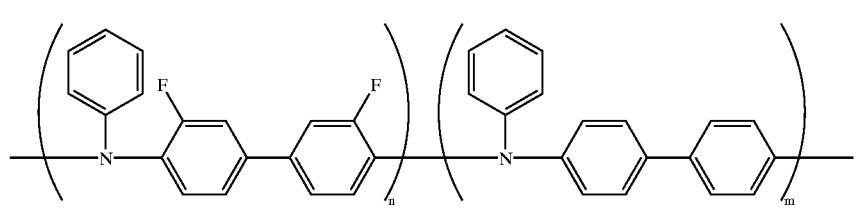
(13-17)
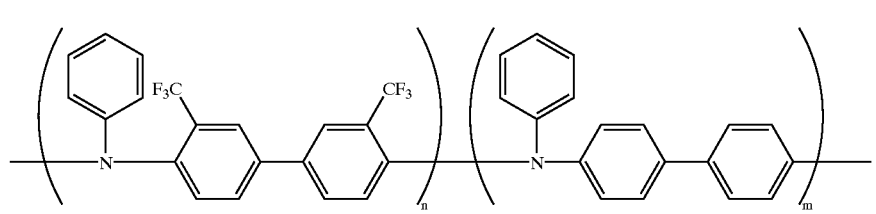
(13-18)

(13-19)
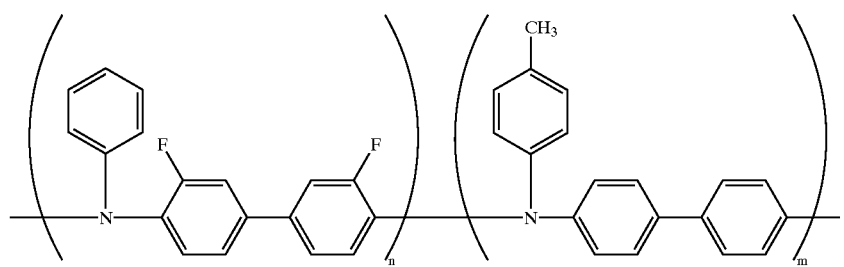
(13-20)
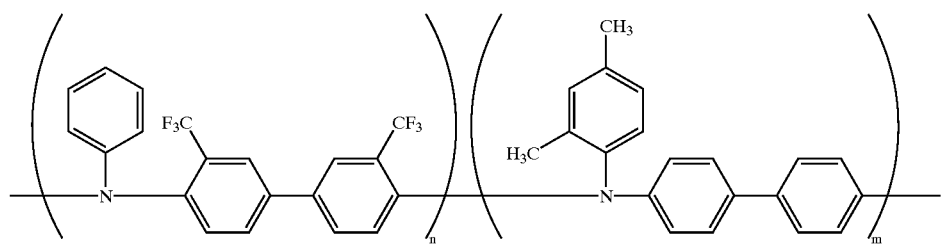
(13-21)
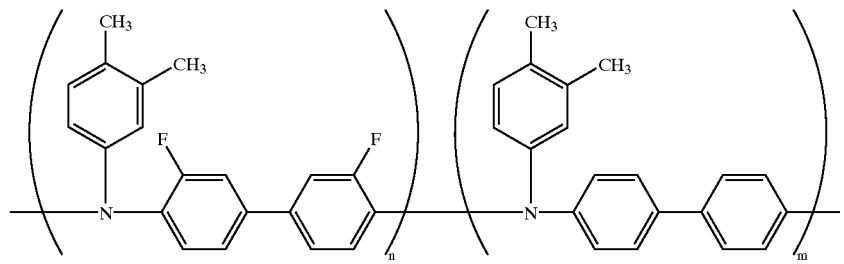
Of these, (13-1), (13-2), (13-9), (13-10), (13-11), (13-12), (13-13), (13-14), (13-19), (13-20) and (13-21) are preferred.
Specific examples of the high-molecular weight charge-transporting material having the repeating structural unit represented by the above formula (21) are given below.
(21-1)
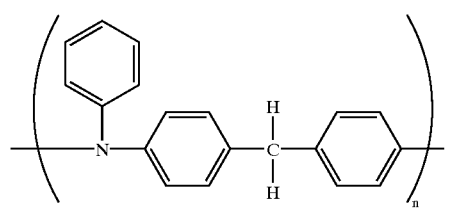
(21-2)
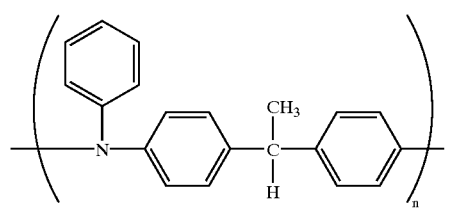
(21-3)
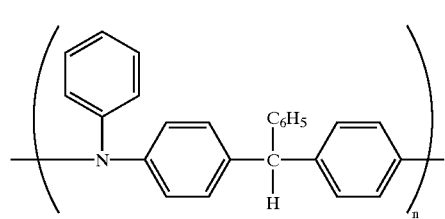
-continued
(21-4)
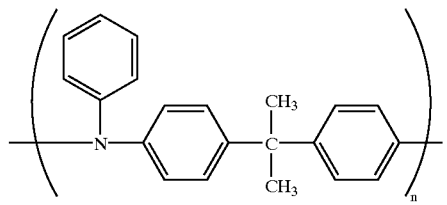
(21-5)
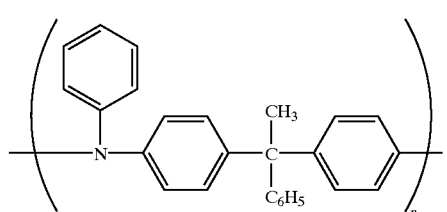
(21-6)
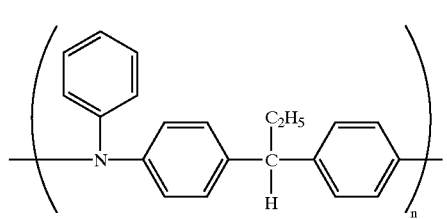

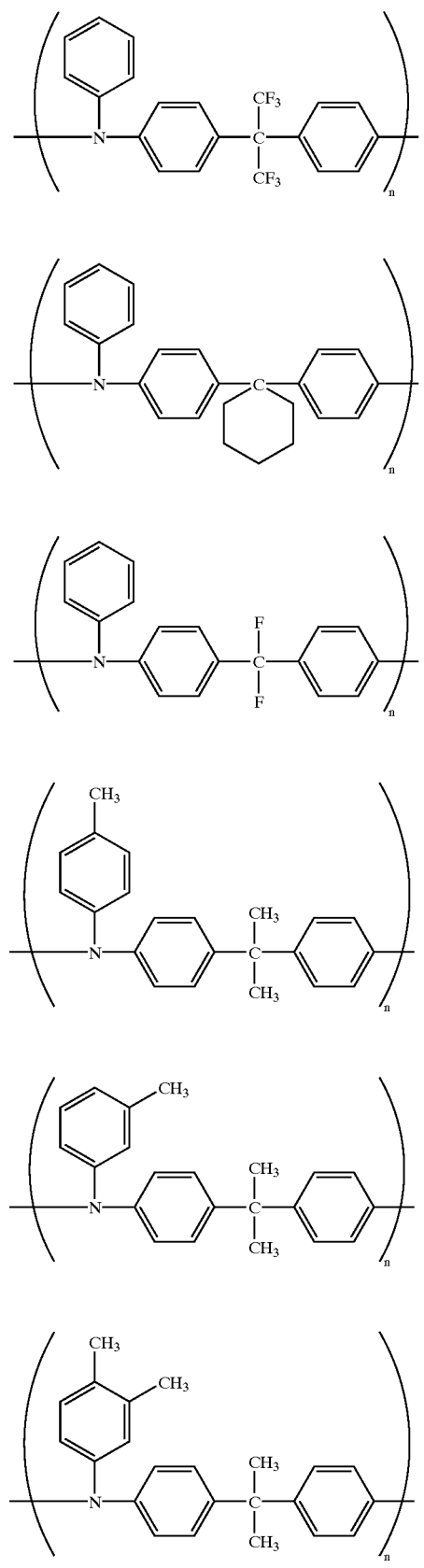
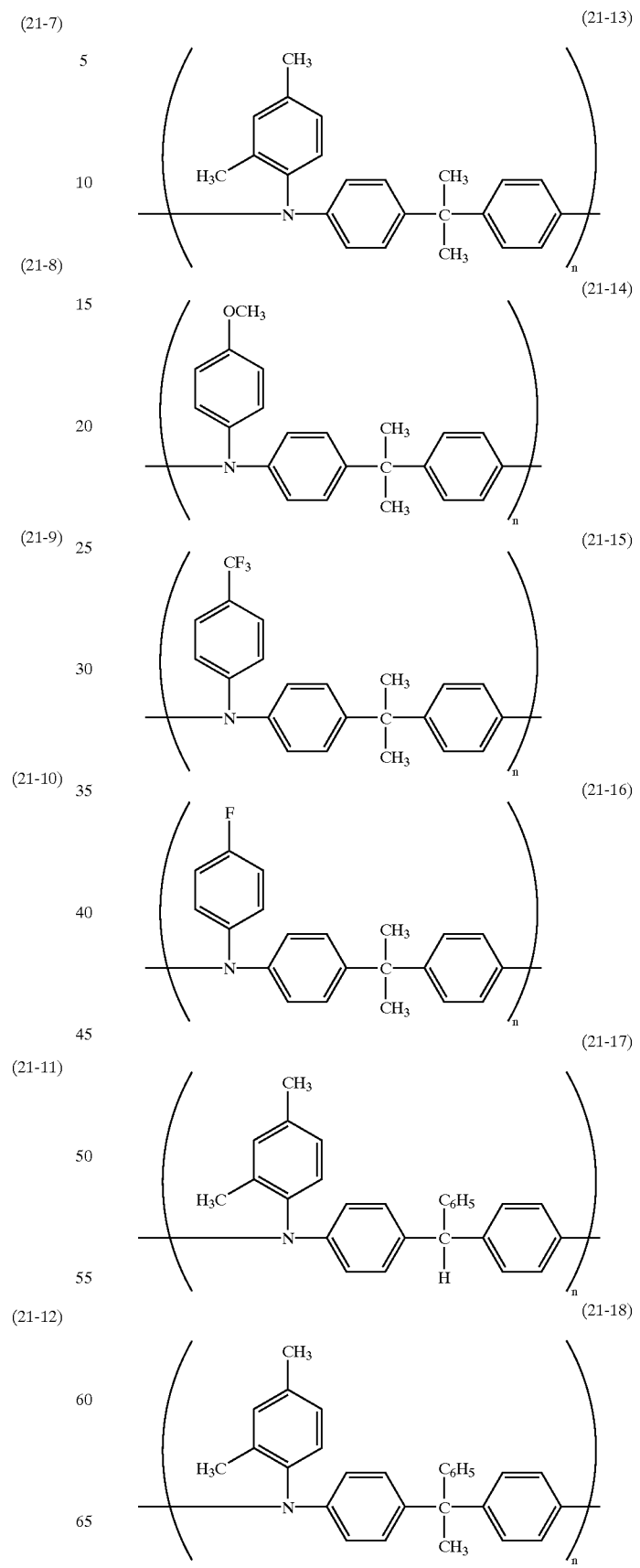

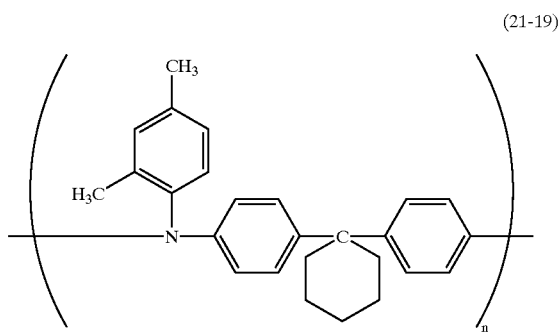
(21-19)
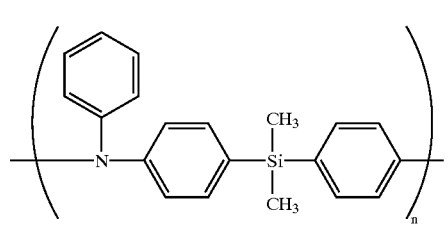
(21-20)
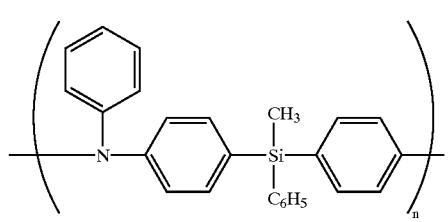
(21-21)
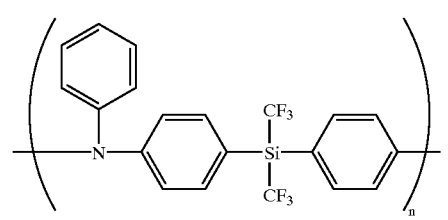
(21-22)
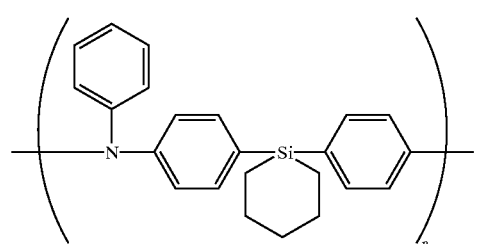
(21-23)
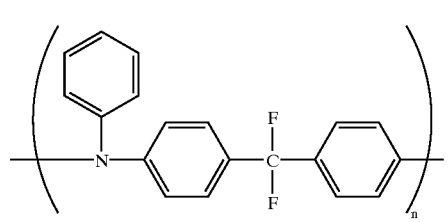
(21-24)
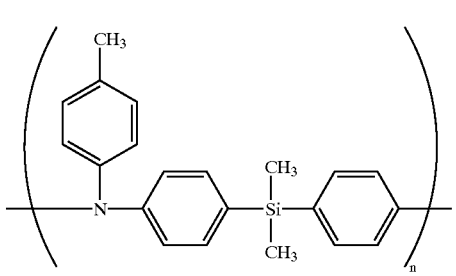
(21-25)
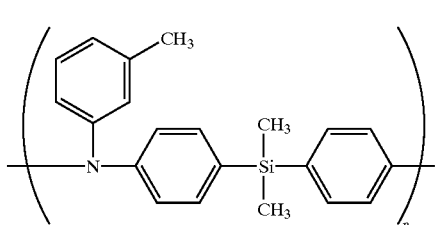
(21-26)
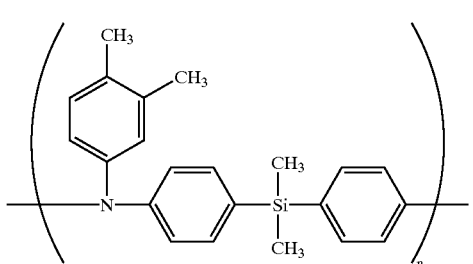
(21-27)
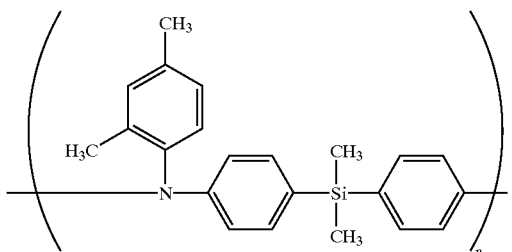
(21-28)
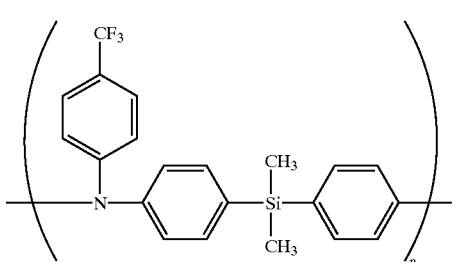
(21-29)
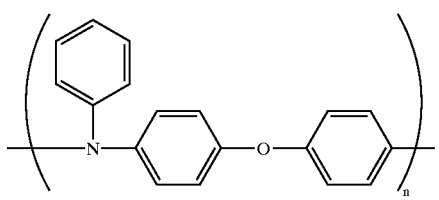
(21-30)

(21-31)
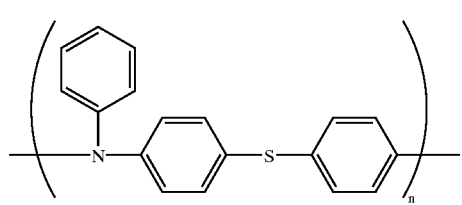
(21-32)
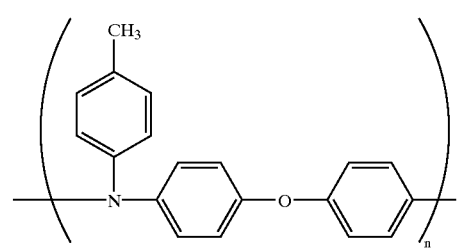
(21-33)
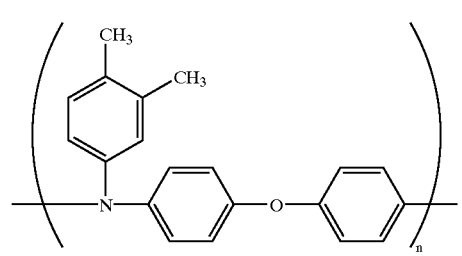
(21-34)
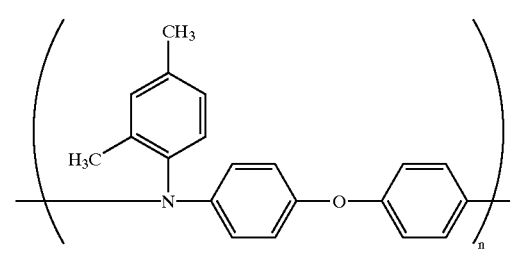
(21-35)
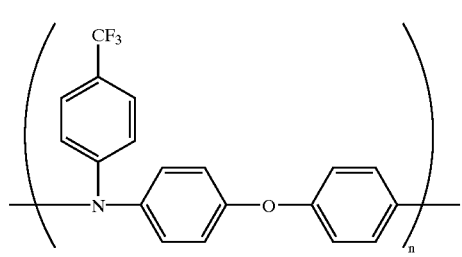
(21-36)
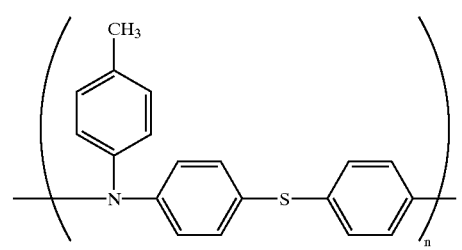
(21-37)
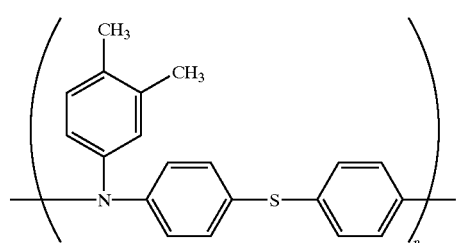
(21-38)
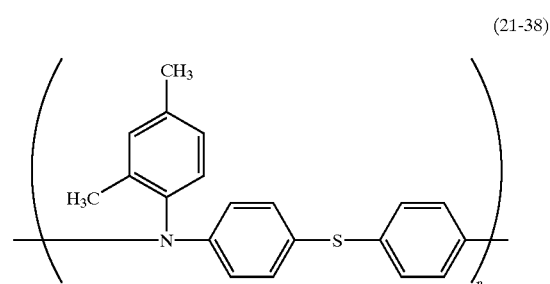
(21-39)
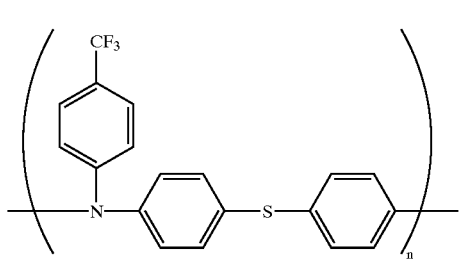
Of these, (21-4), (21-7), (21-10), (21-12), (21-13), (21-15), (21-20), (21-30), (21-31), (21-32), (21-33), (21-34), (21-36), (21-37) and (21-38) are preferred.
Specific examples of the high-molecular weight charge-transporting material having the repeating structural unit represented by the above formula (22) are given below.
(22-1)
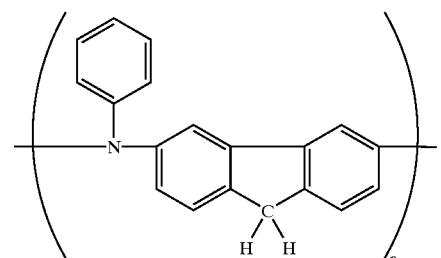
(22-2)
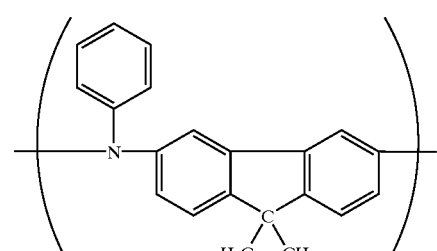

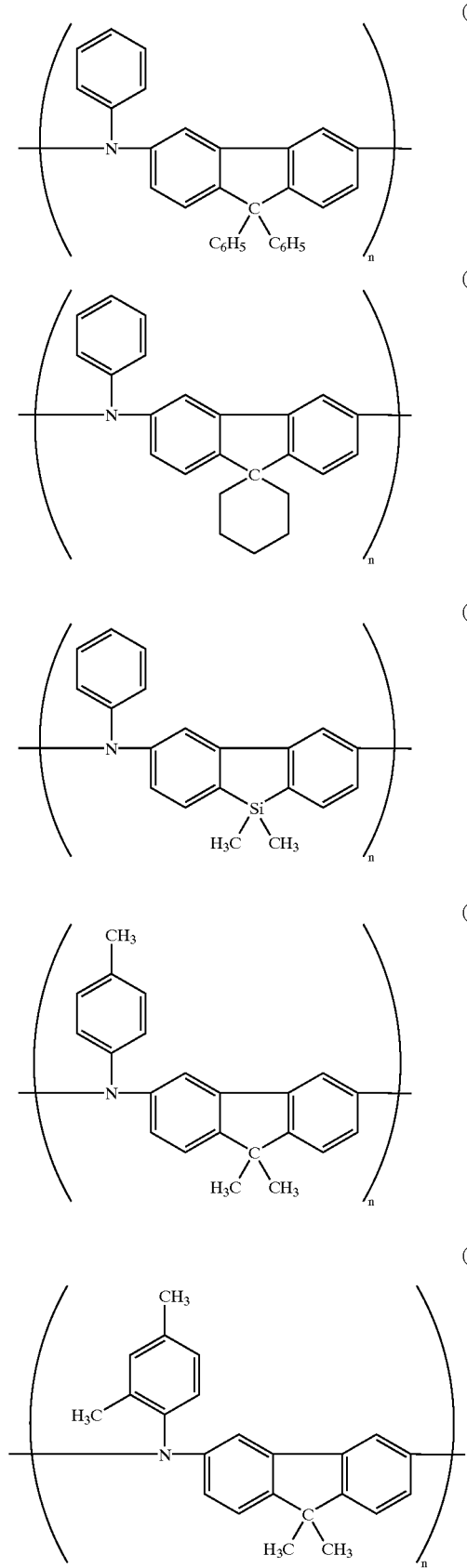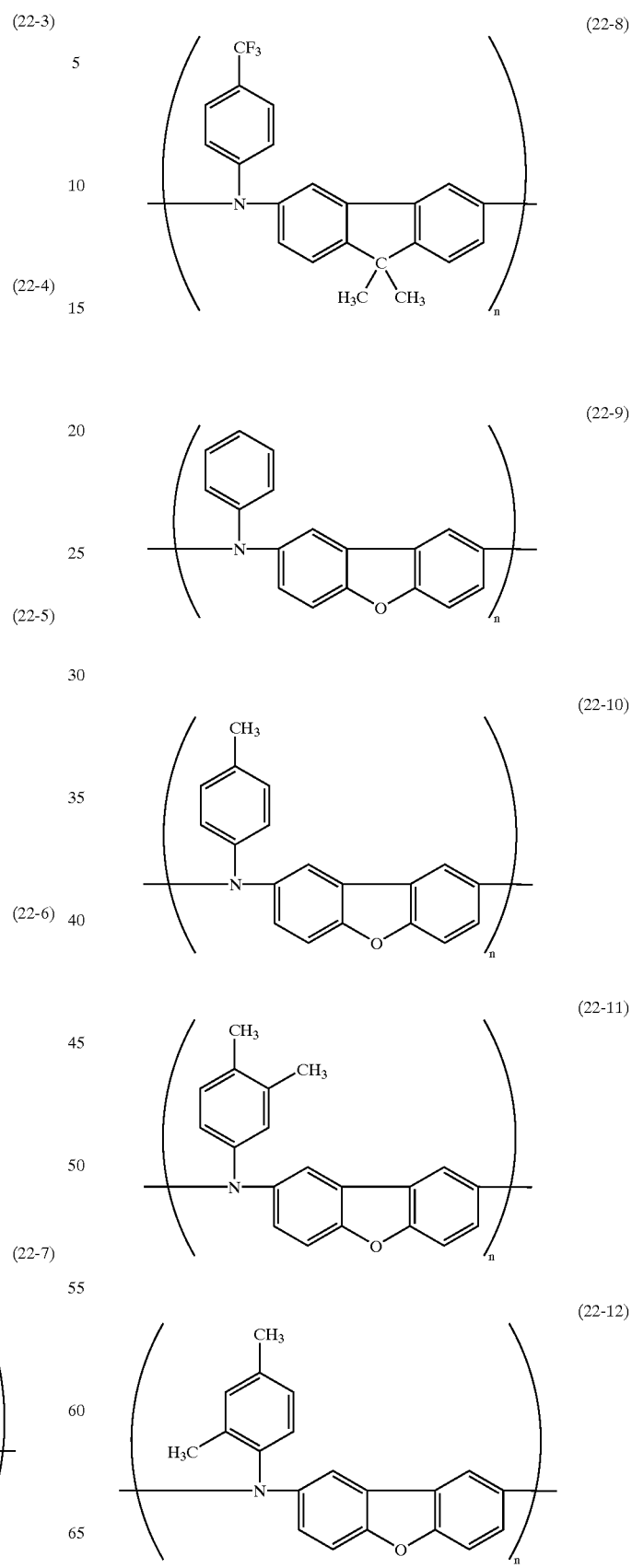

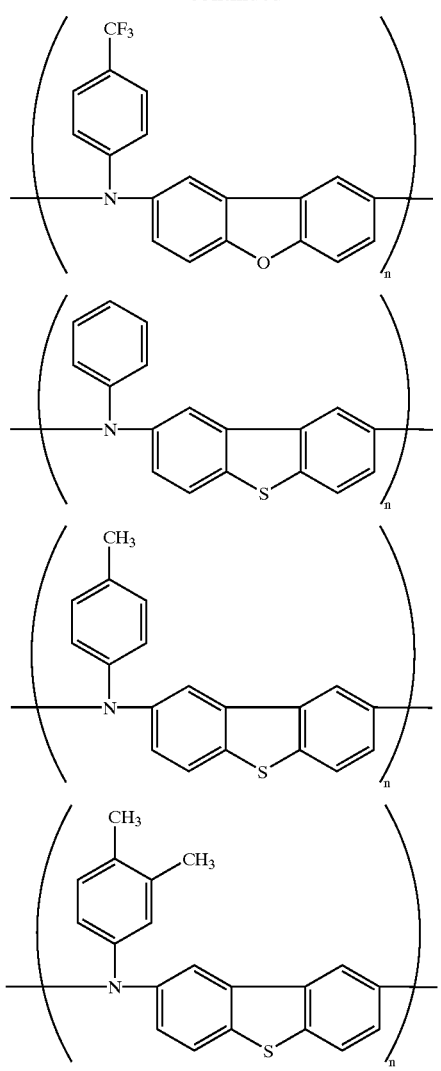
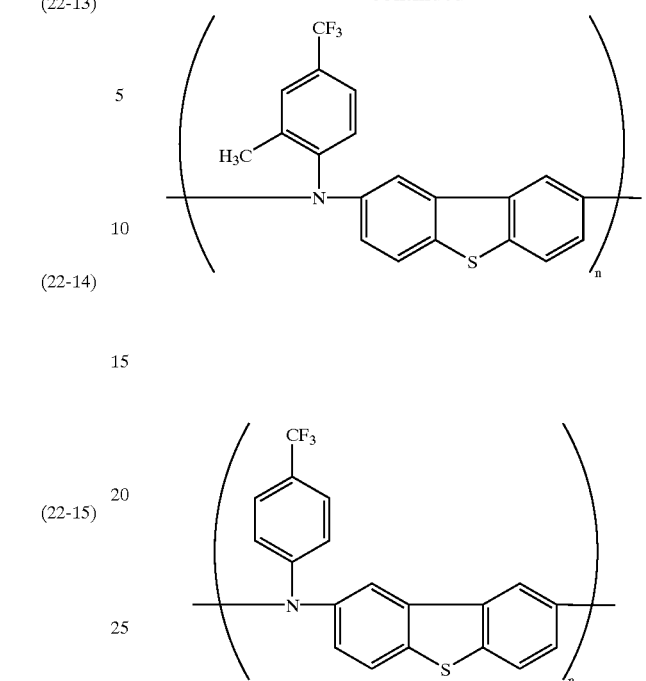
Of these, (22-2), (22-7), (22-9), (22-10), (22-11), (22-12), (22-14), (22-15), (22-16) and (22-17) are preferred.
Specific examples of the high-molecular weight charge-transporting material having the repeating structural unit represented by the above formula (21) and the repeating structural unit represented by the above formula (23) are given below.
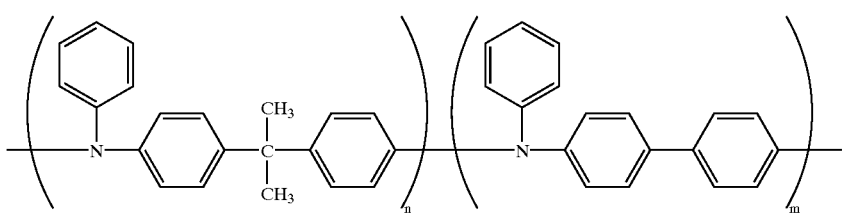
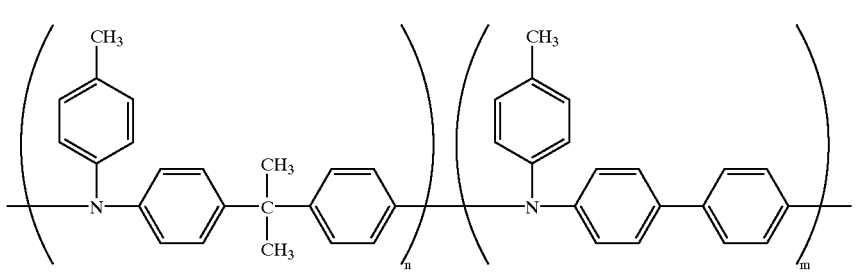

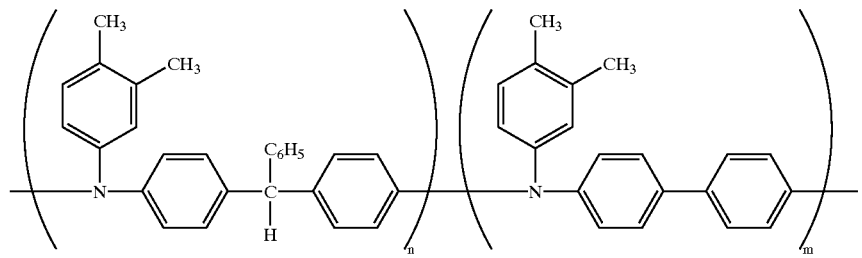
(24-3)
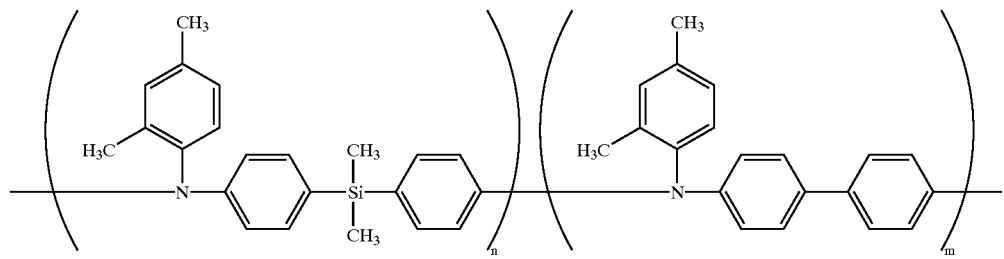
(24-4)
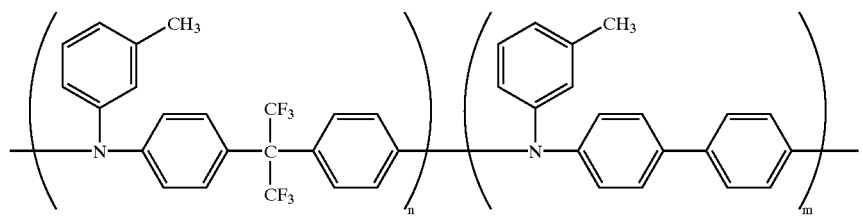
(24-5)
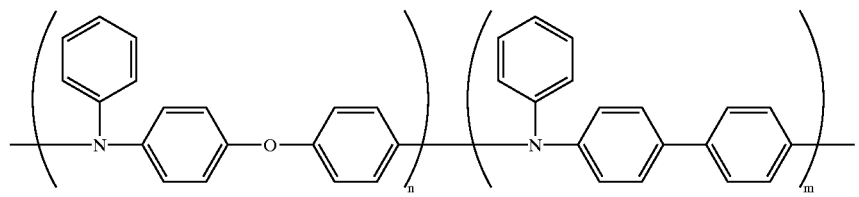
(24-6)
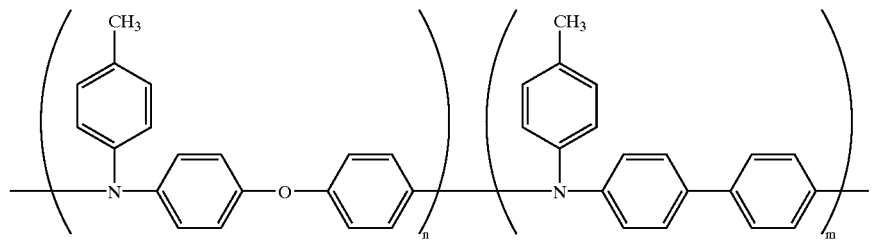
(24-7)
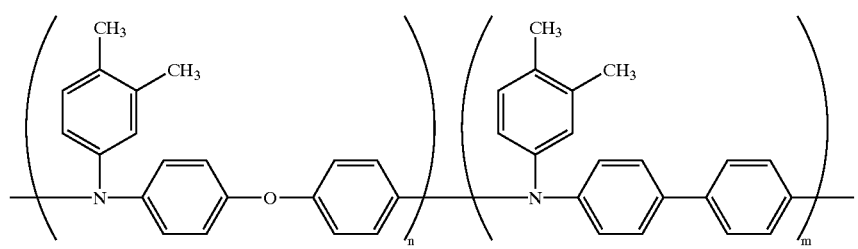
(24-8)

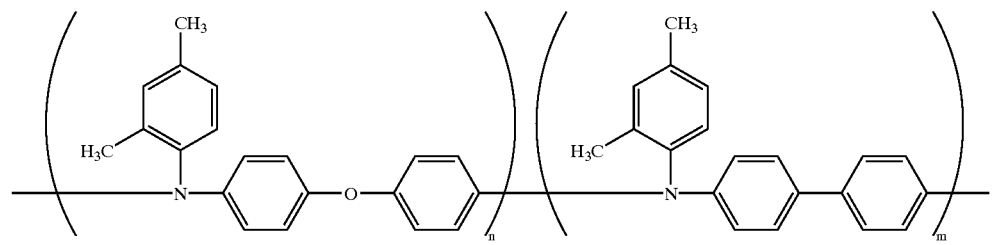
(24-9)
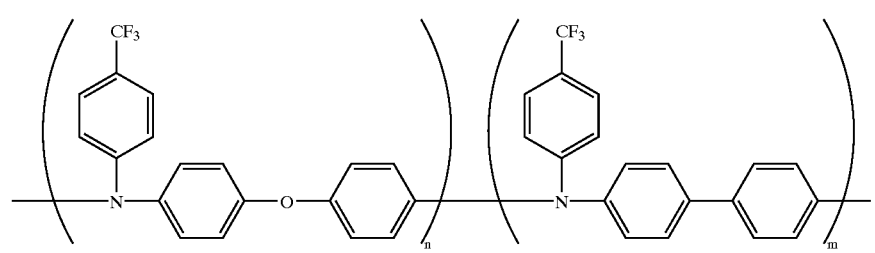
(24-10)
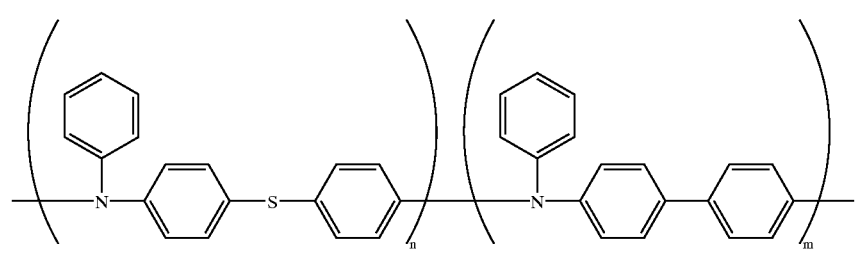
(24-11)
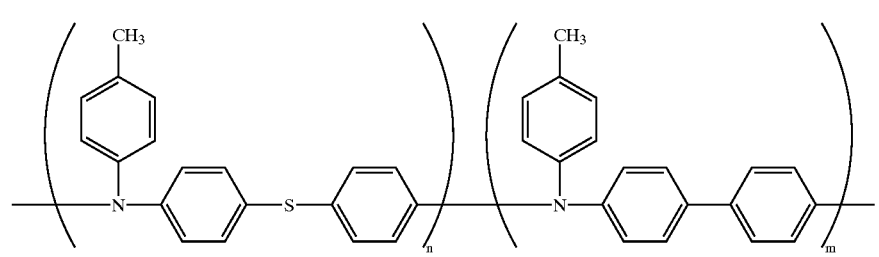
(24-12)
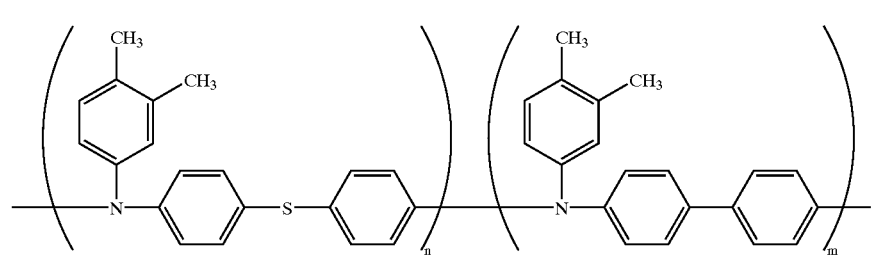
(24-13)
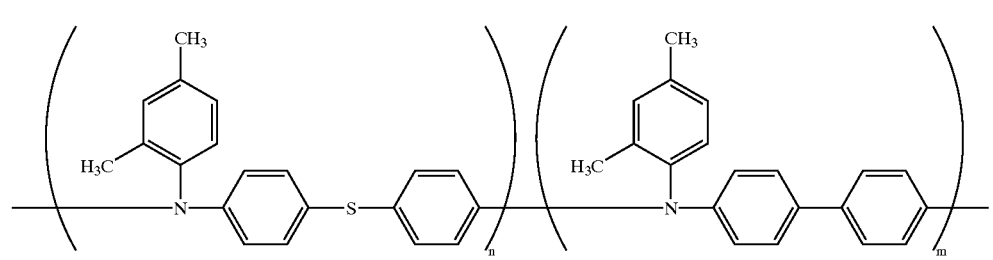
(24-14)

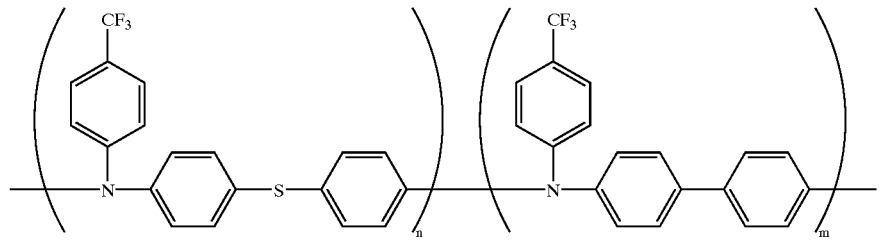
(24-15)
Of these, (24-1), (24-2), (24-3), (24-6), (24-7), (24-8), (24-9), (24-11), (24-12), (24-13) and (24-14) are preferred.
Specific examples of the high-molecular weight charge-transporting material having the repeating structural unit represented by the above formula (22) and the repeating structural unit represented by the above formula (23) are given below.
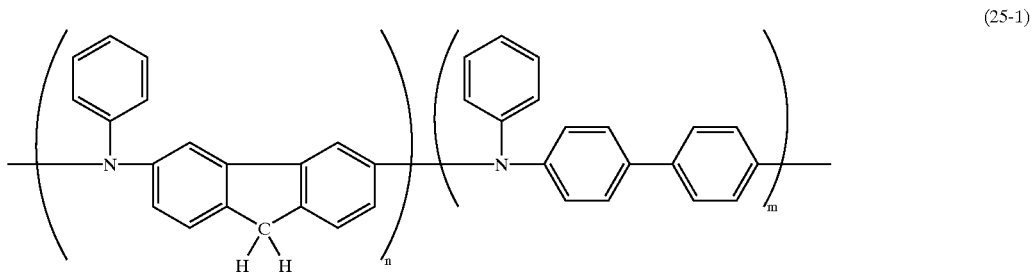
(25-1)
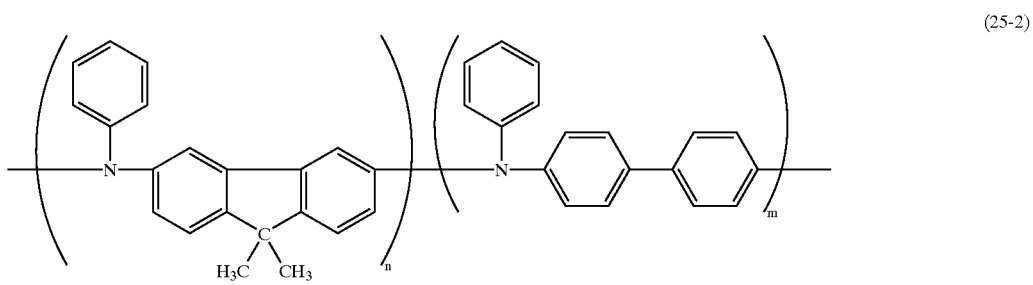
(25-2)
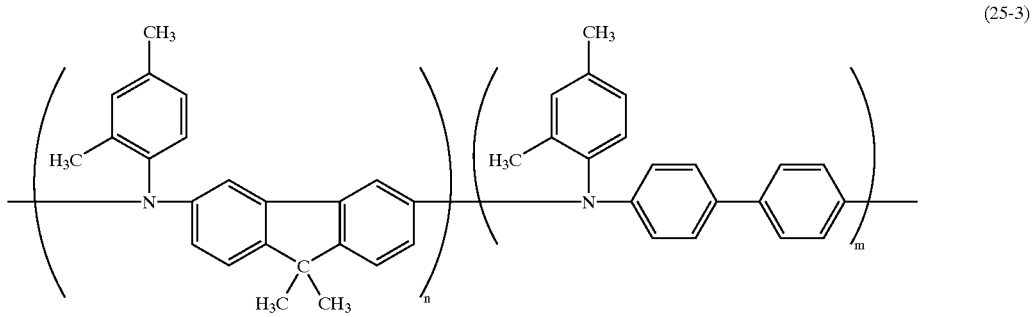
(25-3)
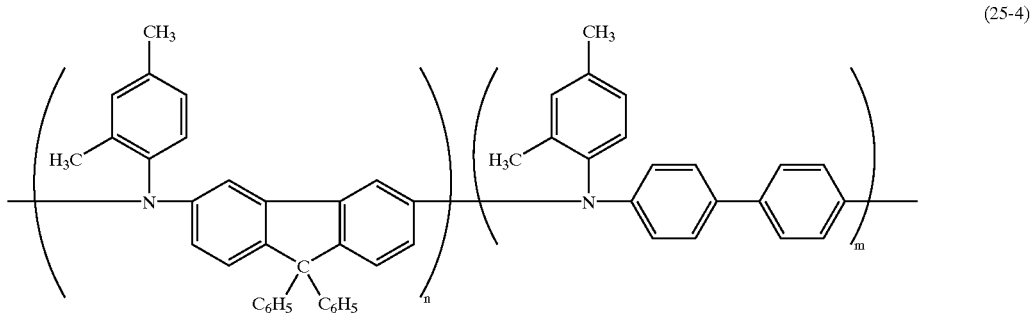
(25-4)

-continued
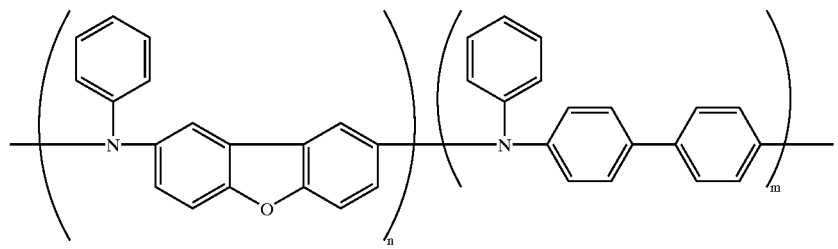
(25-5)
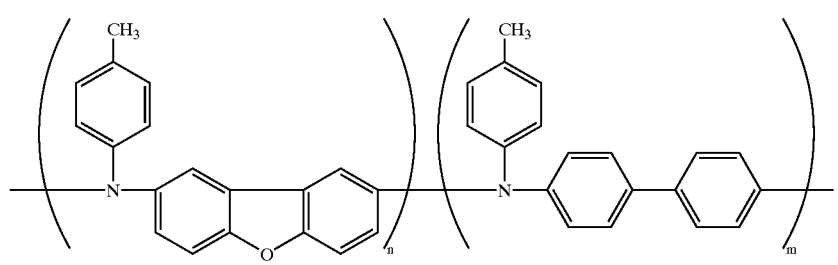
(25-6)
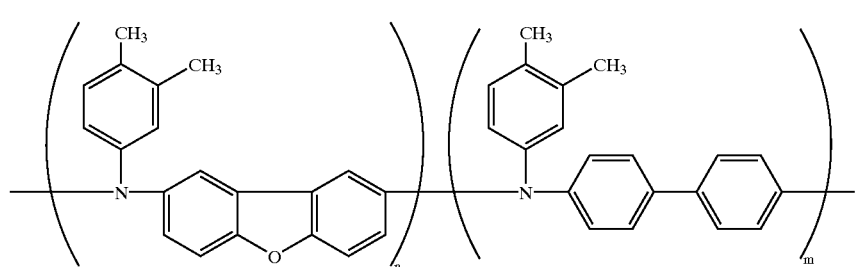
(25-7)
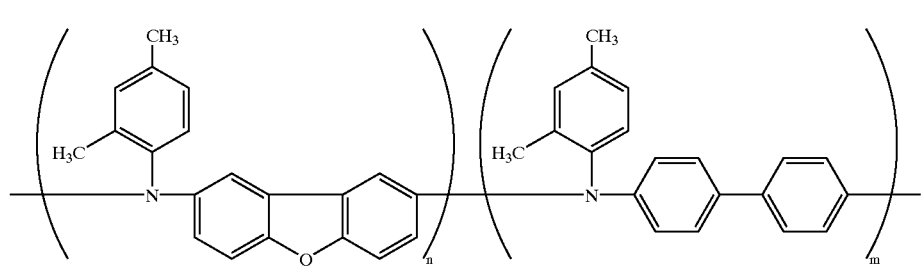
(25-8)
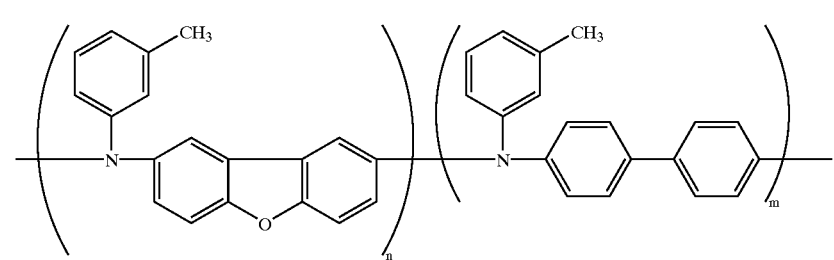
(25-9)
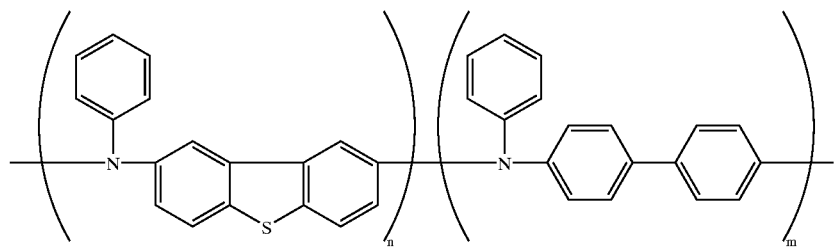
(25-10)

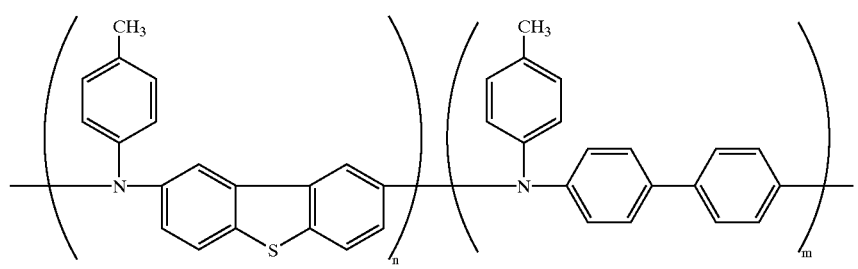
(25-11)
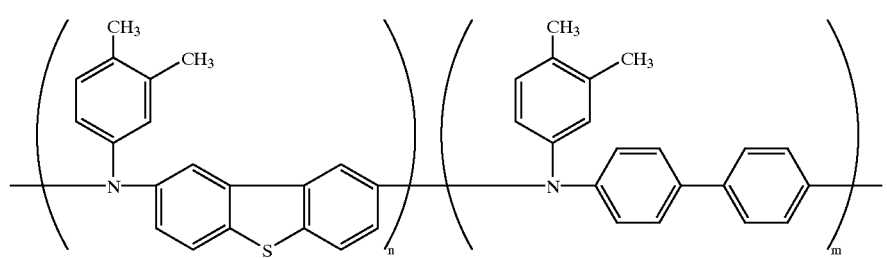
(25-12)
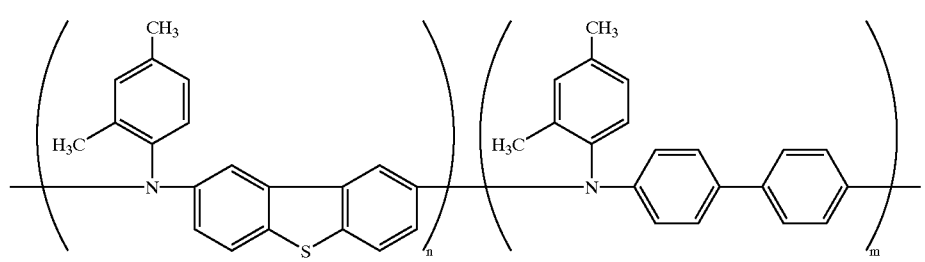
(25-13)
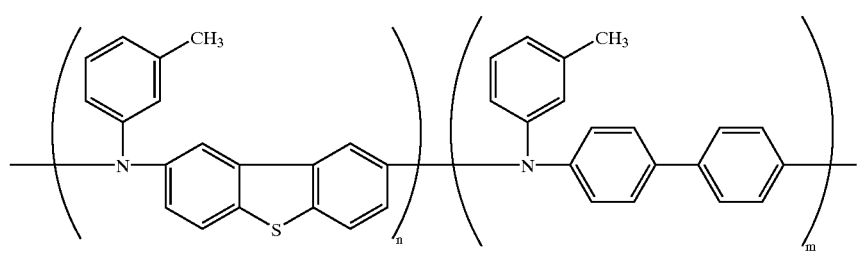
(25-14)
Of these, (25-2), (25-3), (25-4), (25-5), (25-6), (25-7), (25-8), (25-10), (25-11), (25-12) and (25-13) are preferred.
Specific examples of the high-molecular weight charge-transporting material having the repeating structural unit represented by the above formula (31) are given below.
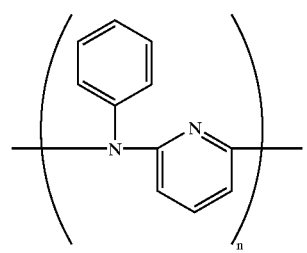
(31-1)
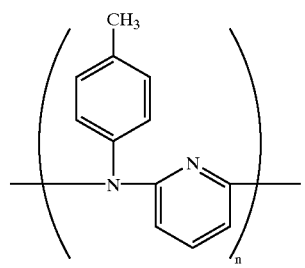
(31-2)
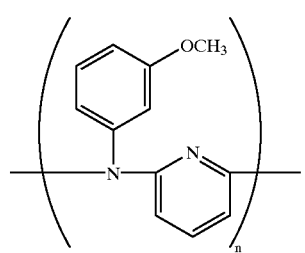
(31-3)

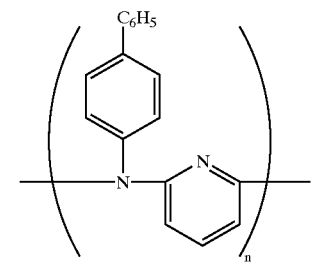 (31-4)
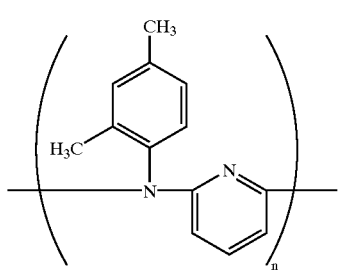 (31-5)
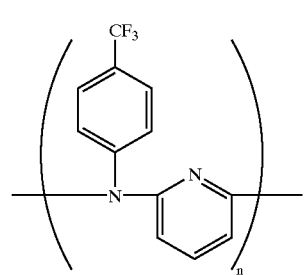 (31-6)
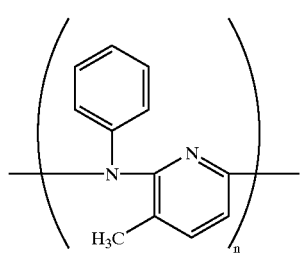 (31-7)
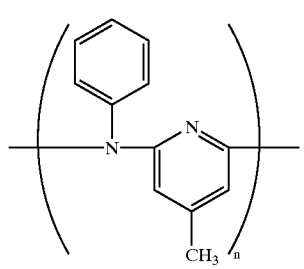 (31-8)
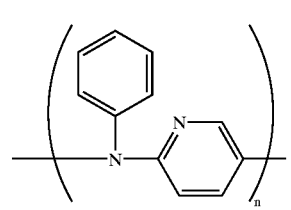 (31-9)
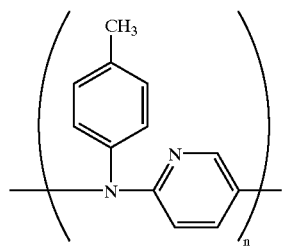 (31-10)
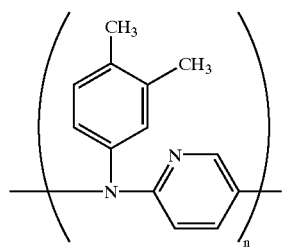 (31-11)
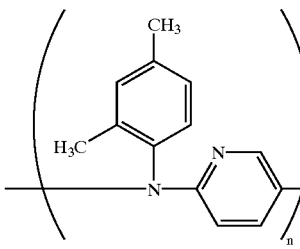 (31-12)
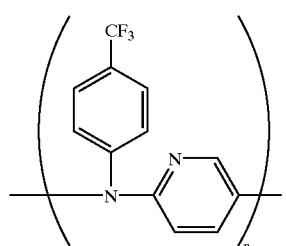 (31-13)
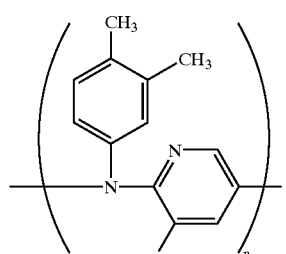 (31-14)
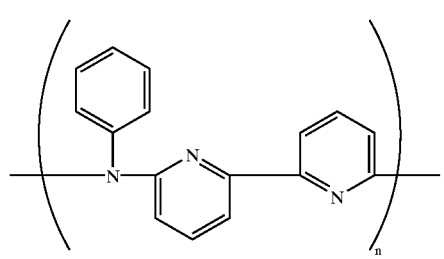 (31-15)

(31-16)
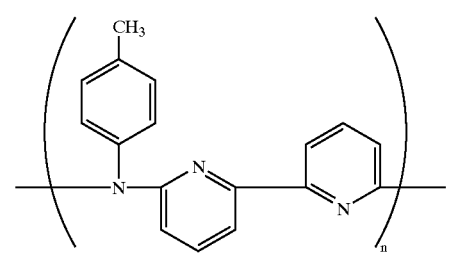
(31-17)
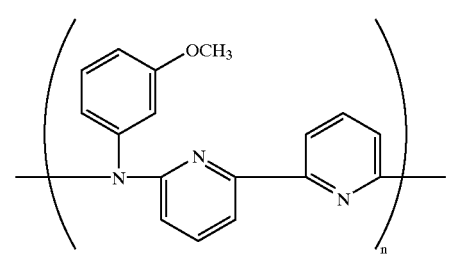
(31-18)
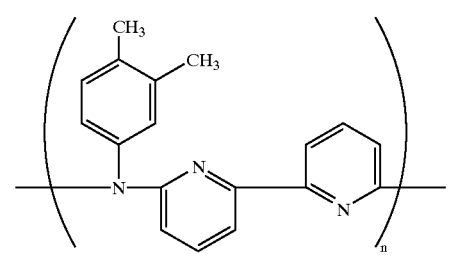
(31-19)
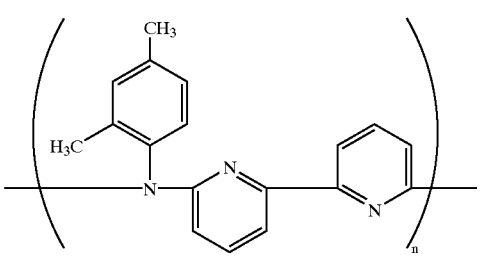
(31-20)
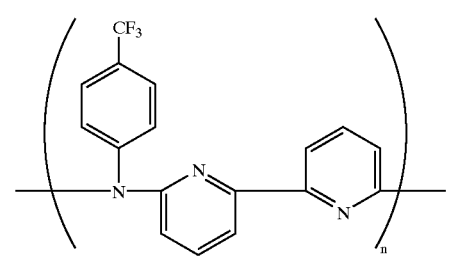
(31-21)
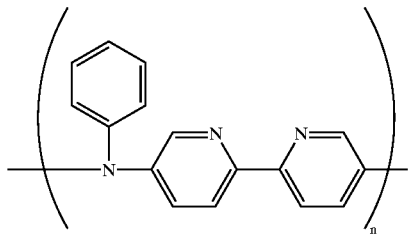
(31-22)
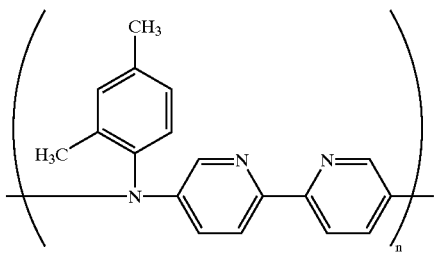
(31-23)
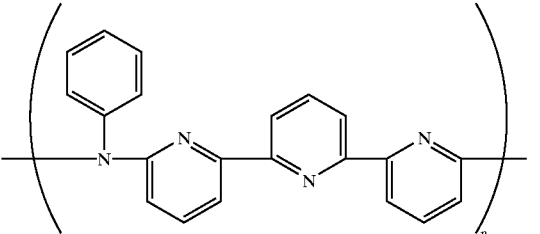
(31-24)
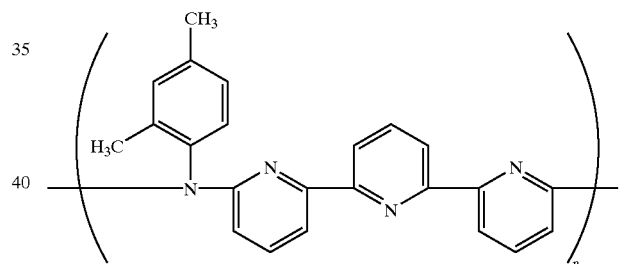
Of these, (31-1), (31-2), (31-5), (31-10), (31-11) and (31-12) are preferred.
Specific examples of the high-molecular weight charge-transporting material having the repeating structural unit represented by the above formula (31) and the repeating structural unit represented by the above formula (32) are given below.
(33-1)
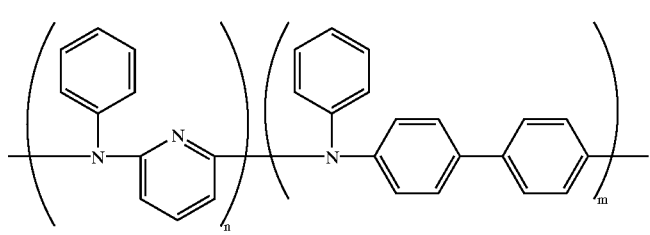

-continued
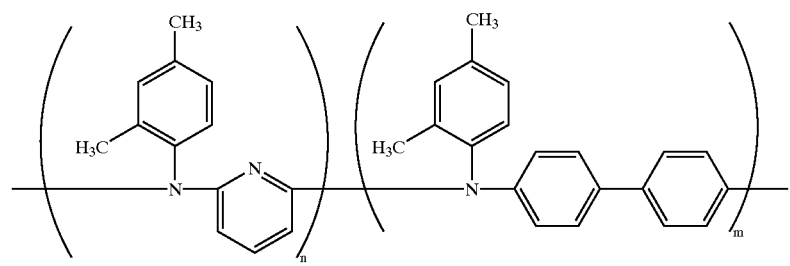 (33-2)
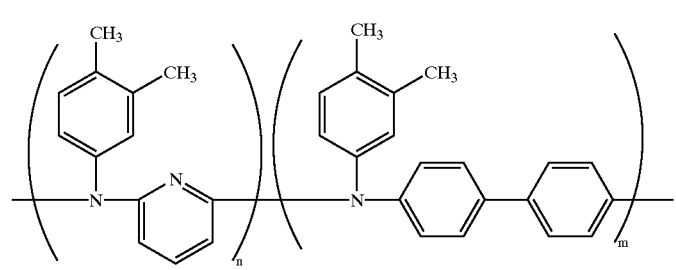 (33-3)
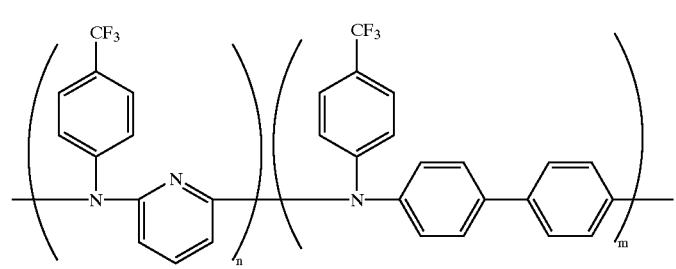 (33-4)
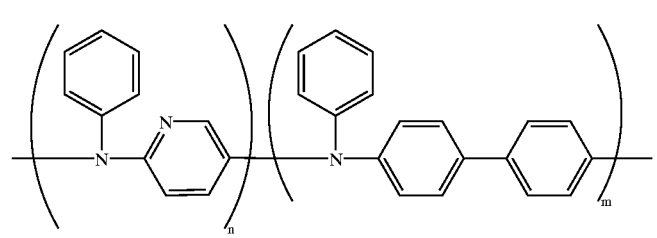 (33-5)
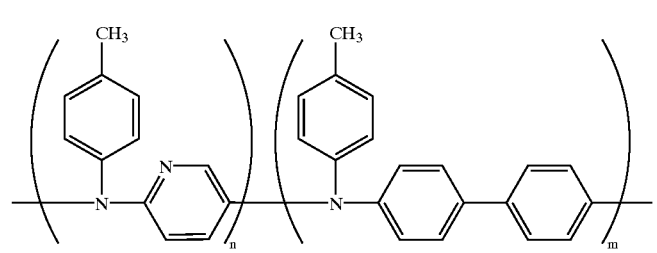 (33-6)
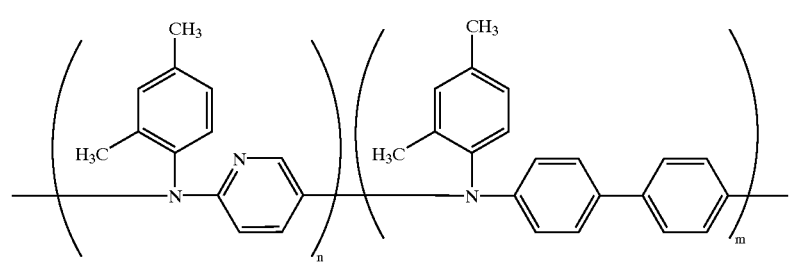 (33-7)

-continued
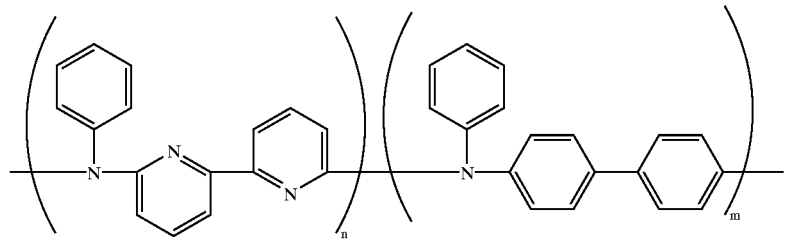
(33-8)
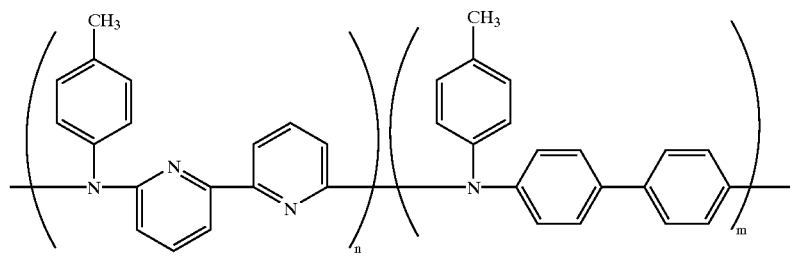
(33-9)
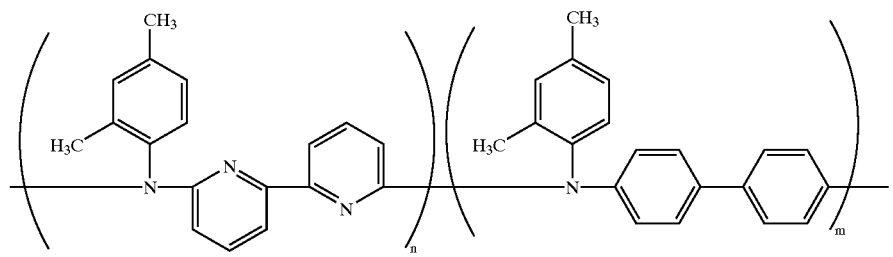
(33-10)
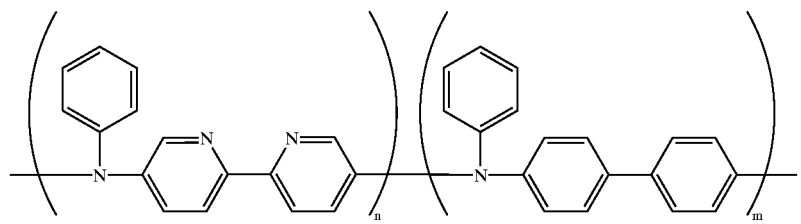
(33-11)
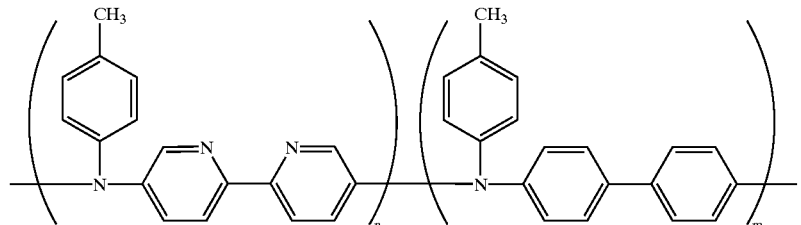
(33-12)
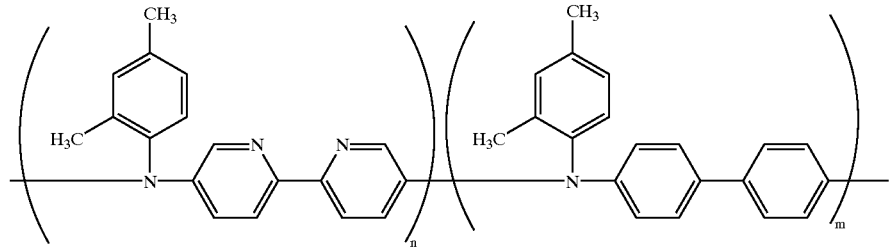
(33-13)

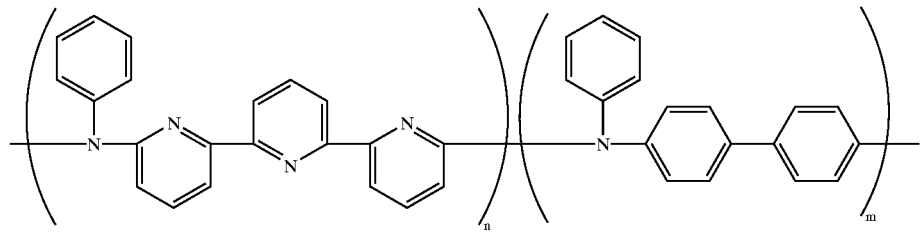
(33-14)
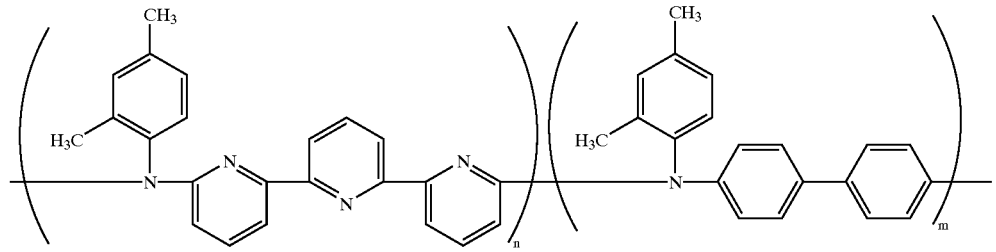
(33-15)
Of these, (33-1), (33-2), (33-3), (33-5) and (33-7) are preferred.
Specific examples of the high-molecular weight charge-transporting material having the repeating structural unit represented by the above formula (41) are given below.
(41-1)
-continued
(41-4)
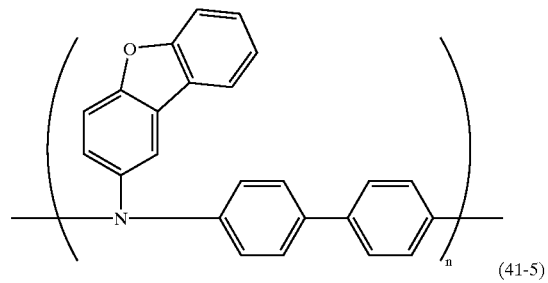
(41-2)
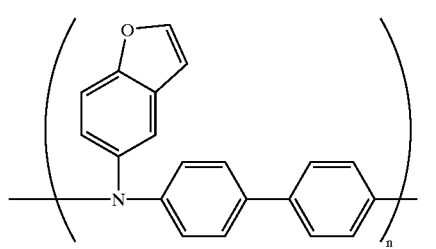
(41-5)
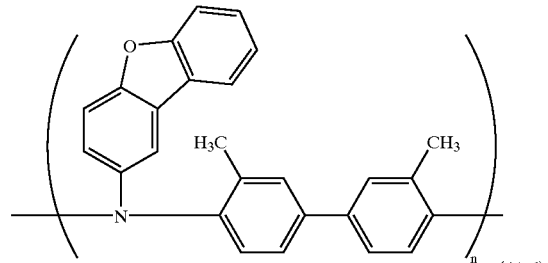
(41-3)
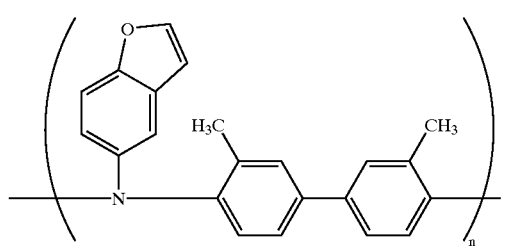
(41-6)
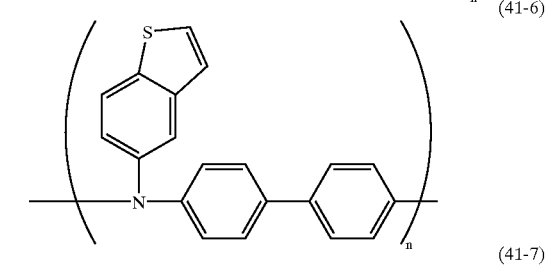
(41-7)
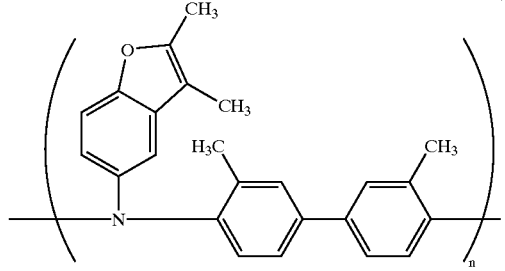
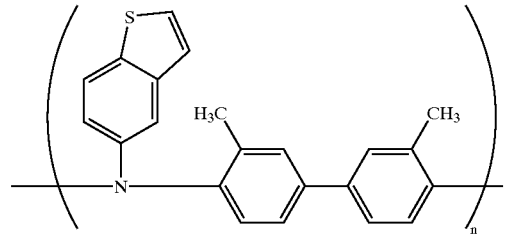

(41-8)
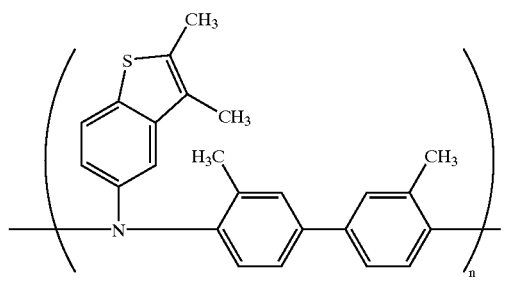
(41-9)
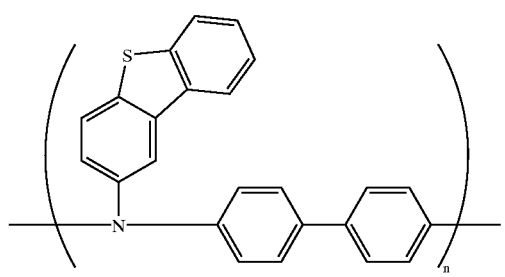
(41-10)
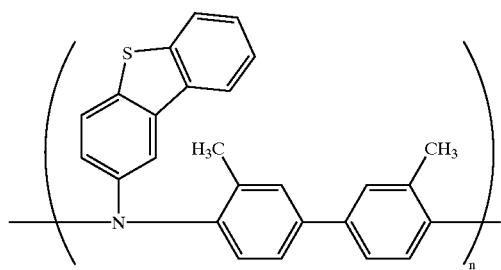
(41-11)
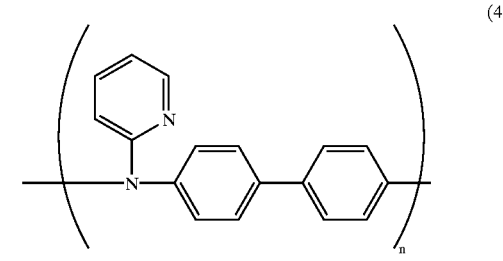
(41-12)
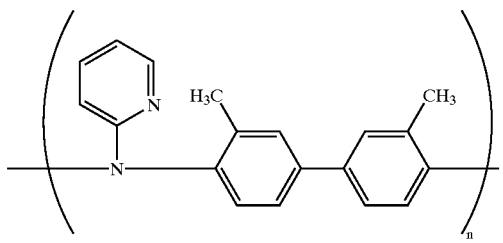
(41-13)
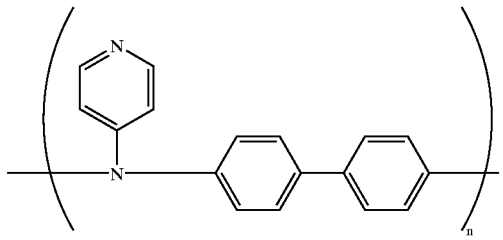
(41-14)
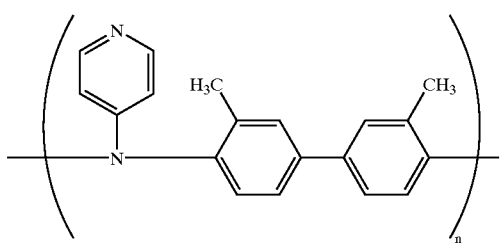
Of these, (41-1), (41-4), (41-6), (41-9) and (41-11) are preferred.
Specific examples of the high-molecular weight charge-transporting material having the repeating structural unit represented by the above formula (41) and the repeating structural unit represented by the above formula (42) are given below.
(43-1)
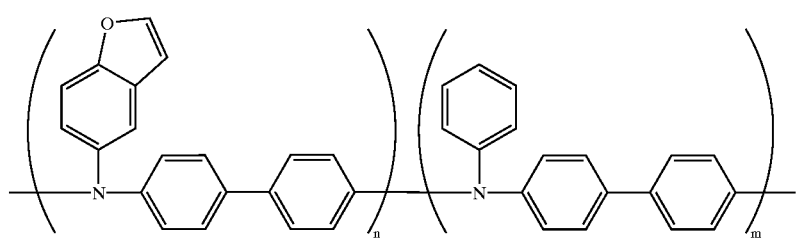

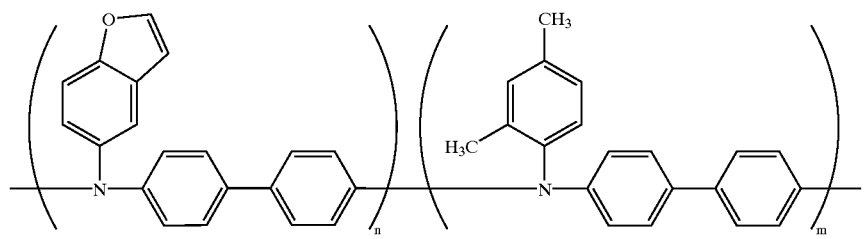
(43-2)
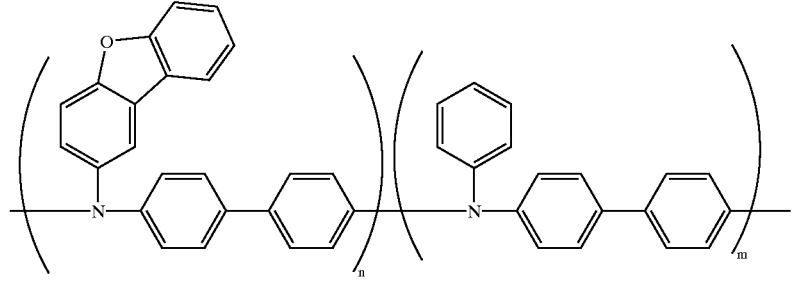
(43-3)
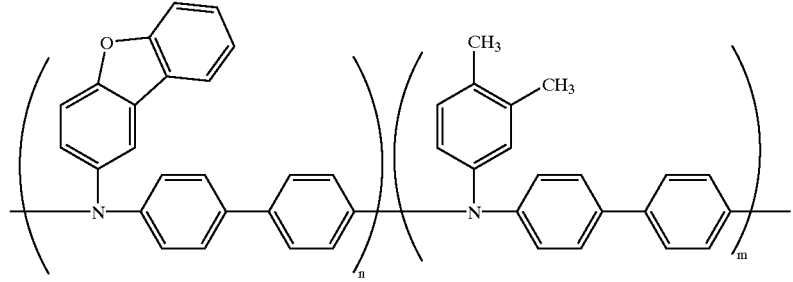
(43-4)
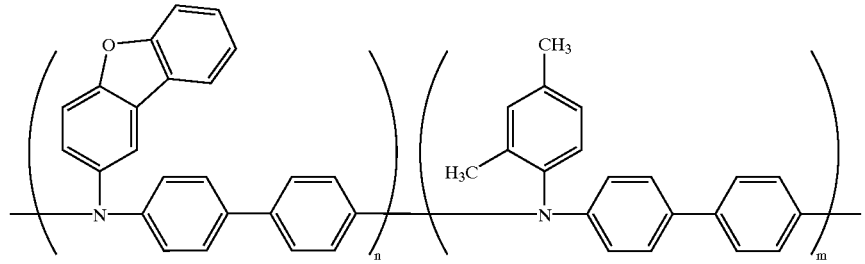
(43-5)
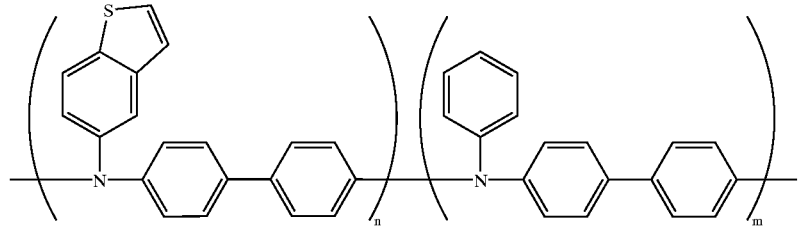
(43-6)
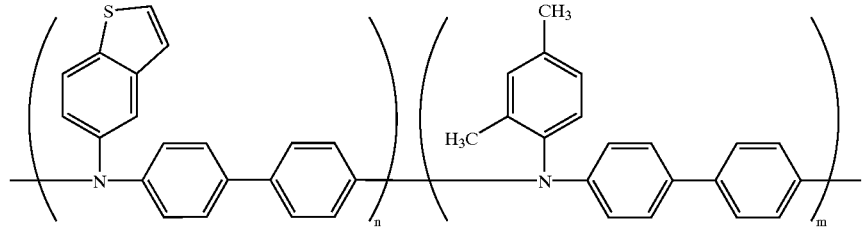
(43-7)

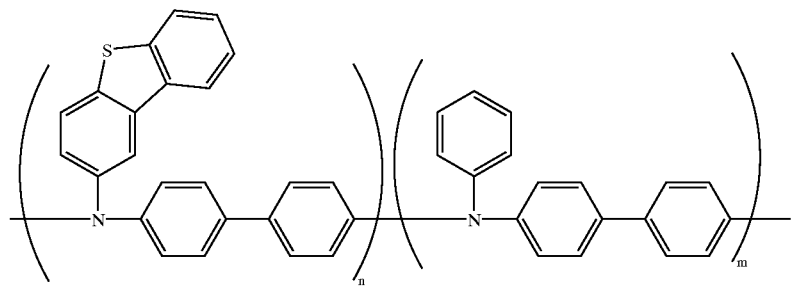
(43-8)
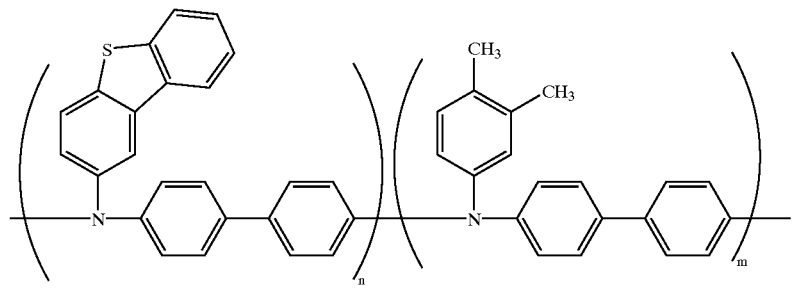
(43-9)
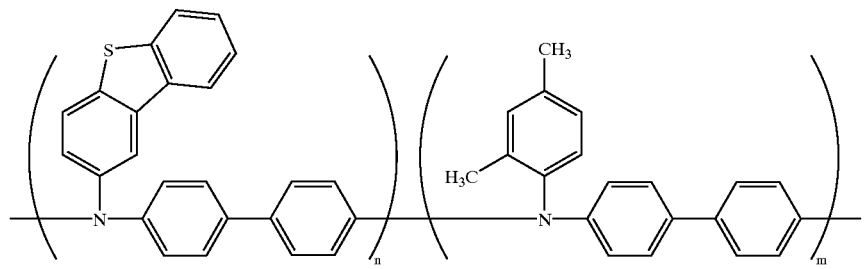
(43-10)
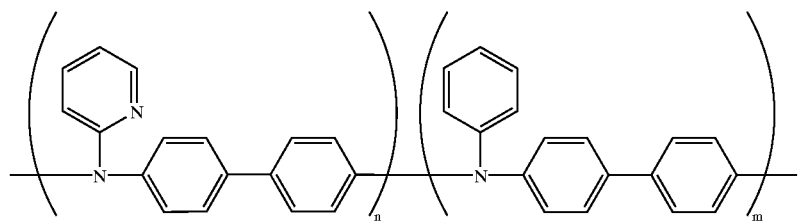
(43-11)
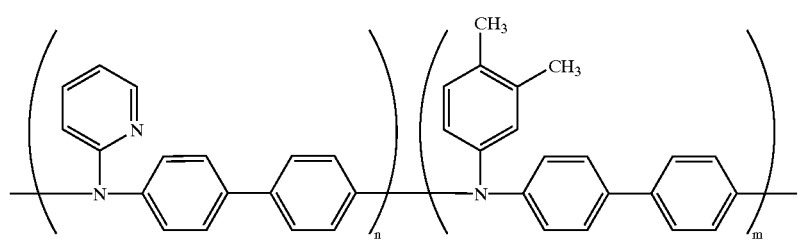
(43-12)
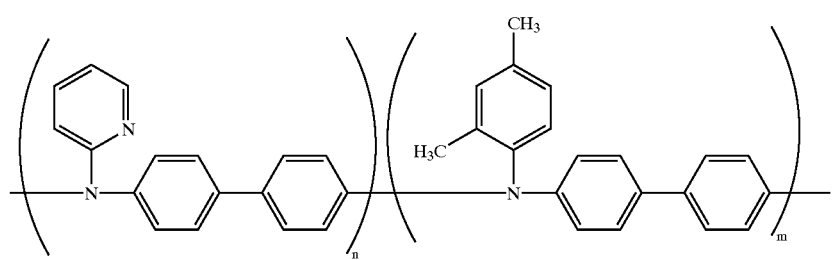
(43-13)

Of these, (43-3), (43-4), (43-5), (43-8), (43-9), (43-10), (43-11), (43-12) and (43-13) are preferred.
Specific examples of the high-molecular weight charge-transporting material having the repeating structural unit represented by the above formula (51) are given below.
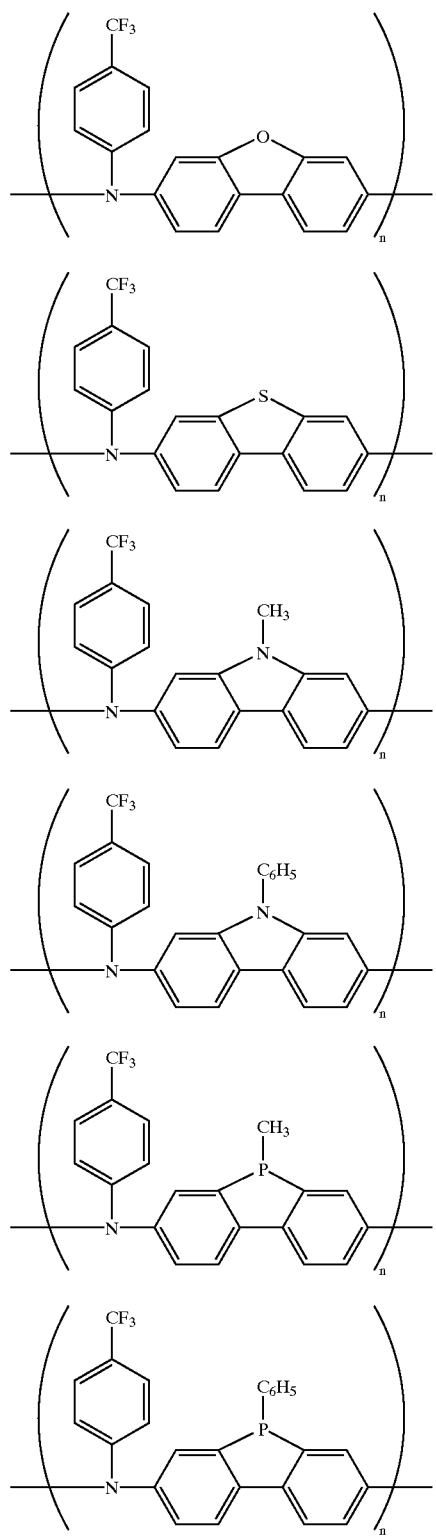
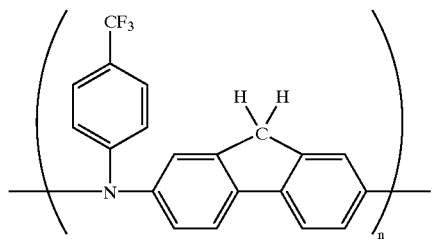
(51-7)
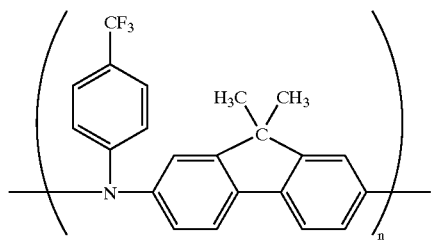
(51-8)
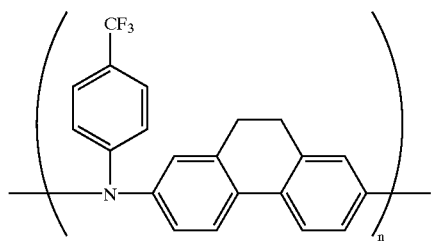
(51-9)
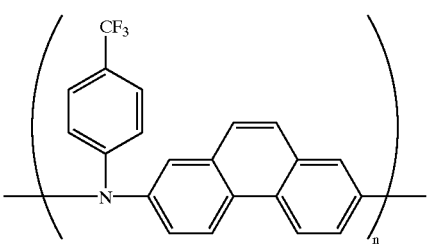
(51-10)
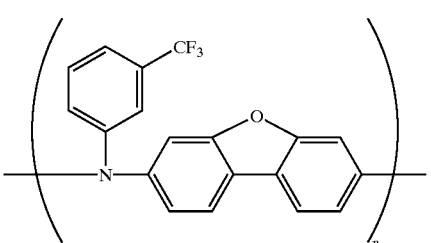
(51-11)
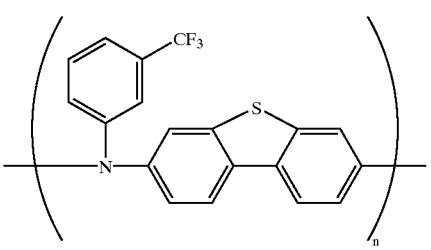
(51-12)

(51-13)
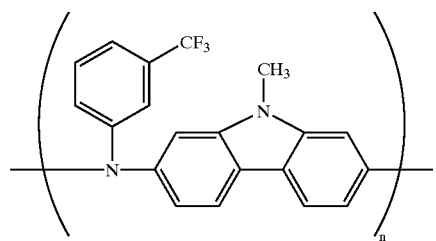
(51-14)
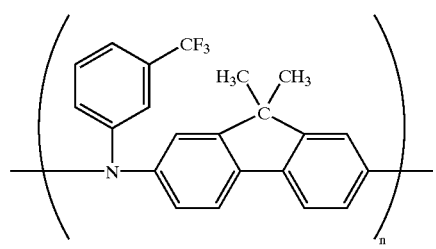
(51-15)
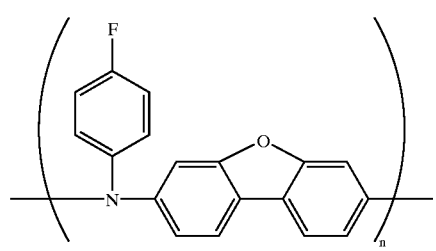
(51-16)
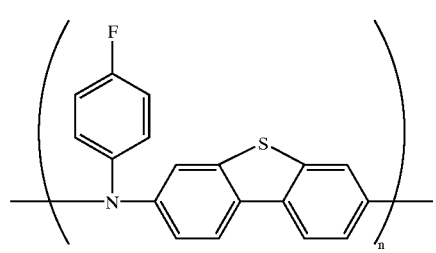
(51-17)
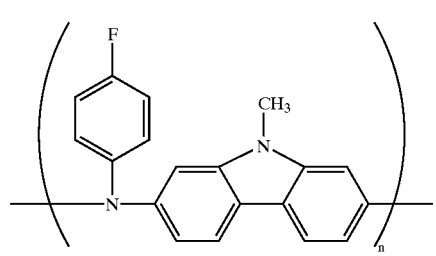
(51-18)
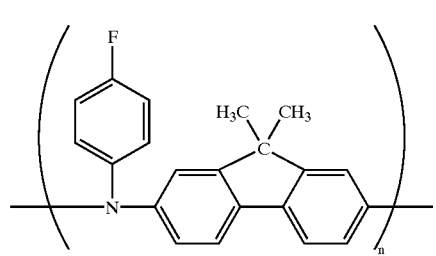
(51-19)
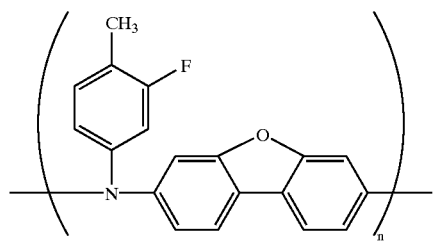
(51-20)
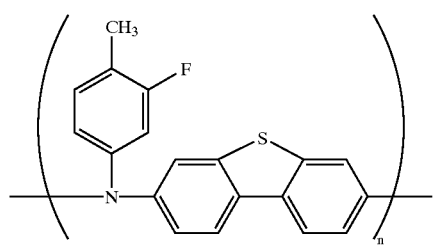
(51-21)
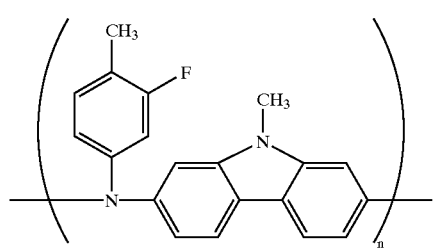
(51-22)
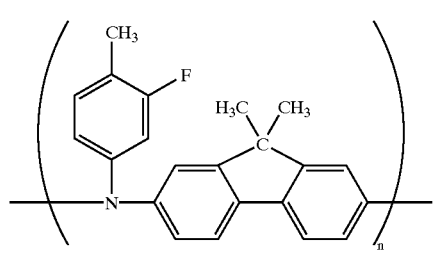
(51-23)
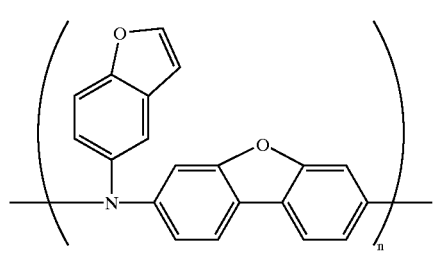
(51-24)
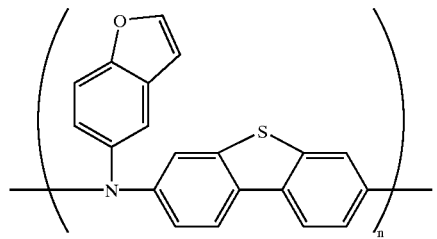

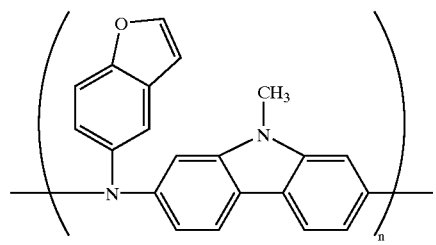
(51-25)
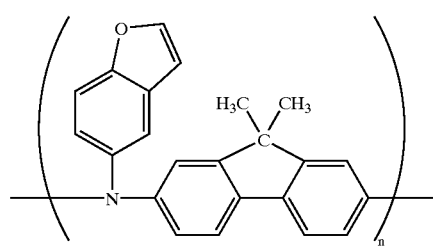
(51-26)
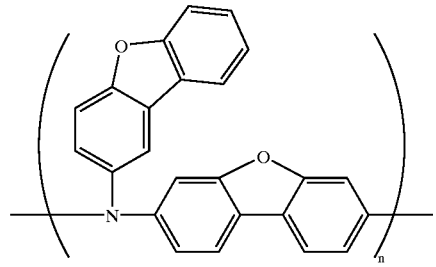
(51-27)
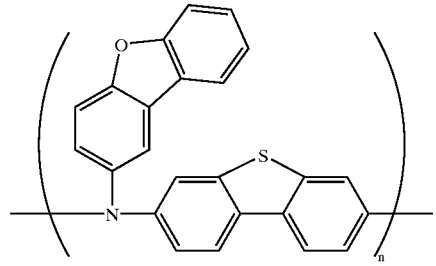
(51-28)
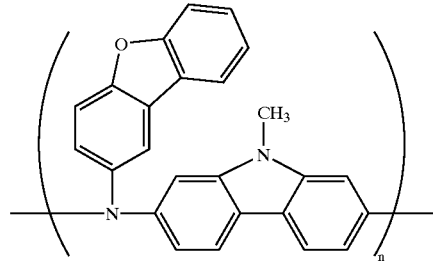
(51-29)
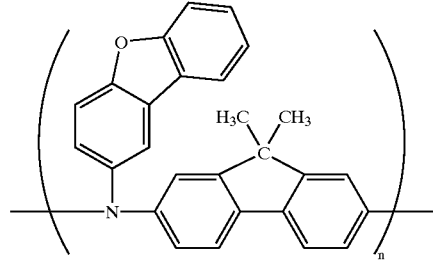
(51-30)
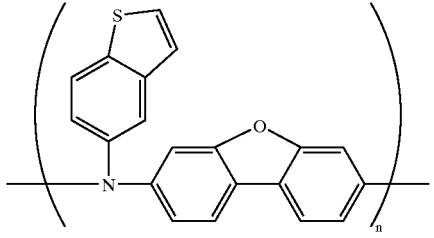
(51-31)
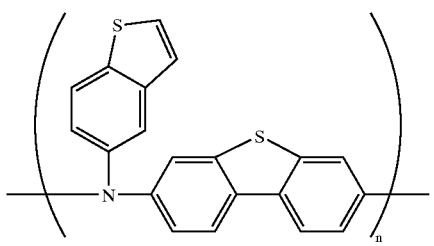
(51-32)
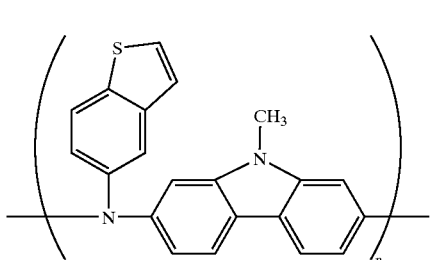
(51-33)
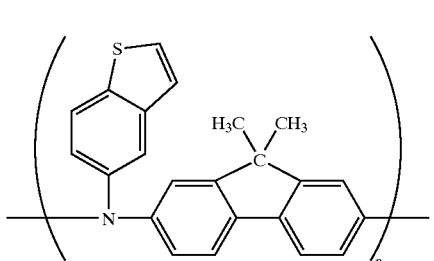
(51-34)
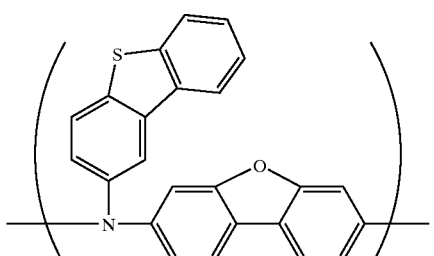
(51-35)
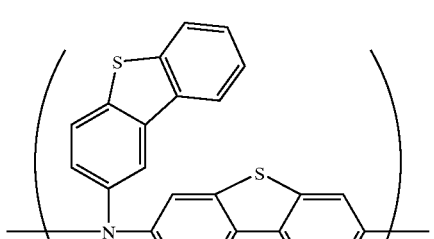
(51-36)

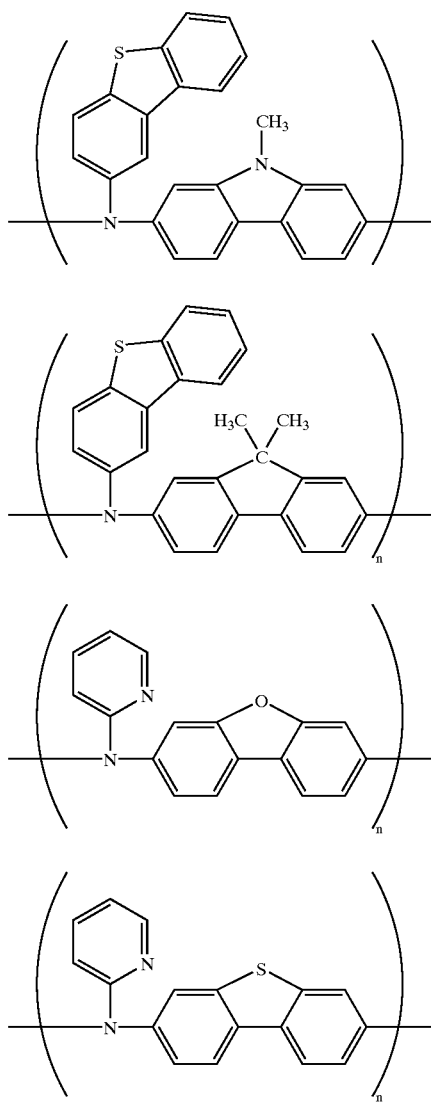
(51-37)
(51-38)
(51-39)
(51-40)
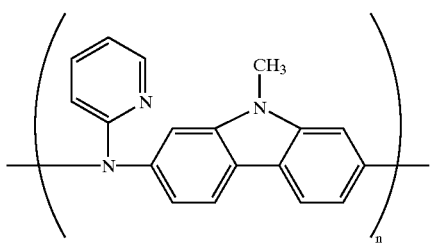
(51-41)
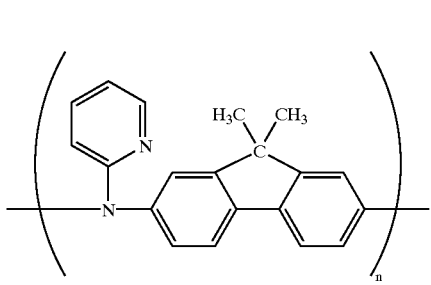
(51-42)
Of these, (51-1), (51-2), (51-3), (51-8), (51-10), (51-15), (51-16), (51-17), (51-18), (51-27), (51-28), (51-29), (51-30), (51-35), (51-36), (51-37), (51-38), (51-39), (51-40), (51-41) and (51-42) are preferred.
Specific examples of the high-molecular weight charge-transporting material having the repeating structural unit represented by the above formula (51) and the repeating structural unit represented by the above formula (52) are given below.
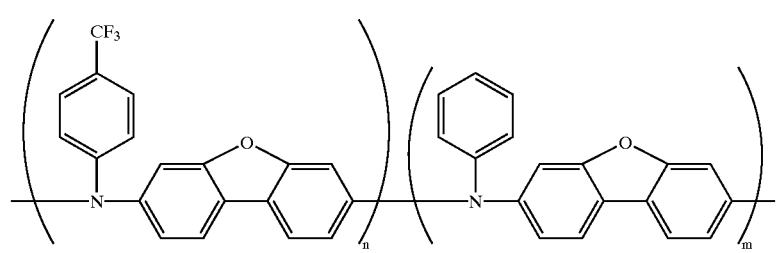
(56-1)
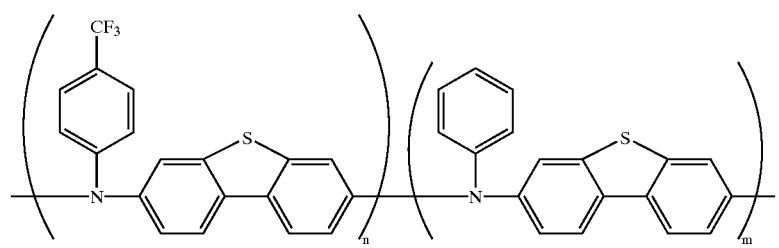
(56-2)

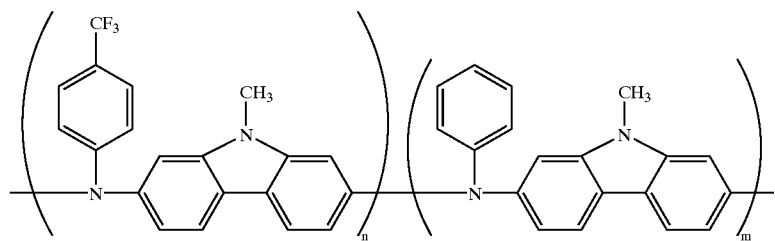
(56-3)
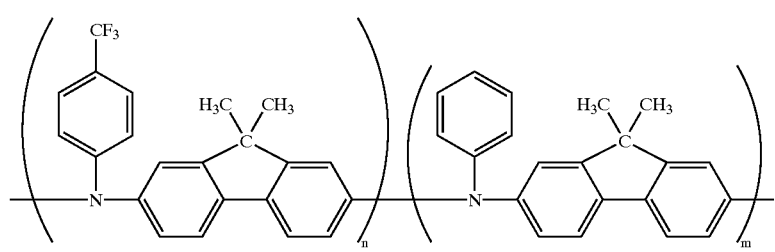
(56-4)
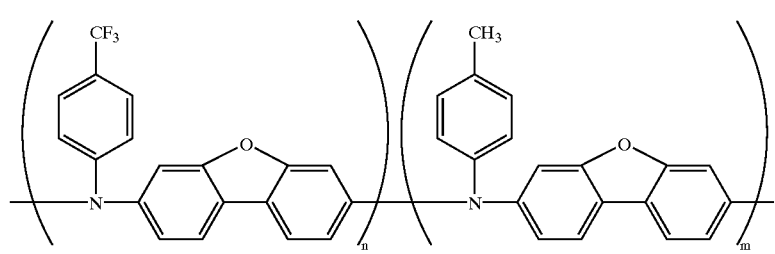
(56-5)
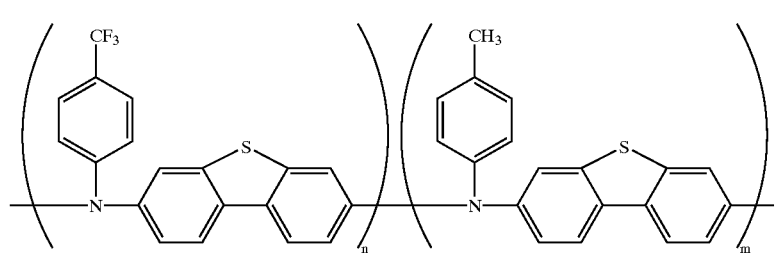
(56-6)
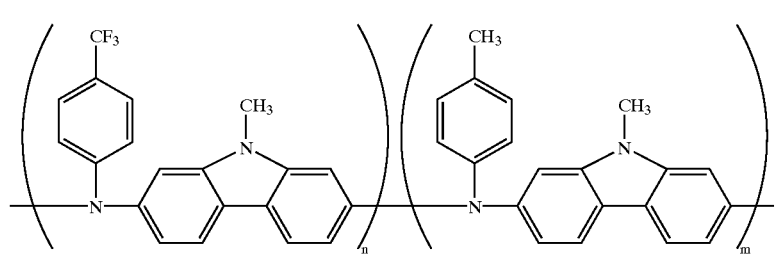
(56-7)
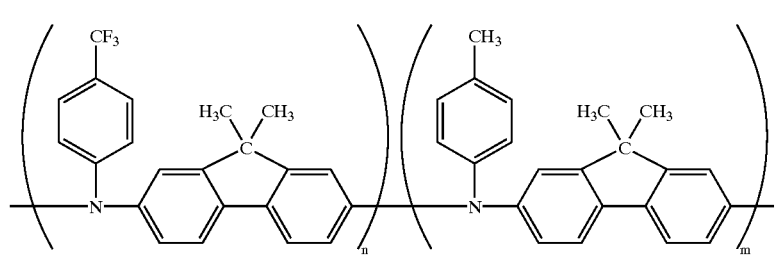
(56-8)

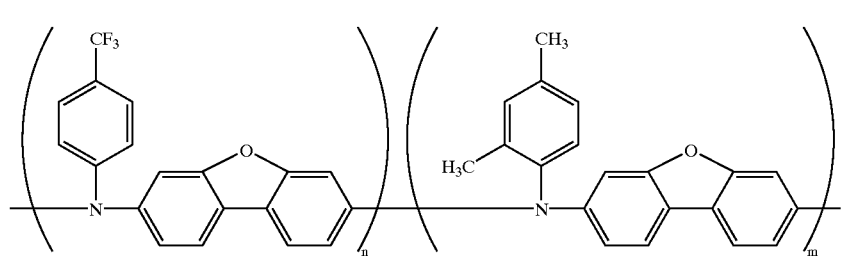
(56-9)
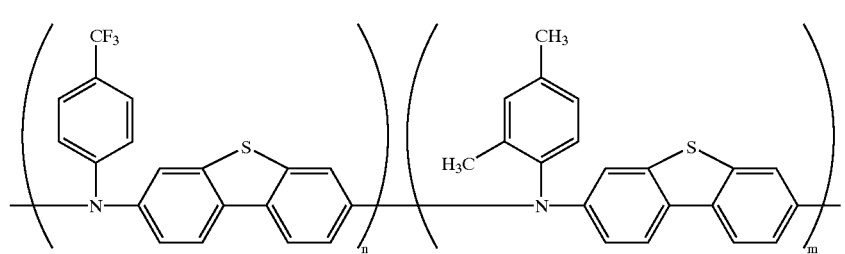
(56-10)
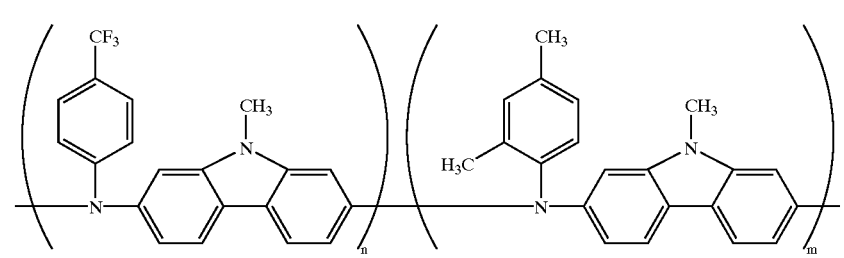
(56-11)
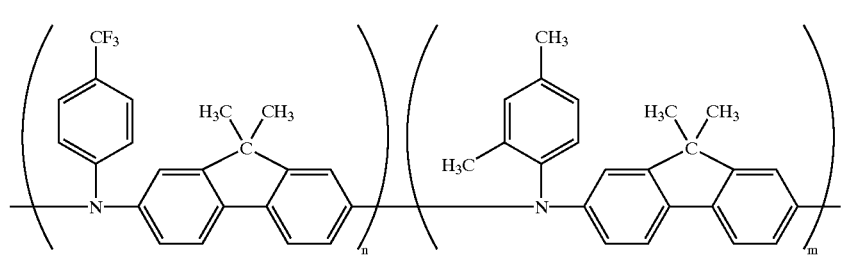
(56-12)
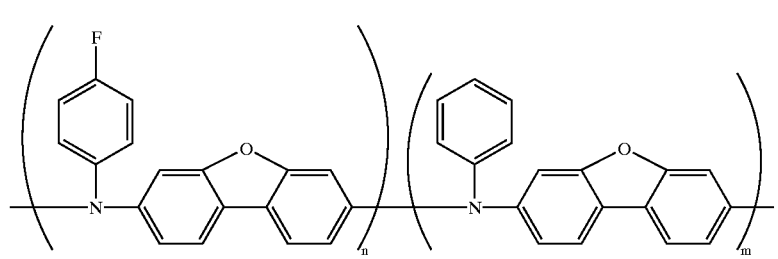
(56-13)
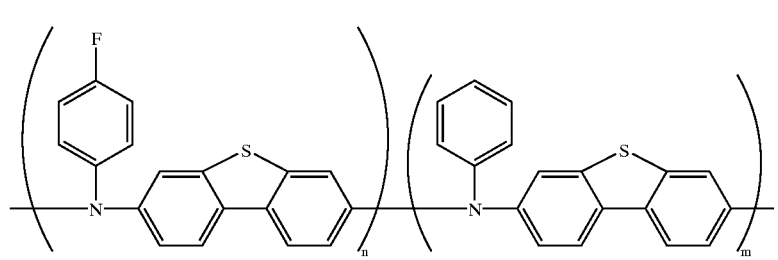
(56-14)

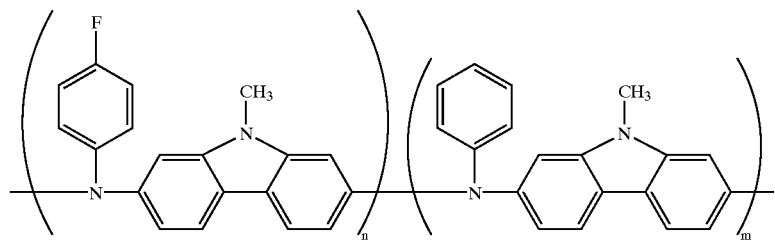 (56-15)
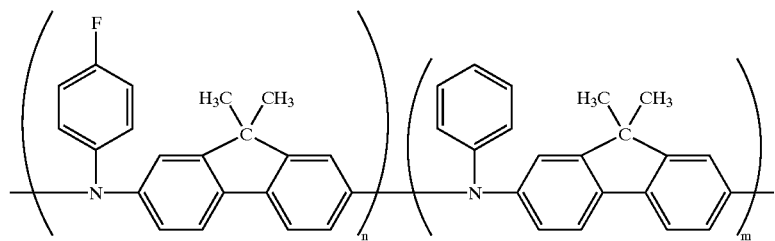 (56-16)
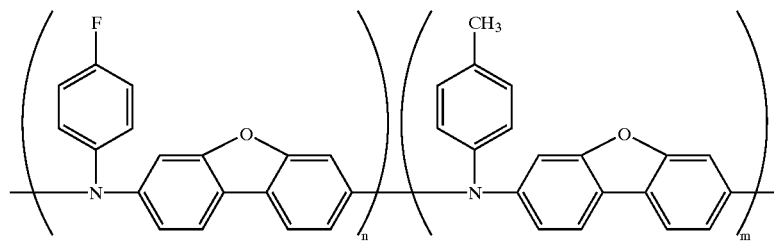 (56-17)
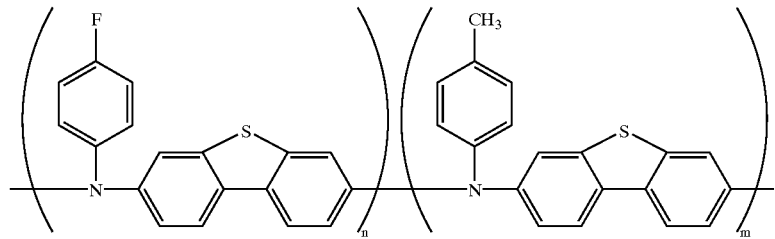 (56-18)
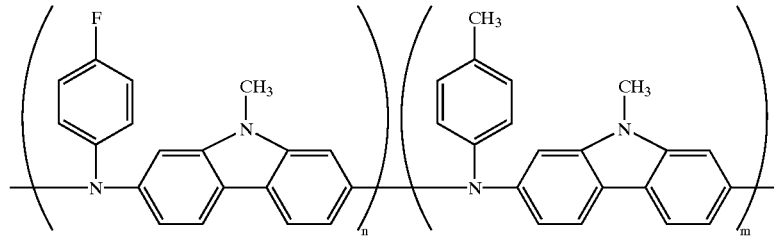 (56-19)
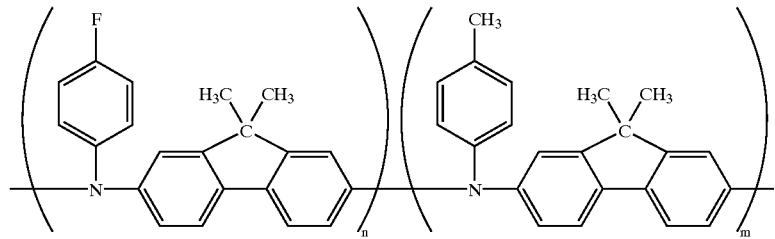 (56-20)

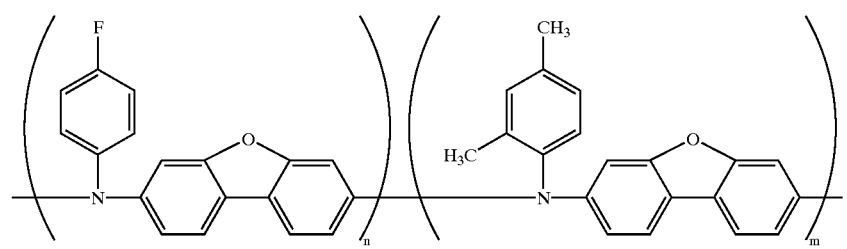
(56-21)
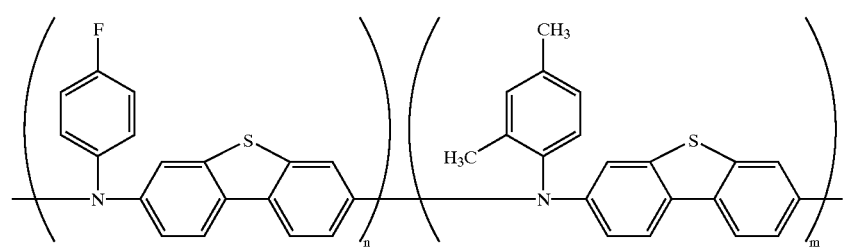
(56-22)
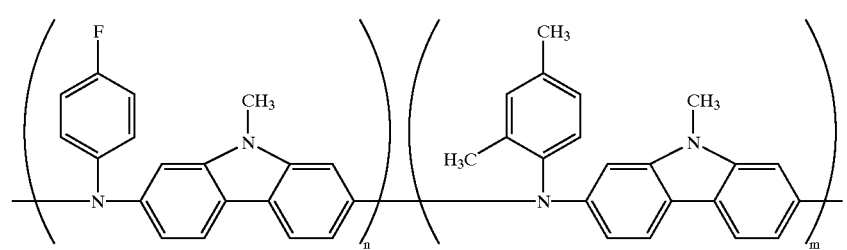
(56-23)
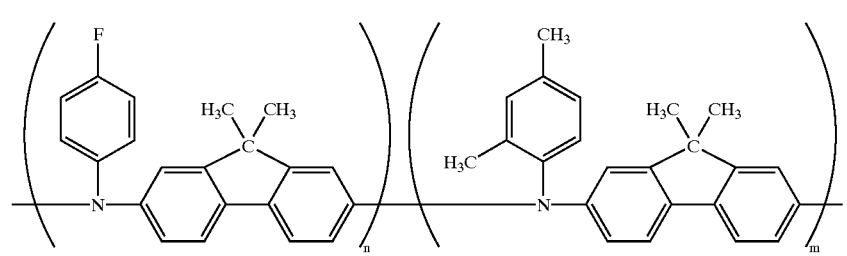
(56-24)
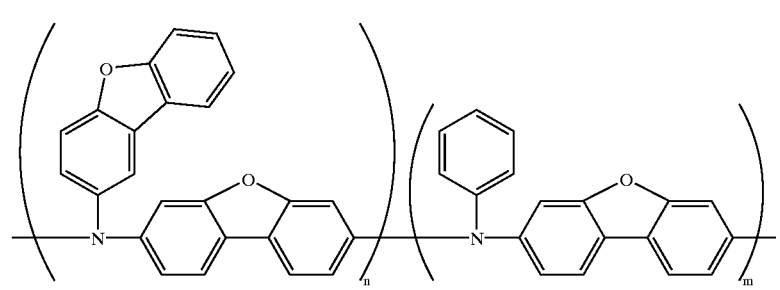
(56-25)
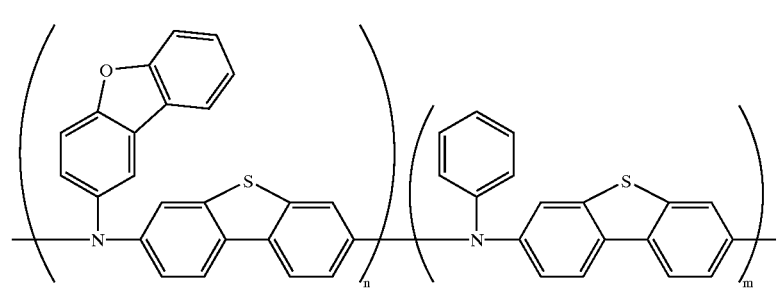
(56-26)

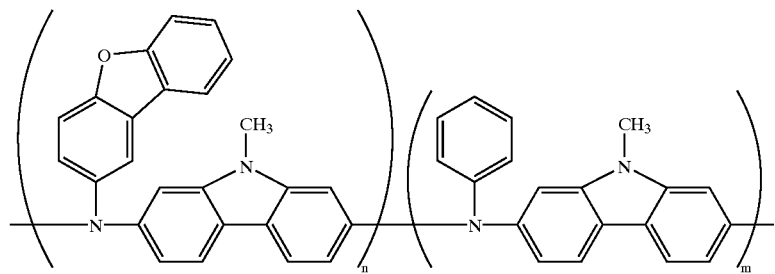
(56-27)
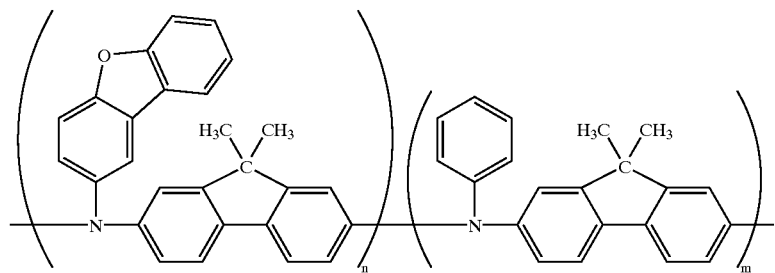
(56-28)
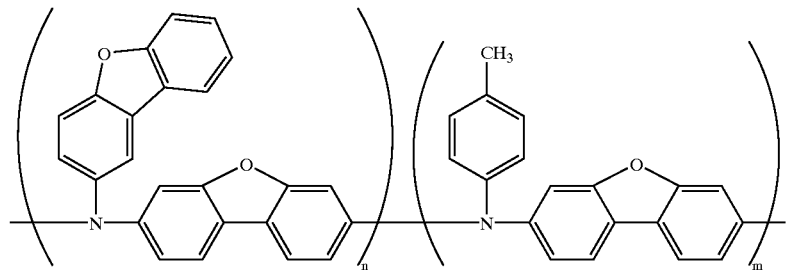
(56-29)
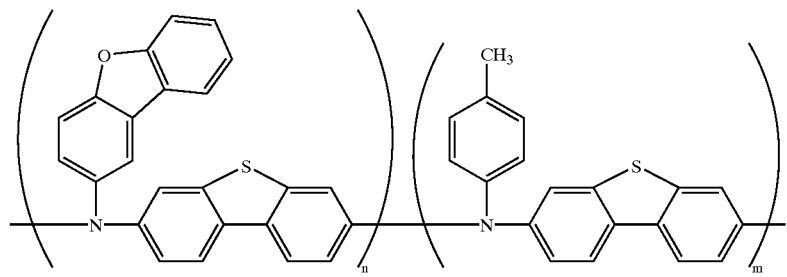
(56-30)
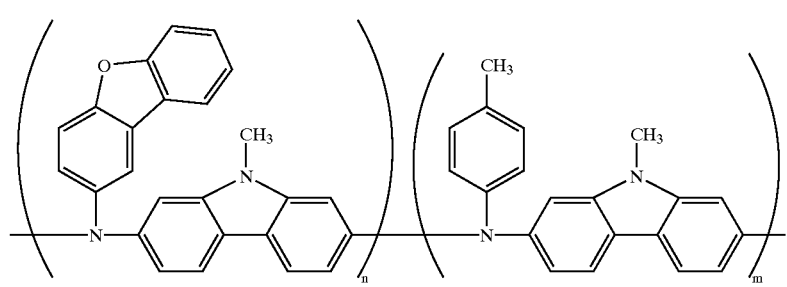
(56-31)

(56-32)
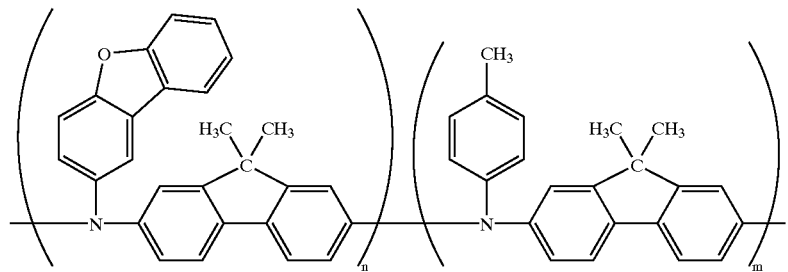
(56-33)
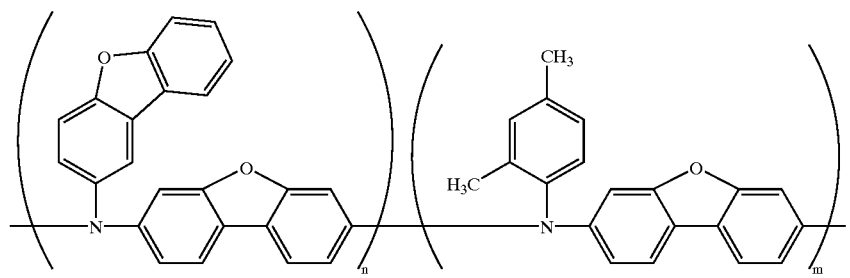
(56-34)
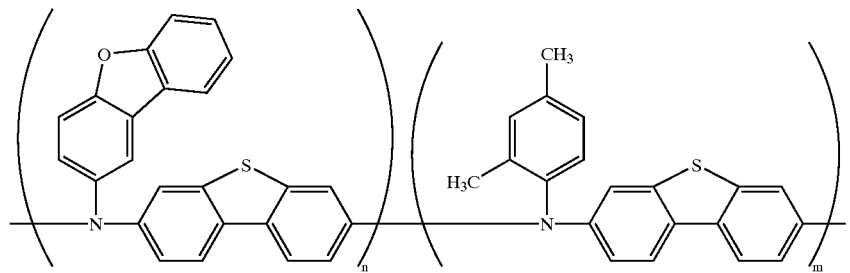
(56-35)
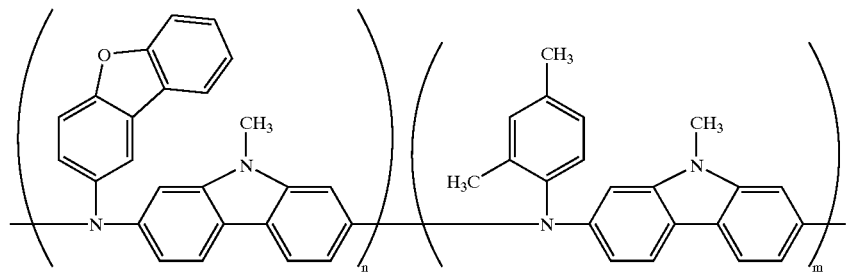
(56-36)
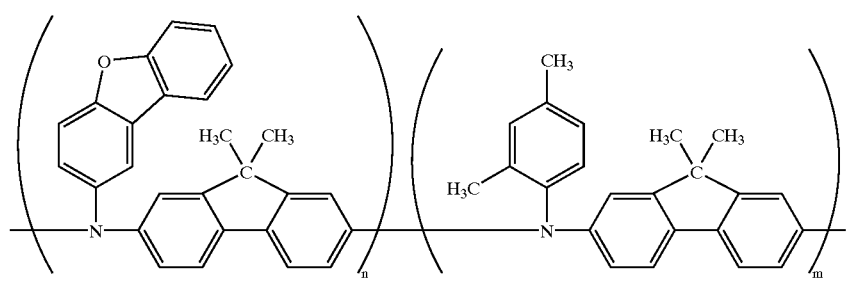

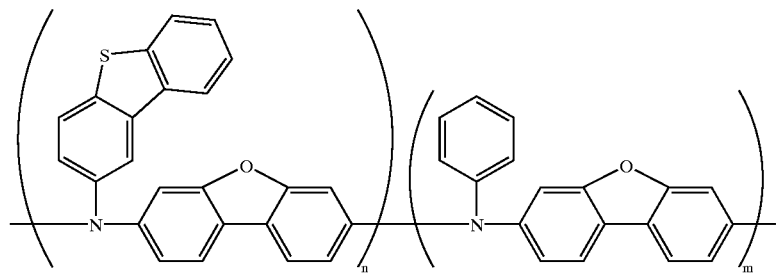
(56-37)
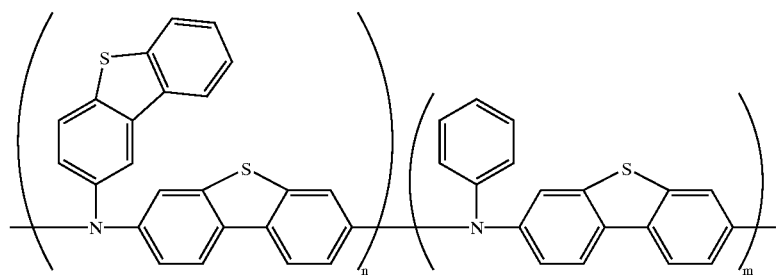
(56-38)
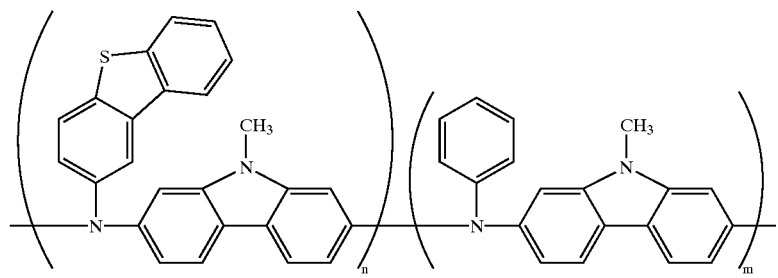
(56-39)
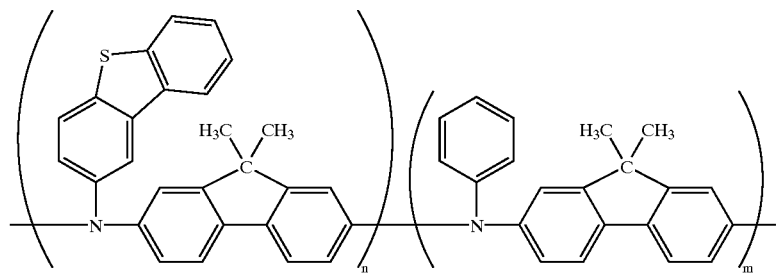
(56-40)
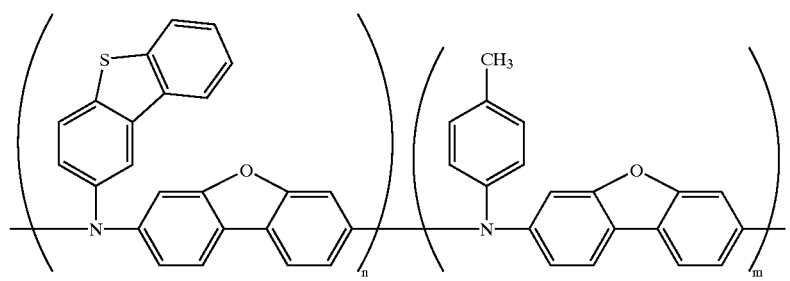
(56-41)

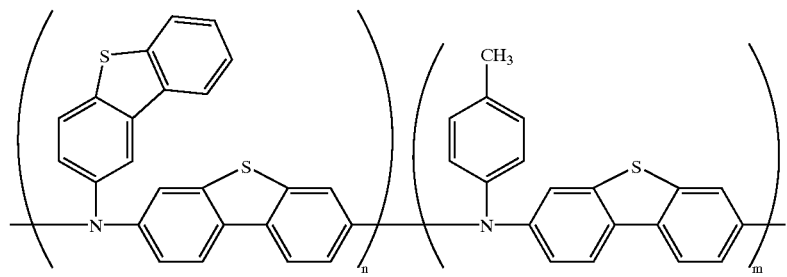
(56-42)
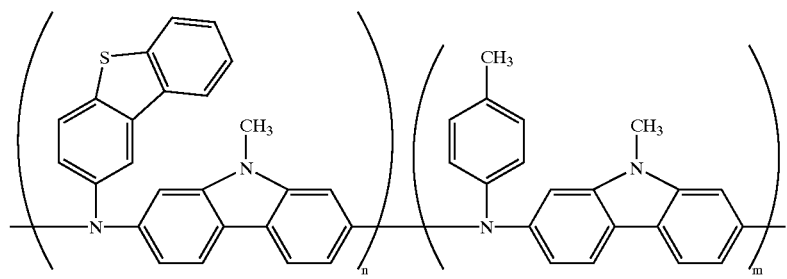
(56-43)
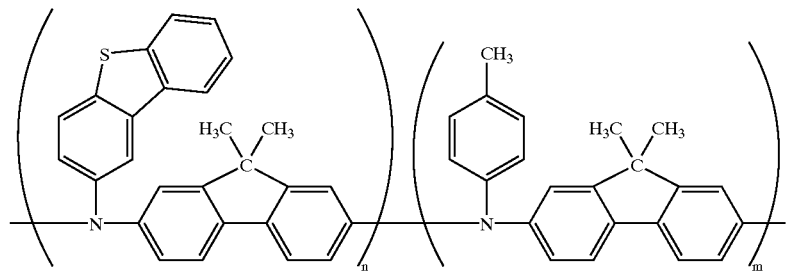
(56-44)
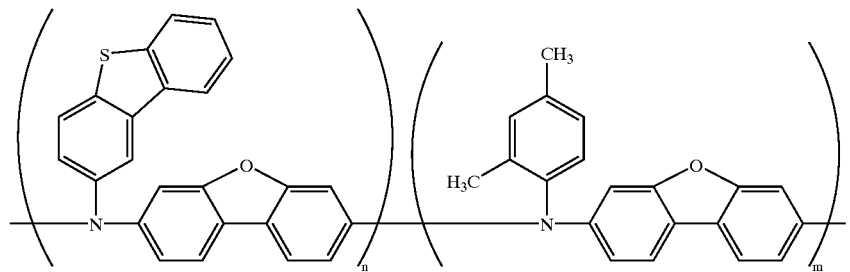
(56-45)
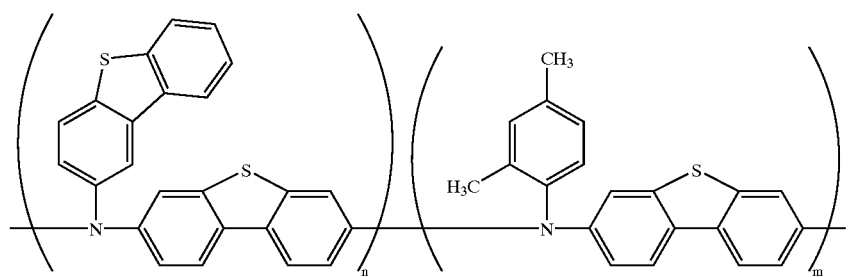
(56-46)

(56-47)
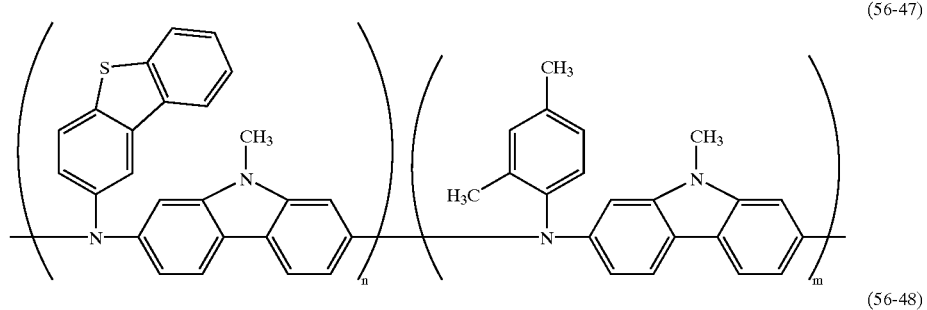
(56-48)
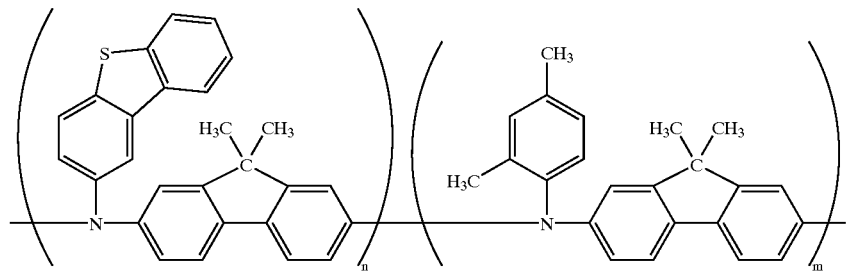
Of these, (56-1), (56-2), (56-3), (56-4), (56-9), (56-10), (56-11), (56-12), (56-25), (56-27), (56-28), (56-33), (56-35), (56-36), (56-38), (56-39), (56-40), (56-46), (56-47) and (56-48) are preferred.
Specific examples of the high-molecular weight charge-transporting material having the repeating structural unit represented by the above formula (51) and the repeating structural unit represented by the above formula (53) are given below.
(57-1)
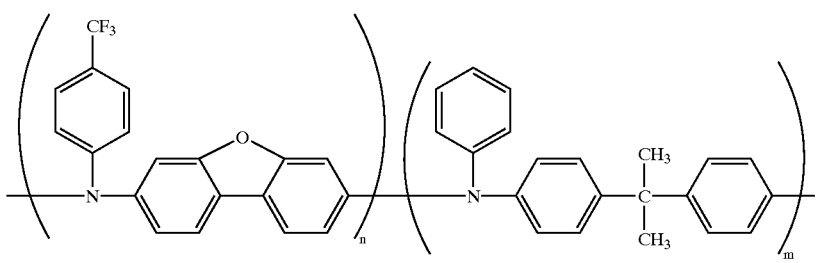
(57-2)
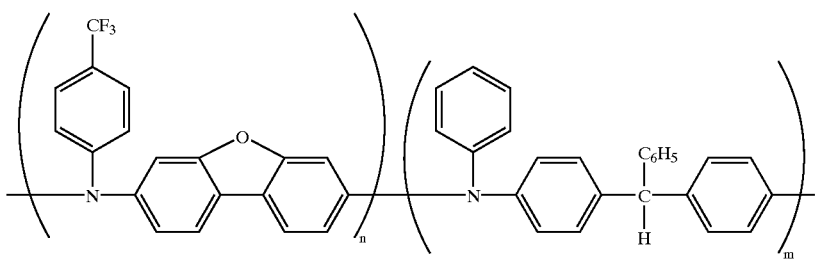
(57-3)
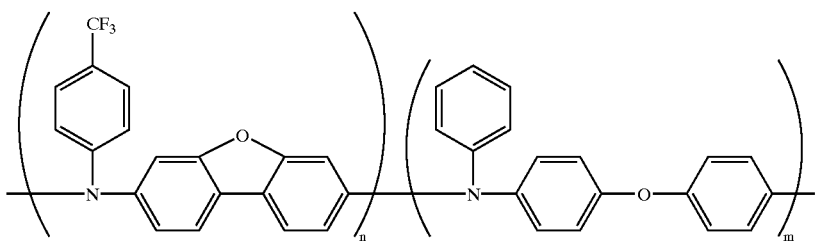

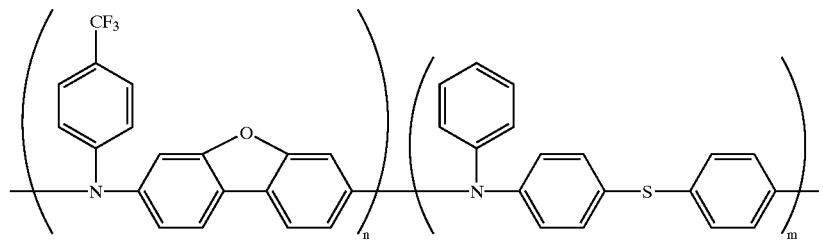
(57-4)
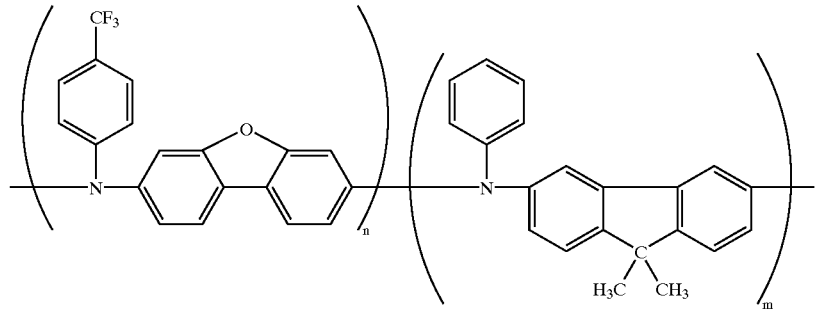
(57-5)
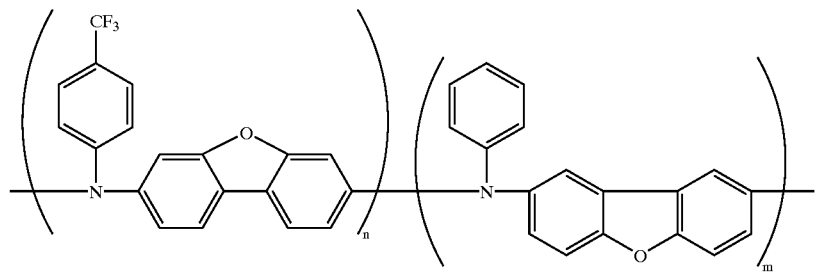
(57-6)
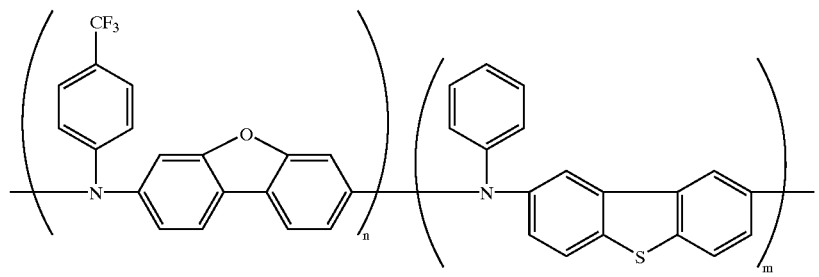
(57-7)
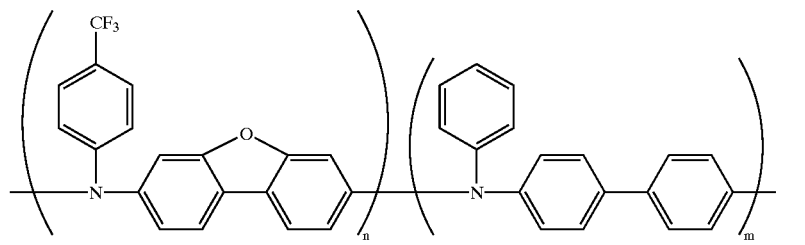
(57-8)
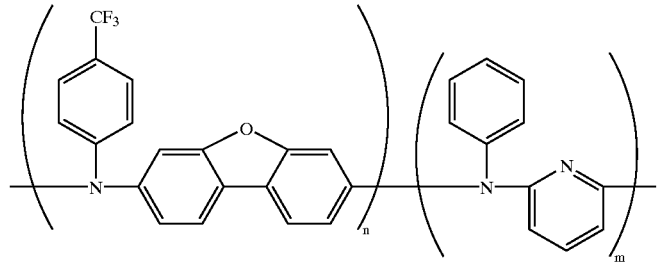
(57-9)

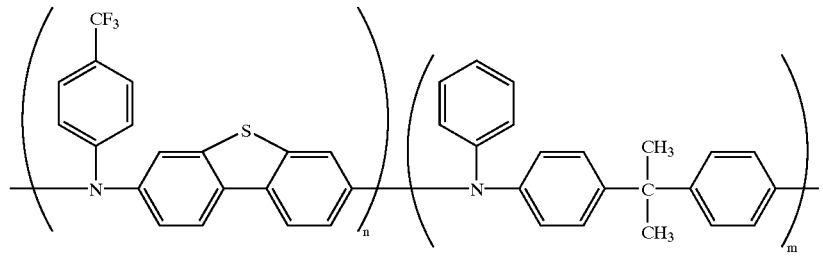
(57-10)
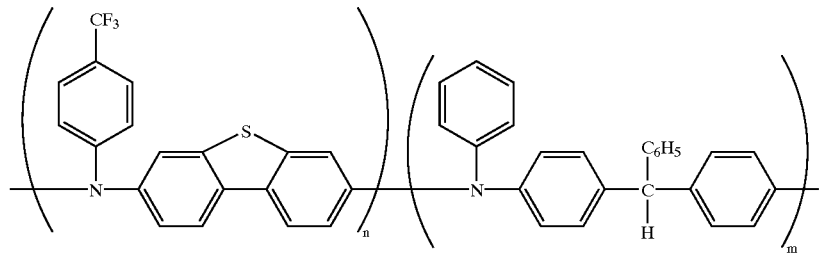
(57-11)
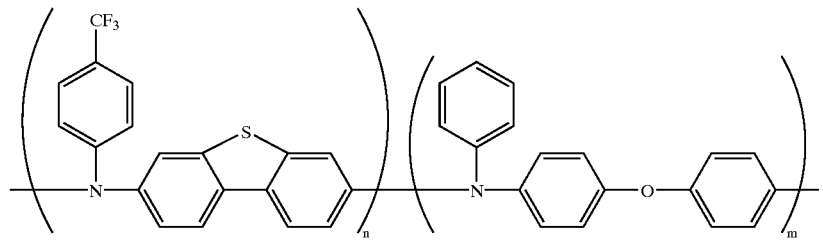
(57-12)
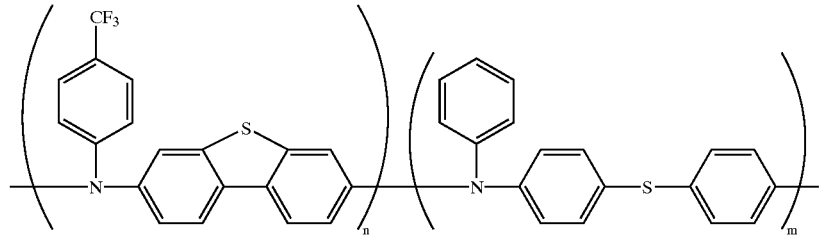
(57-13)
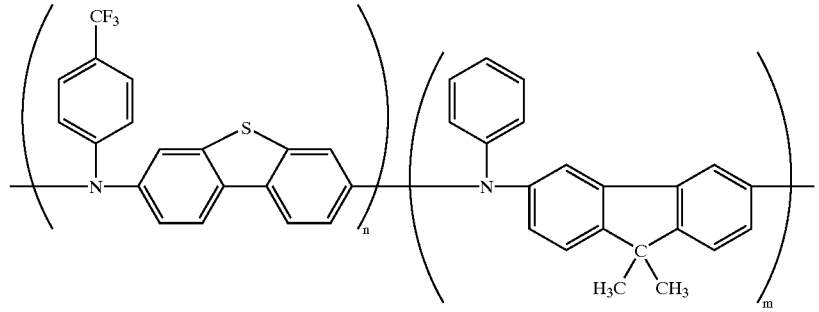
(57-14)
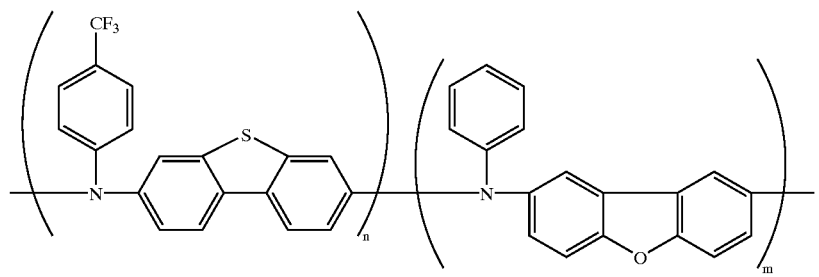
(57-15)

(57-16)
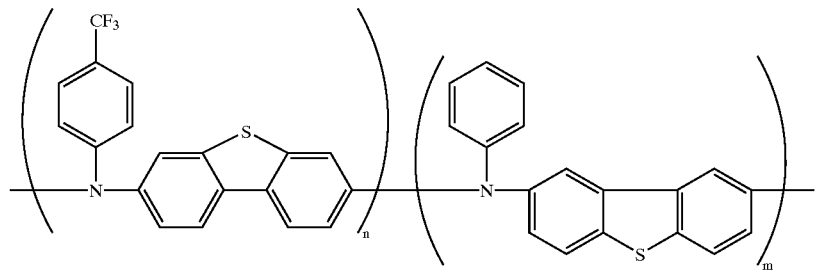
(57-17)
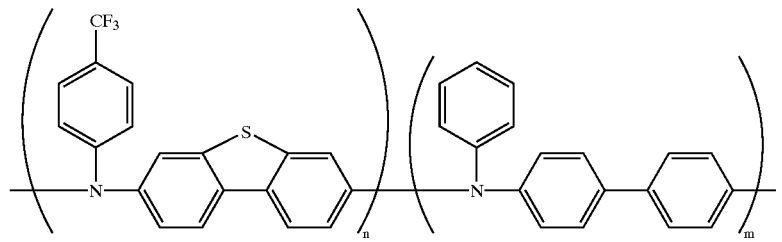
(57-18)
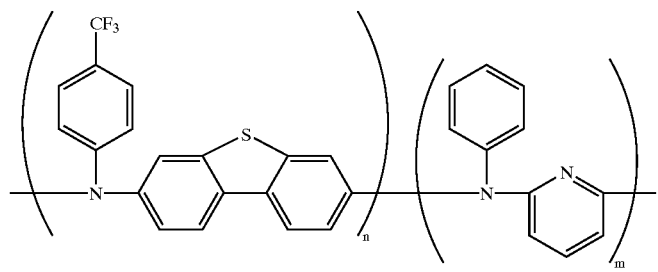
(57-19)
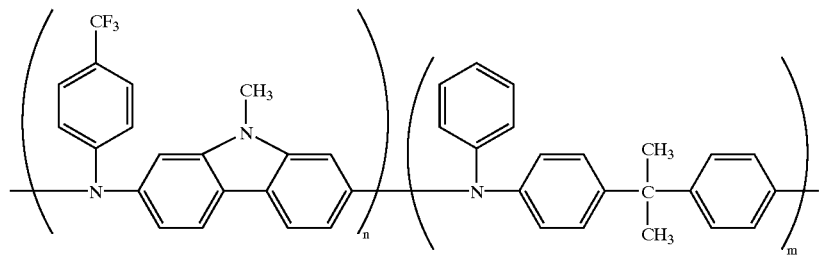
(57-20)
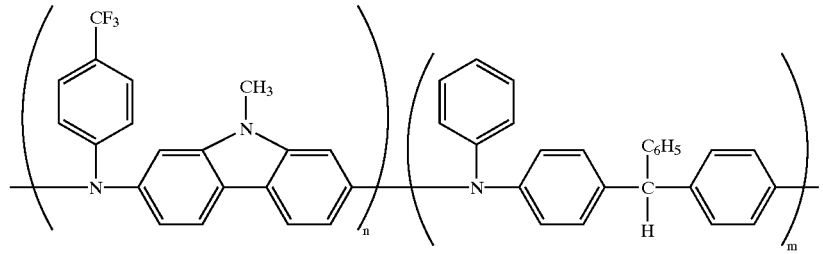
(57-21)
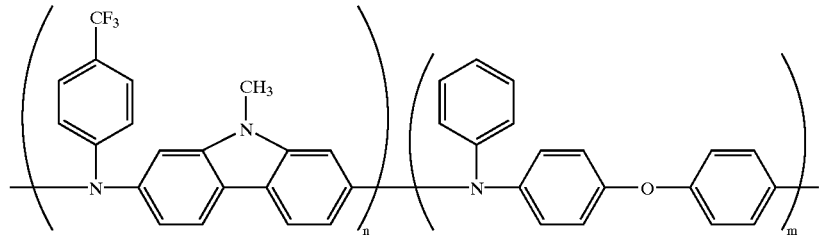

(57-22)
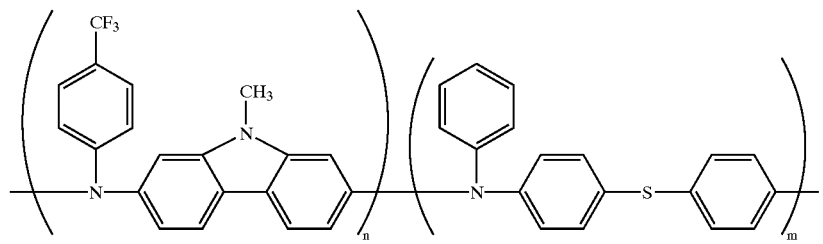
(57-23)
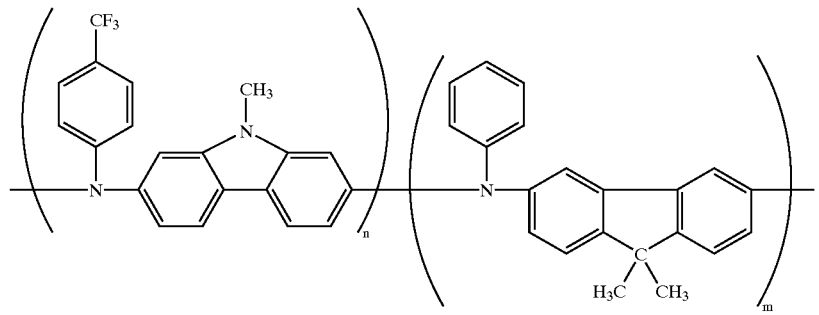
(57-24)
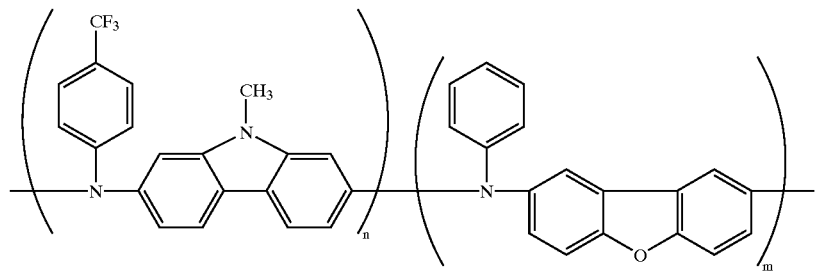
(57-25)
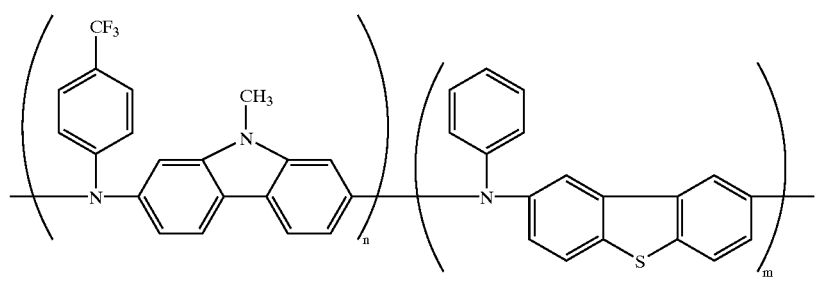
(57-26)
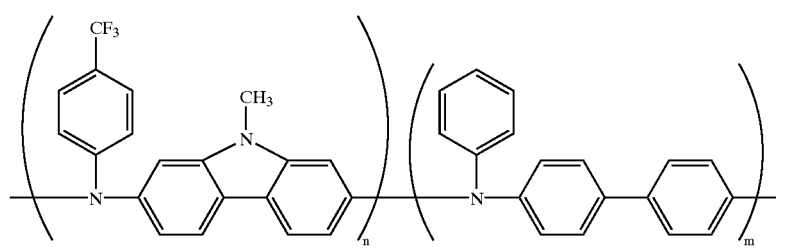
(57-27)
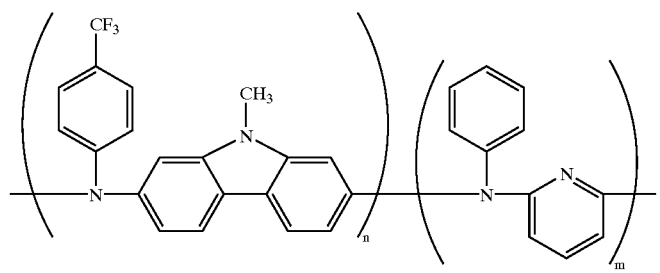

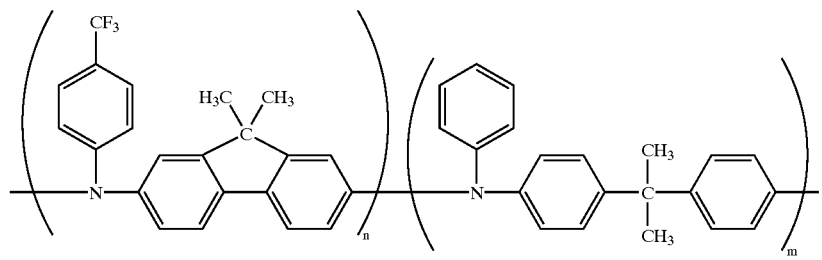
(57-28)
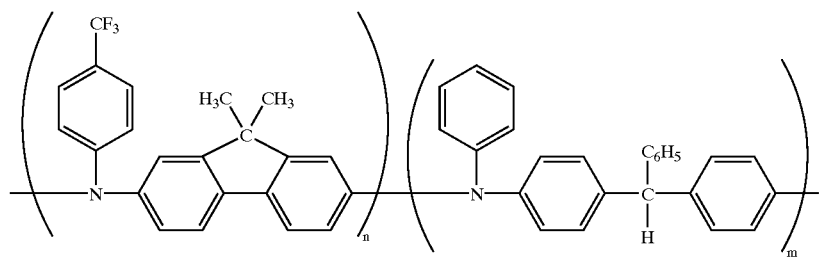
(57-29)
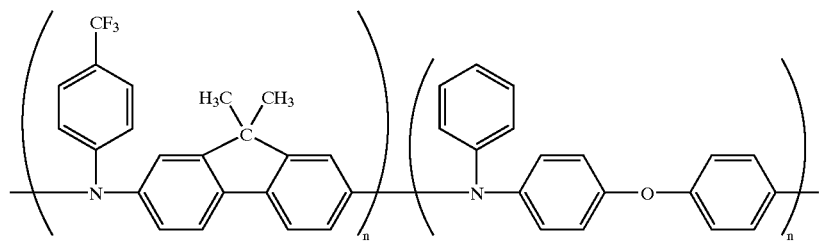
(57-30)
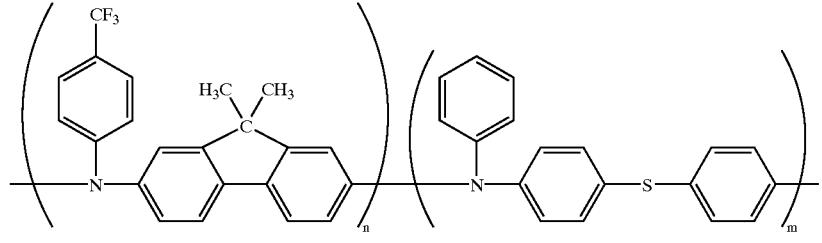
(57-31)
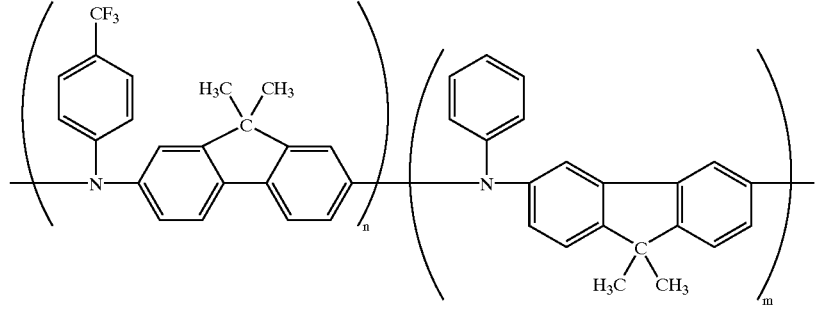
(57-32)
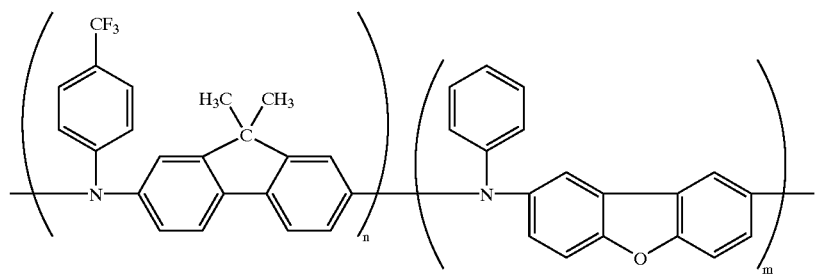
(57-33)

(57-34)
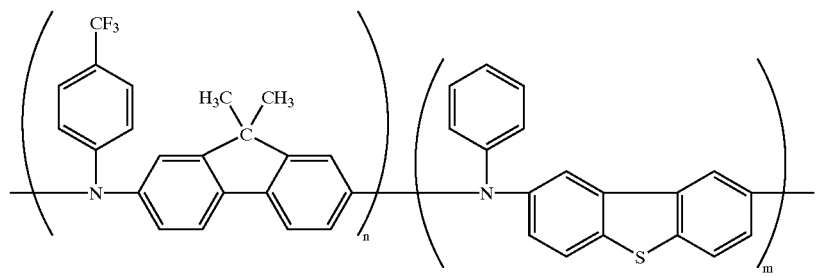
(57-35)
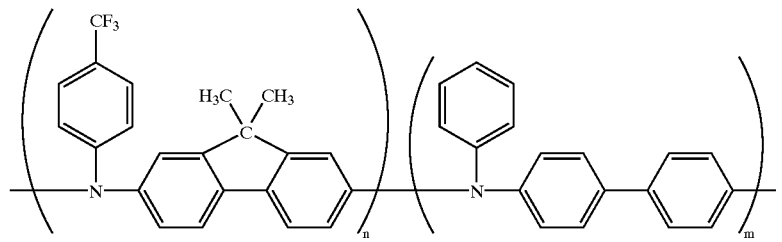
(57-36)
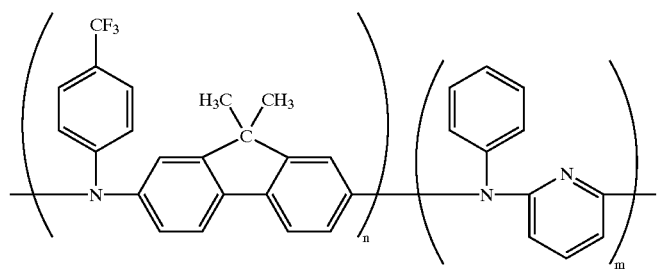
(57-37)
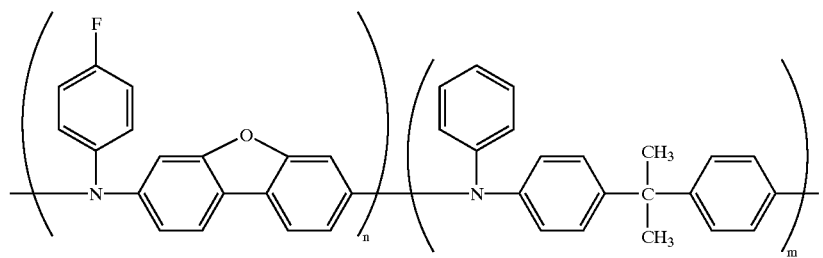
(57-38)
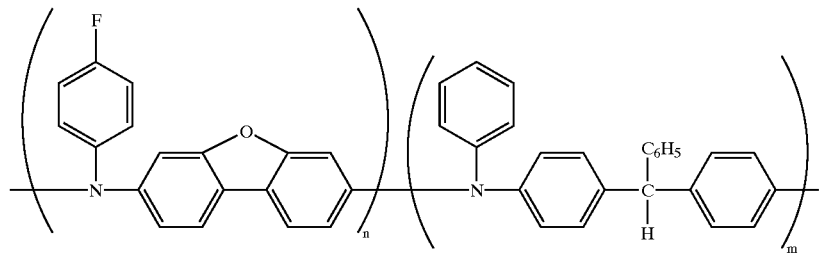
(57-39)
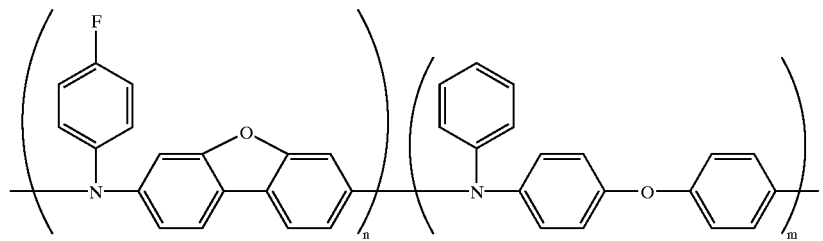

(57-40)
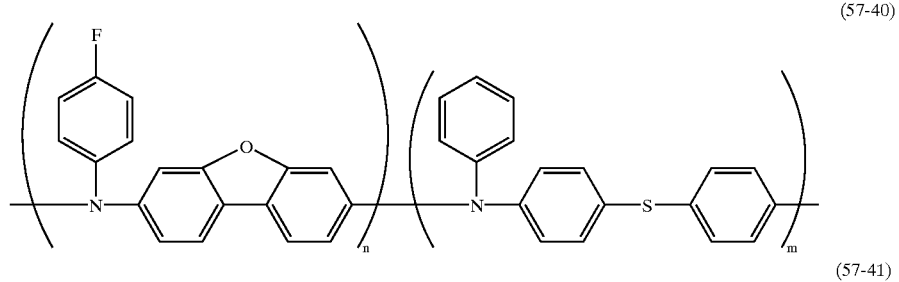
(57-41)
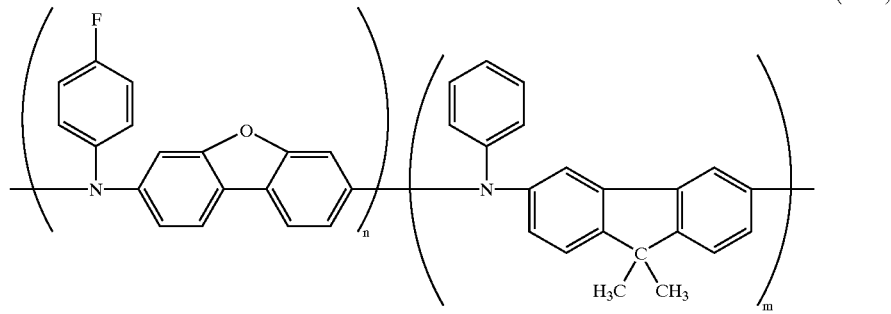
(57-42)
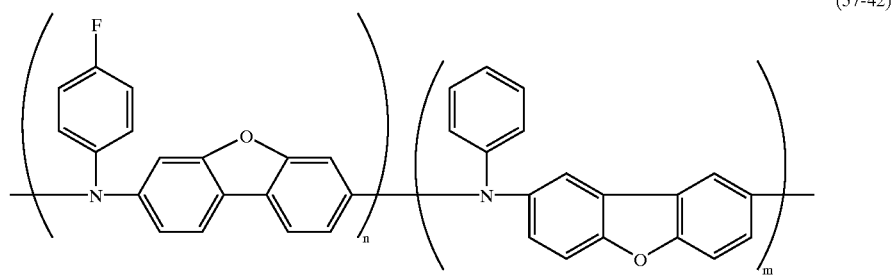
(57-43)
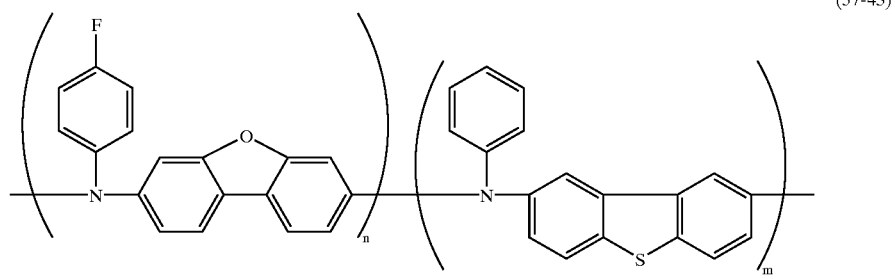
(57-44)
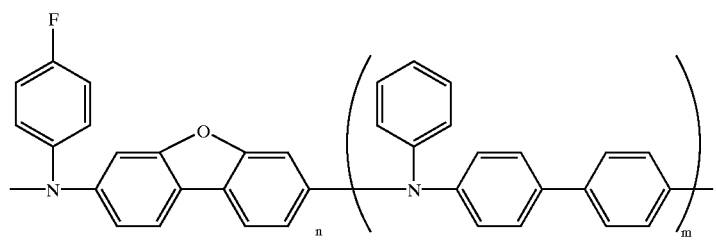
(57-45)
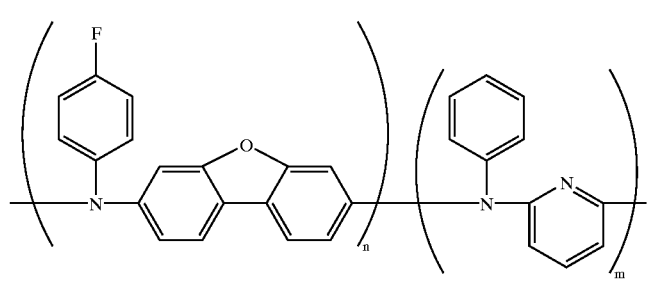

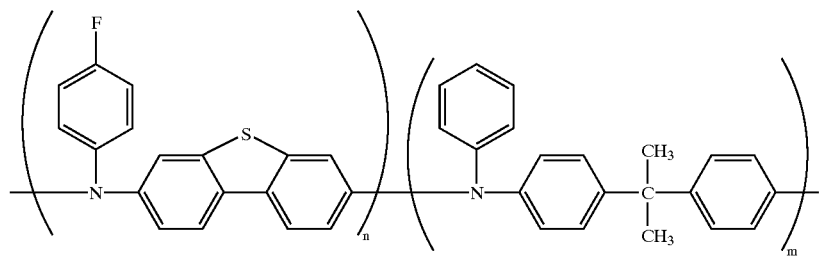
(57-46)
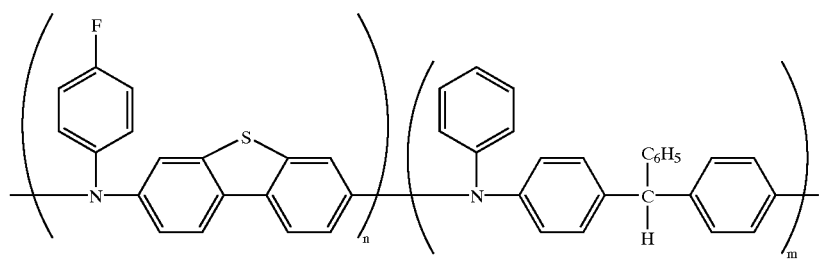
(57-47)
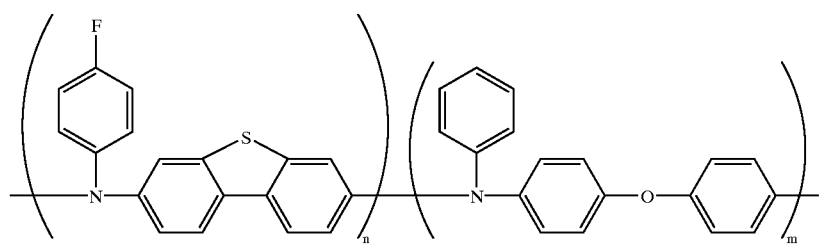
(57-48)
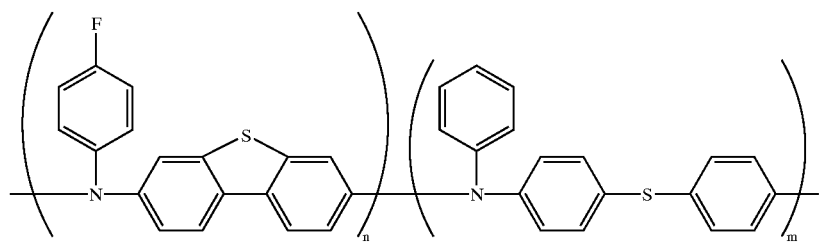
(57-49)
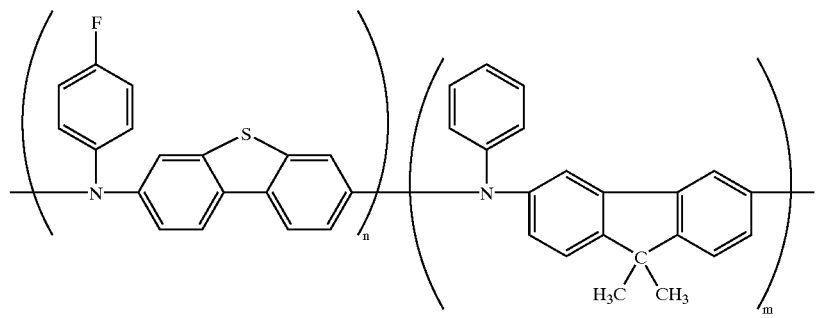
(57-50)
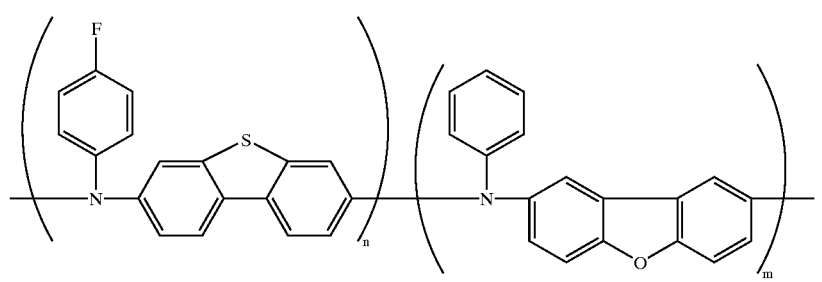
(57-51)

(57-52)
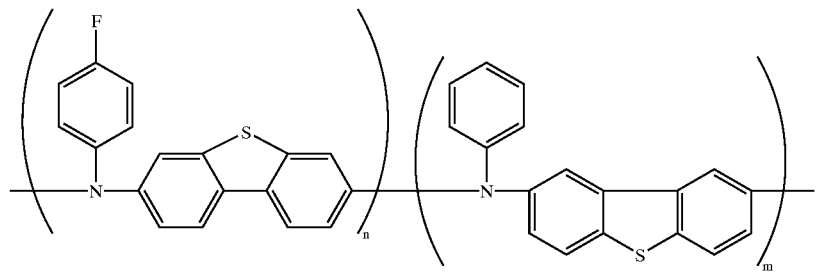
(57-53)
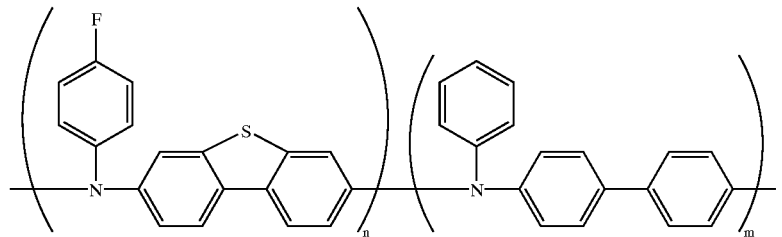
(57-54)
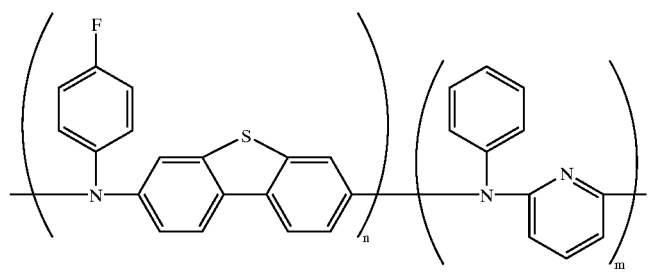
(57-55)
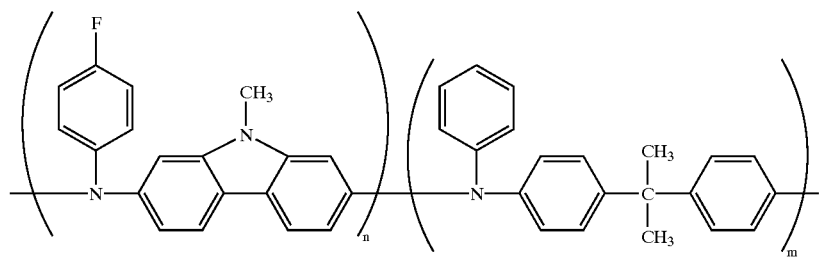
(57-56)
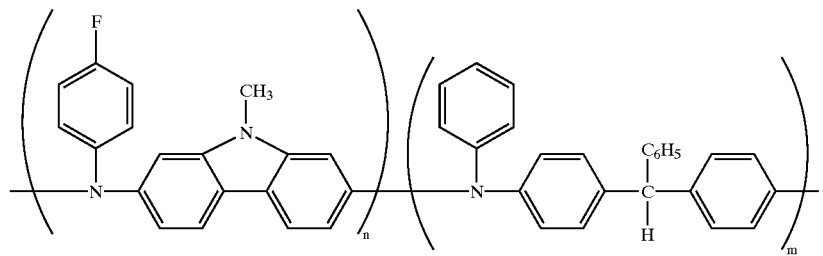
(57-57)
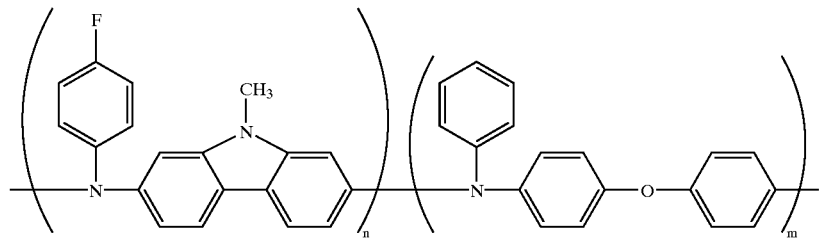

-continued
(57-58)
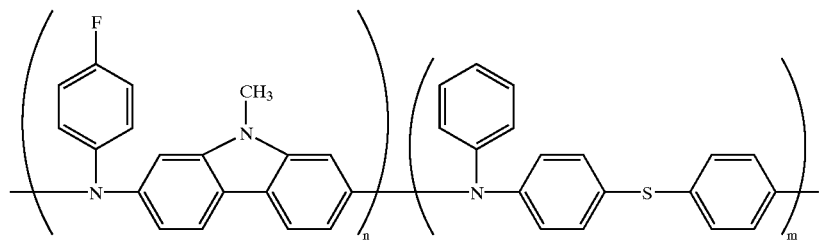
(57-59)
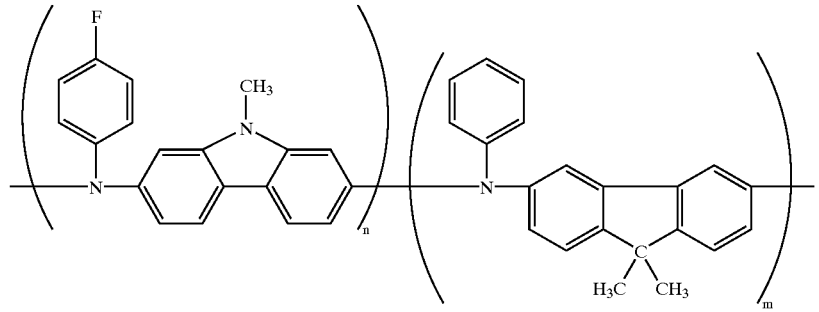
(57-60)
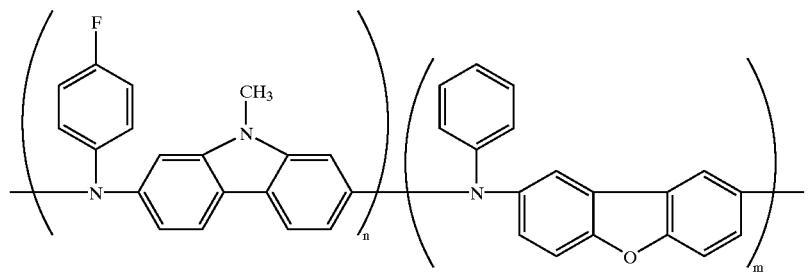
(57-61)
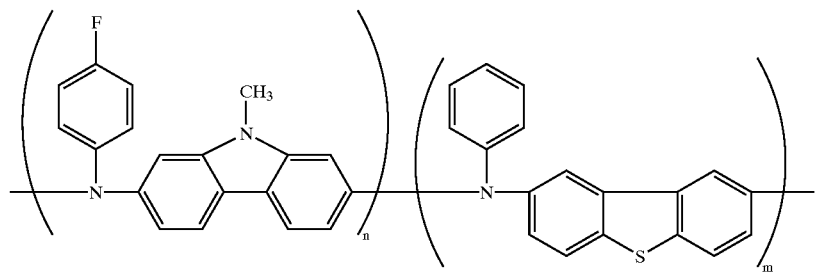
(57-62)
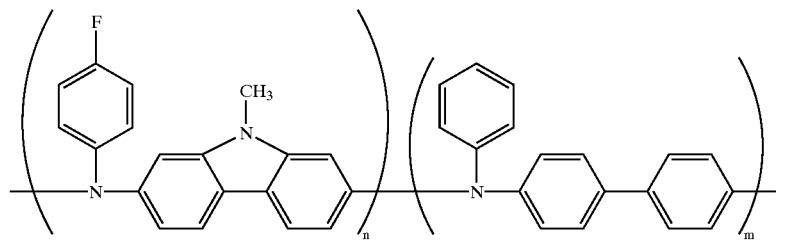
(57-63)
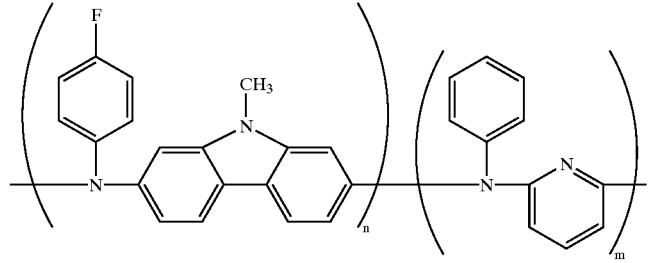

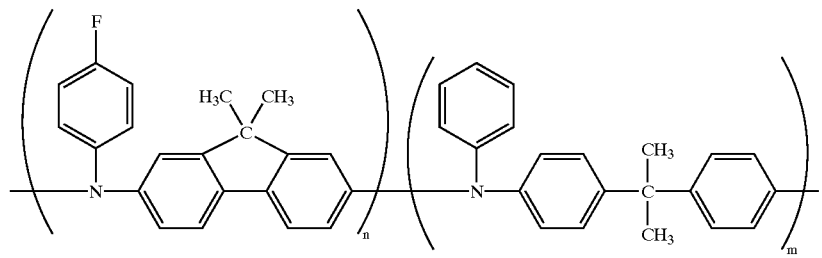
(57-64)
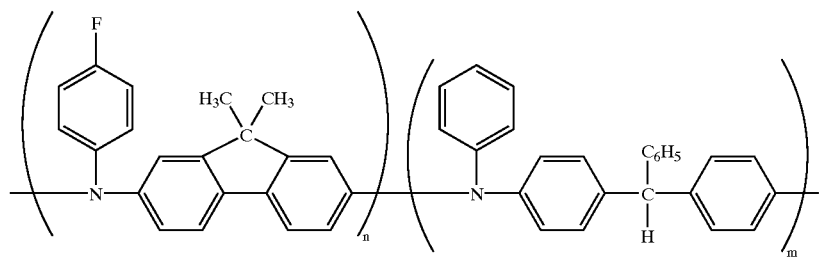
(57-65)
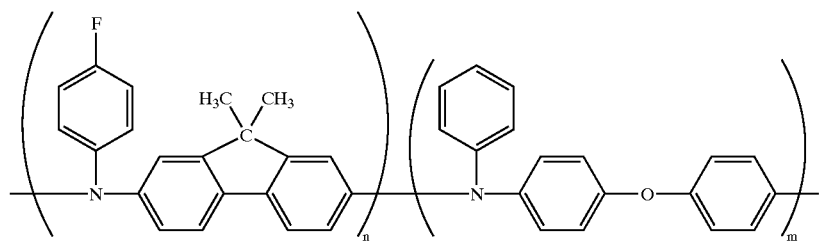
(57-66)
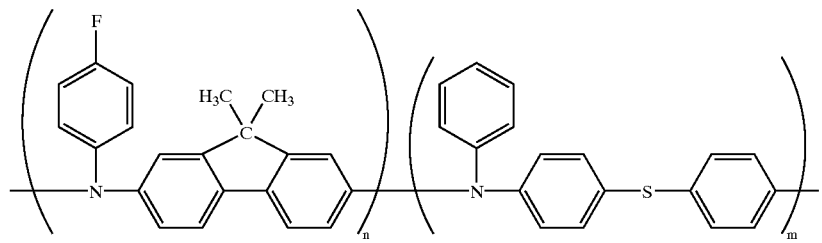
(57-67)
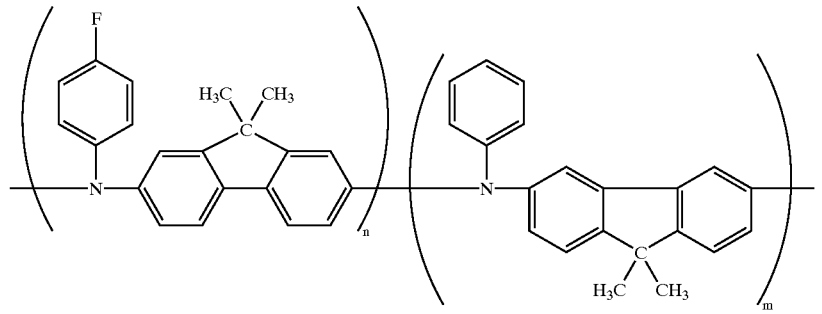
(57-68)
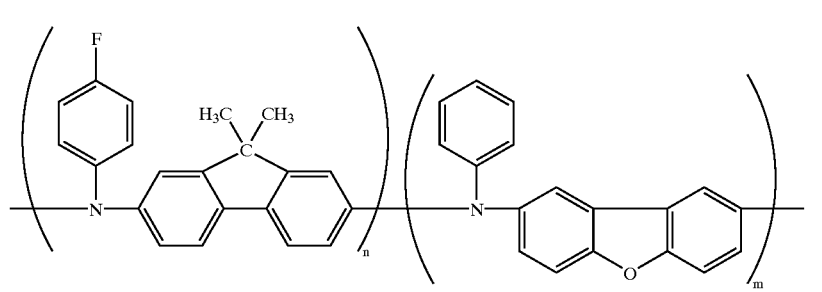
(57-69)

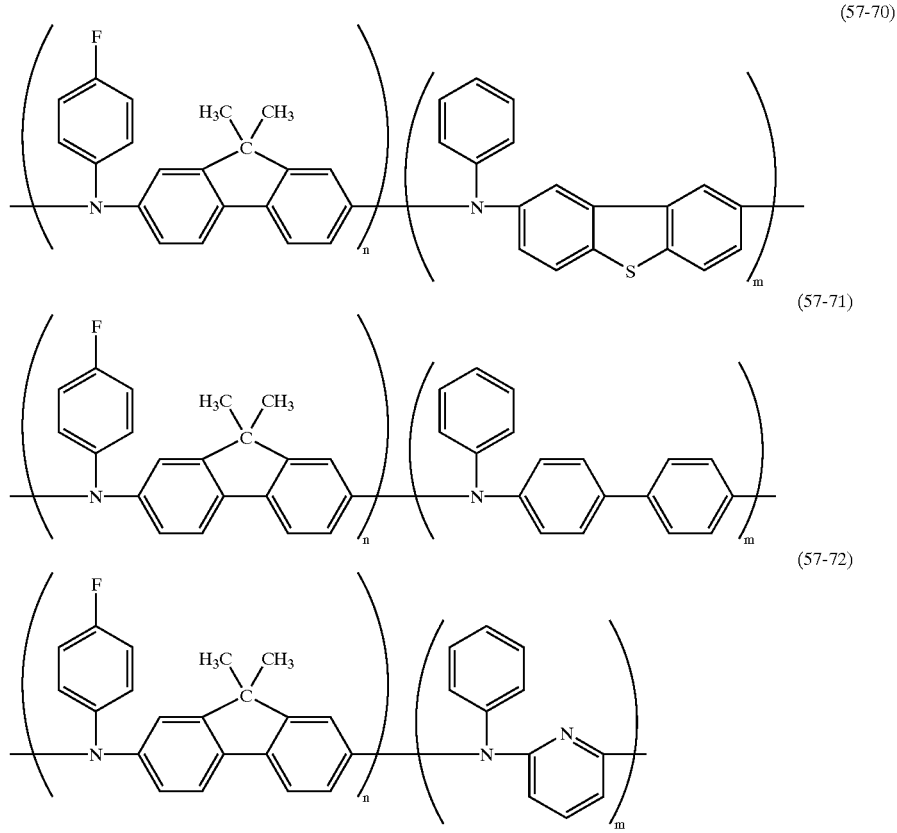

Of these, (57-1), (57-3), (57-6), (57-7), (57-8), (57-10), (57-12), (57-15), (57-16), (57-17), (57-19), (57-21), (57-26), (57-28), (57-30) and (57-35) are preferred.

In the foregoing specific examples, n and m are each an integer of 1 or more.

The high-molecular weight charge-transporting material having been described above can provide an electrophotographic photosensitive member having the intended high mechanical strength and also capable of stably exhibiting the intended performance of the electrophotographic photosensitive member even in its repeated use over a long period of time when the high-molecular weight charge-transporting material satisfies the properties of i) the energy level of highest occupied molecular orbital, $E_{HOMO}$, of from −8.3 eV or more to −8.0 eV or less as found by semiempirical molecular-orbital calculation and ii) the weight-average molecular weight (Mw) of 1,500 or more.

The energy level of highest occupied molecular orbital ($E_{HOMO}$) of the high-molecular weight charge-transporting material can readily be found by the semiempirical molecular-orbital calculation program according to the calculation method described previously.

The numerical value of the energy level of highest occupied molecular orbital ($E_{HOMO}$), calculated by the molecular-orbital method, is the value showing the chemical reactivity that is inherent in the subject material.

The high-molecular weight charge-transporting material used in the electrophotographic photosensitive member of the present invention has the specific repeating structural unit described above, and hence it comes to a structure wherein as the whole molecule the π conjugated system extends quasi (seemingly) on the phenyl group, in particular, the phenyl group constituting the backbone chain, via the unshaired electron pair on the nitrogen atom.

Such a structure wherein the π conjugated system extends is commonly a structure having a high charge transportability (mobility).

However, as an ill effect of the improvement in mobility, the energy level of highest occupied molecular orbital ($E_{HOMO}$) comes high, and hence the material comes sensitive to chemical reaction, so that, for example, it tends to react with active chemical species such as ozone or active oxygen and NOx which are generated upon discharge at the time of charging, resulting in a deterioration of the electrophotographic photosensitive member and a lowering of the electrophotographic performance.

Accordingly, in order to improve the running performance of the electrophotographic photosensitive member, and not to cause any lowering of performance even in repeated use, the energy level of highest occupied molecular orbital ($E_{HOMO}$) of the above high-molecular weight charge-transporting material having the specific repeating structural unit must be made lower than a certain value.

It is better for the energy level of highest occupied molecular orbital ($E_{HOMO}$) to be low in respect to any chemical denaturation (deterioration) of the high-molecular weight charge-transporting material. However, in order for the material to function as the charge-transporting material for the electrophotographic photosensitive member, it is important that the movement of electric charges takes place between the charge-generating material and the charge-transporting material. Any extremely low energy level of highest occupied molecular orbital ($E_{HOMO}$) produces an energy gap between the charge-generating material and the charge-transporting material to lower the performance of the electrophotographic photosensitive member. Hence, the energy level of highest occupied molecular orbital ($E_{HOMO}$) must appropriately be controlled.

As long as the energy level of highest occupied molecular orbital ($E_{HOMO}$) as found by semiempirical molecular-orbital calculation is within the range of from −8.3 eV or more to −8.0 eV or,less, the electrophotographic photosensitive member can be improved in running performance and its electrophotographic performance can be kept from lowering because of repeated use, without damaging good performance required as electrophotographic photosensitive members.

The mechanism by which the potential variation evaluated in the present invention takes place has not been elucidated in detail, but can be presumed as follows:

The potential variation in repeated use, evaluated as a lowering of performance of electrophotographic photosensitive members, is known to be caused by chemical denaturation due to ozone or active oxygen and NOx which are generated during the electrophotographic process, chiefly when the electrophotographic photosensitive members are charged.

In the above high-molecular weight charge-transporting material used in the electrophotographic photosensitive member of the present invention, having the specific repeating structural unit and having been made to have a low energy level of highest occupied molecular orbital ($E_{HOMO}$), a superiority is clearly seen in respect to the potential variation in repeated use, compared with any high-molecular weight charge-transporting materials not made to have a low energy level of highest occupied molecular orbital ($E_{HOMO}$).

This shows that making low the energy level of highest occupied molecular orbital ($E_{HOMO}$) has lowered the reactivity to chemical reaction and chemical denaturation and that the charge-transporting material can not easily be denatured and its performance can be exhibited over a long period of time.

In order to achieve the improvement in mechanical strength of the electrophotographic photosensitive member, which is one object of the present invention, what is also important is the size of molecular weight the high-molecular weight charge-transporting material having the specific repeating structural unit has.

In order to achieve the improvement in mechanical strength of the electrophotographic photosensitive member, the high-molecular weight charge-transporting material having the specific repeating structural unit must have the weight-average molecular weight (Mw) of 1,500 or more.

On the other hand, the high-molecular weight charge-transporting material having the specific repeating structural unit may preferably have a weight-average molecular weight (Mw) of 6,000 or less, and more preferably 4,000 or less. If the high-molecular weight charge-transporting material has a too large weight-average molecular weight (Mw), it may have a poor compatibility with the binder resin, and also its energy level of highest occupied molecular orbital ($E_{HOMO}$) may be controlled to from −8.3 eV or more to −8.0 eV or less with difficulty.

In order to achieve the improvement in mechanical strength of the electrophotographic photosensitive member, the number of repetition of the specific repeating structural unit (the number of the repeating structural units) may preferably be 6 or more as an average value.

On the other hand, the number of repetition of the specific repeating structural unit may preferably be 20 or less. If it is more than 20, the high-molecular weight charge-transporting material may have a poor compatibility with the binder resin, and also its energy level of highest occupied molecular orbital ($E_{HOMO}$) may be controlled to from −8.3 eV or more to −8.0 eV or less with difficulty.

The relationship between the enhancement in molecular weight and the mechanical strength has not been elucidated in detail. It is presumed that, since there is commonly a correlation between the enhancement in molecular weight and the glass transition point (Tg) and Tg is seen to increase with an increase in molecular weight, the glass transition point (Tg) increases with an increase in molecular weight of the high-molecular weight charge-transporting material and consequently the improvement in mechanical strength has been achieved.

On the other hand, although the mechanical strength becomes superior as the molecular weight is larger, the energy level of highest occupied molecular orbital in the molecular-orbital calculation described above becomes higher with an increase in the number of repetition of the repeating structural units, to cause chemical deterioration such as oxidation. Hence, it is important to determine the structure of molecules that achieves both the mechanical strength and the chemical stability. In this regard, the method of calculating the energy level of highest occupied molecular orbital by semiempirical molecular-orbital calculation is effective.

In the high-molecular weight charge-transporting material having the structural unit represented by the above formula (11), (21), (22), (31), (41) or (51), its proportion of the structural unit represented by the above formula (11), (21), (22), (31), (41) or (51) to the whole structural units in the molecule of the high-molecular weight charge-transporting material may be set arbitrary as long as the energy level of highest occupied molecular orbital ($E_{HOMO}$) is within the range of from −8.3 eV or more to −8.0 eV or less.

In addition, as long as it is within that range, the material can be so used as to be optimum from the viewpoints of its solubility in solvents and its compatibility with resins.

In order to bring out a high charge transport function, it is also preferable for the high-molecular weight charge-transporting material to have molecular weight as large as possible. Accordingly, the molecular weight of the high-molecular weight charge-transporting material may preferably be as large as possible as long as the $E_{HOMO}$ is in the range satisfying "−8.3 eV or more to −8.0 eV or less".

As to the high-molecular weight charge-transporting material having the repeating structural unit represented by the formula (11) and other repeating structural unit such as the repeating structural unit represented by the formula (12), the high-molecular weight charge-transporting material having the repeating structural unit represented by the formula (21) and other repeating structural unit such as the repeating structural unit represented by the formula (23), the high-molecular weight charge-transporting material having the repeating structural unit represented by the formula (22) and other repeating structural unit such as the repeating structural unit represented by the formula (23), the high-molecular weight charge-transporting material having the repeating structural unit represented by the formula (31) and other repeating structural unit such as the repeating structural unit represented by the formula (32), the high-molecular weight charge-transporting material having the repeating structural unit represented by the formula (41) and other repeating structural unit such as the repeating structural unit represented by the formula (42) and the high-molecular weight charge-transporting material having the repeating structural unit represented by the formula (51) and other repeating structural unit such as the repeating structural unit represented by the formula (52) or the repeating structural unit represented by the formula (53), they are meant to be copolymers.

The form of their copolymerization may be any of random copolymerization, block copolymerization and alternating copolymerization. Of these, the form of random copolymerization or alternating copolymerization is preferred because it does not cause any localization of electric changes in the molecule.

In order to attain the effect of the present invention sufficiently, the high-molecular weight charge-transporting material used in the electrophotographic photosensitive member of the present invention may also preferably have the above specific repeating structural unit in the molecule in a proportion of 80% or more, and more preferably 90% or more, based on the total repeating structural units.

The electrophotographic photosensitive member of the present invention is constructed as described below.

As the photosensitive layer the electrophotographic photosensitive member of the present invention has may have either form of a single-layer type photosensitive layer, which contains a charge-generating material and a charge-transporting material in the same layer, and a function-separated type (multi-layer type), which is functionally separated into a charge generation layer containing a charge-generating material and a charge transport layer containing a charge-transporting material. In view of electrophotographic performance, the function-separated type (multi-layer type) is preferred, and a function-separated type (multi-layer type) in which the charge generation layer and the charge transport layer have been superposed in this order from the support side is more preferred. In the following, what is expressed as the function-separated type (multi-layer type) is meant to be the one in which the charge generation layer and the charge transport layer have been superposed in this order from the support side.

In the case of the function-separated type (multi-layer type) in which the photosensitive layer has the charge generation layer and the charge transport layer, the high-molecular weight charge-transporting material used in the electrophotographic photosensitive member of the present invention is used together with an insulating binder resin in at least the charge transport layer.

The support used in the electrophotographic photosensitive member of the present invention may be any of those having a conductivity, and may include, e.g., those obtained by molding metals such as aluminum, copper, chromium, nickel, zinc and stainless steel into drums or sheets, those obtained by laminating metal foil of aluminum or copper to plastic films, and those obtained by vacuum-depositing aluminum, indium oxide or tin oxide on plastic films.

Where image data are inputted through laser light as in LBPs (laser beam printers), a conducting layer may also be provided for the purpose of preventing interference fringes due to light scattering or covering any scratches of the support. This layer may be formed by coating a dispersion prepared by dispersing conductive particles such as carbon black and metal particles in a binder resin.

The conducting layer may preferably have a layer thickness of from 5 $\mu$m to 40 $\mu$m, and more preferably from 10 $\mu$m to 30 $\mu$m.

An intermediate layer having the function of bonding may also be provided on the support or conducting layer.

As materials for the intermediate layer, they may include polyamide, polyvinyl alcohol, polyethylene oxide, ethyl cellulose, casein, polyurethane and polyether-urethane. Any of these may be dissolved in a suitable solvent, followed by coating to form the layer.

The intermediate layer may preferably have a layer thickness of from 0.05 $\mu$m to 5 $\mu$m, and more preferably from 0.3 $\mu$m to 1 $\mu$m.

In the case of the function-separated type (multi-layer type) photosensitive layer, a charge generation layer is formed on the support, conducting layer or intermediate layer.

To form the charge generation layer, a charge-generating material may well be dispersed in a binder resin, which is used in a 0.3- to 4-fold quantity, together with a solvent by means of a homogenizer, an ultrasonic dispersion machine, a ball mill, a vibration ball mill, a sand mill, an attritor, a roll mill or a liquid-impact type high-speed dispersion machine, and the resulting dispersion is coated, followed by drying.

The charge generation layer may preferably have a layer thickness of 5 $\mu$m or less, and particularly preferably from 0.1 $\mu$m to 2 $\mu$m.

As the charge-generating material, commonly known one may be used, including, e.g., pigments such as selenium-tellurium, pyrylium metal phthalocyanine, metal-free phthalocyanine, anthanthrone, dibenzopyrenequinone, trisazo, cyanine, disazo, monoazo, indigo and quinacridone.

Any of these pigments may well be dispersed in a binder resin, which is used in a 0.3- to 4-fold quantity, together with a solvent by means of a homogenizer, an ultrasonic dispersion machine, a ball mill, a vibration ball mill, a sand mill, an attritor, a roll mill or a liquid-impact type high-speed dispersion machine to prepare a coating dispersion. In the case of the function-separated type (multi-layer type) photosensitive layer, this dispersion is coated, followed by drying to form the charge generation layer.

In the case of the function-separated type (multi-layer type) photosensitive layer, a charge transport layer is formed on the charge generation layer.

To form the charge transport layer, the high-molecular weight charge-transporting material described above and an insulating binder resin are dissolved in a solvent to prepare a coating solution, and this solution is coated on the charge generation layer, followed by drying.

In the coating solution, the high-molecular weight charge-transporting material and the binder resin may preferably be in a proportion (high-molecular weight charge-transporting material/binder resin) of from 1/10 to 12/10 in weight ratio, and more preferably from 2/10 to 10/10 from the viewpoint of charge transport performance of the electrophotographic photosensitive member or strength of the charge transport layer.

As the binder resin, any resin may be used as long as it is a resin used usually in the photosensitive layer (charge generation layer and charge transport layer). From the viewpoint of transmission properties and film-forming properties of the resin, and also from the viewpoint of resistance to wear in the case when the photosensitive layer (charge transport layer) is the surface layer of the electrophotographic photosensitive member, a polycarbonate resin or a polyarylate resin is preferable.

It is preferable for the polycarbonate resin to have a viscosity-average molecular weight (Mv) of from 20,000 to 80,000.

Specific examples of the polycarbonate resin are shown below.

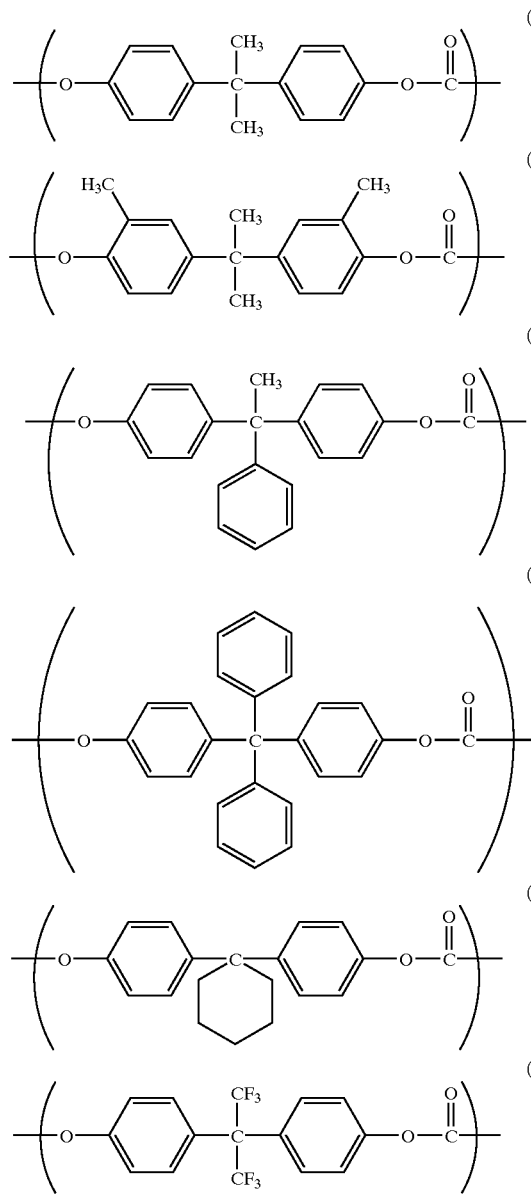
It is preferable for the polyarylate resin to have a weight-average molecular weight (Mw) of from 50,000 to 200,000, and more preferably from 80,000 to 150,000 in view of strength, productivity and so forth.
Specific examples of the polyarylate resin are shown below.
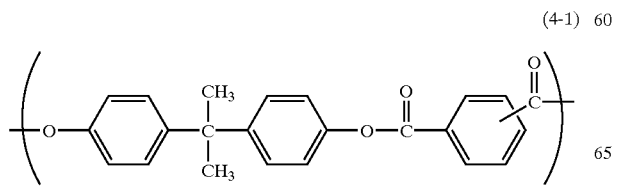
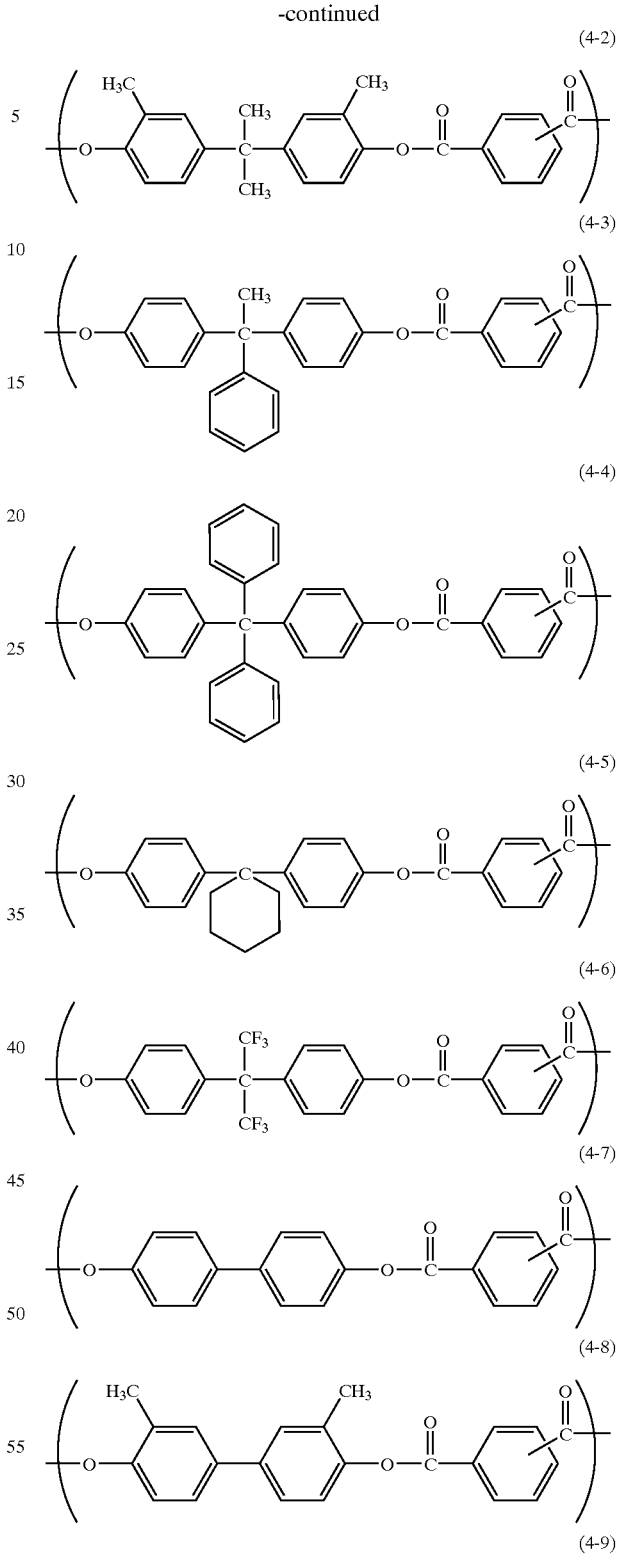
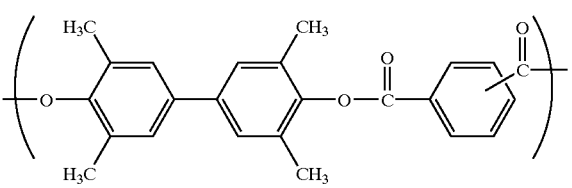

(4-10)

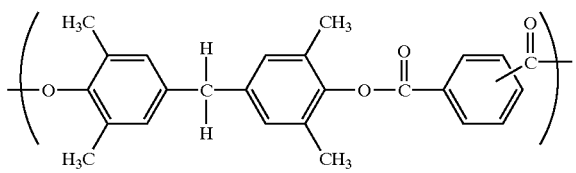

In order to improve productivity and so forth, it is also possible to blend the polyarylate resin with other polyarylate resin or polycarbonate resin having different structure. In order to efficiently bring out the effect of blending, the both may preferably be blended in a proportion of from 5/95 to 95/5, and more preferably from 20/80 to 80/20.

The binder resin such as the polycarbonate resin or polyarylate resin which is used in combination with the high-molecular weight charge-transporting material having the repeating structural unit represented by the above formula (1) may preferably have the same structure as the $Ar^{12}$ in the above formula (1). As having the same structure, a uniform photosensitive layer (charge transport layer) can be formed without causing any phase separation.

To the charge transport layer, an antioxidant, a heat stabilizer, an ultraviolet absorber and a plasticizer may also optionally be added.

In the case when the charge transport layer is the surface layer of the electrophotographic photosensitive member, a lubricant or fine particles may optionally be used. The lubricant or fine particles may include fine polytetrafluoroethylene particles, fine silica particles and fine alumina particles.

The charge transport layer may preferably have a layer thickness of from 5 $\mu$m to 40 $\mu$m, and more preferably from 15 $\mu$m to 30 $\mu$m.

As the surface layer of the electrophotographic photosensitive member, a layer for protecting the photosensitive layer, i.e., a protective layer may additionally be provided on the photosensitive layer.

As a resin used for the protective layer, a high-molecular weight thermoplastic resin or thermosetting resin, or light curable resin is preferable, and also a high-molecular weight polycarbonate resin, polyarylate resin, phenolic resin, acrylic resin or epoxy resin is more preferable.

For the purpose of reducing residual potential or improving film strength, conductive particles or a lubricant may be incorporated in the protective layer.

As a method of forming the protective layer, a coating therefor may be cured by heat, light or electron rays, and may optionally contain a polymerization initiator or an antioxidant.

In the steps of forming the respective layers of the electrophotographic photosensitive member, the solvent to be used may include chlorobenzene, tetrahydrofuran, 1,4-dioxane, toluene and xylene. Any of these may be used alone, or a plurality of solvents may be used in combination.

As methods for the above coating, usually known methods may be used, such as dip coating, spray coating and bar coating.

FIG. 1 schematically illustrates the construction of an electrophotographic apparatus having a process cartridge having the electrophotographic photosensitive member of the present invention.

In FIG. 1, reference numeral 1 denotes a drum type electrophotographic photosensitive member of the present invention, which is rotatingly driven around an axis 2 in the direction of an arrow at a stated peripheral speed. The electrophotographic photosensitive member 1 is, in the course of its rotation, uniformly electrostatically charged on its periphery to a positive or negative, stated potential through a primary charging means 3. The electrophotographic photosensitive member thus charged is then exposed to exposure light 4 emitted from an exposure means (not shown) for slit exposure or laser beam scanning exposure. In this way, electrostatic latent images are successively formed on the periphery of the electrophotographic photosensitive member 1.

The electrostatic latent images thus formed are subsequently developed by toner by the operation of a developing means 5. The toner-developed images formed by development are then successively transferred by the operation of a transfer means 6, to the surface of a transfer medium 7 fed from a paper feed section (not shown) to the part between the electrophotographic photosensitive member 1 and the transfer means 6 in the manner synchronized with the rotation of the electrophotographic photosensitive member 1.

The transfer medium 7 to which the images have been transferred is separated from the surface of the electrophotographic photosensitive member, is led through an image fixing means 8, where the images are fixed, and is then put out of the apparatus as a copied material (a copy).

The surface of the electrophotographic photosensitive member 1 from which images have been transferred is brought to removal of the toner remaining after the transfer, through a cleaning means 9. Thus the electrophotographic photosensitive member is cleaned on its surface, further subjected to charge elimination by pre-exposure light 10 emitted from a pre-exposure means (not shown), and then repeatedly used for the formation of images. When the primary charging means 3 is a contact charging means making use of a charging roller as shown in FIG. 1, the pre-exposure is not necessarily required.

In the present invention, the apparatus may be constituted of a combination of plural components integrally joined as a process cartridge from among the constituents such as the above electrophotographic photosensitive member 1, primary charging means 3, developing means 5 and cleaning means 9 so that the process cartridge is detachably mountable to the body of the electrophotographic apparatus such as a copying machine or a laser beam printer. For example, at least one of the primary charging means 3, the developing means 5 and the cleaning means 9 may integrally be supported in a cartridge together with the electrophotographic photosensitive member 1 to form a process cartridge 11 that is detachably mountable to the body of the apparatus through a guide means such as rails 12 provided in the body of the apparatus.

In the case when the electrophotographic apparatus is used as a copying machine or a printer, the light 4 of imagewise exposure is light reflected from, or transmitted through, an original, or light irradiated by the scanning of a laser beam, the driving of an LED array or the driving of a liquid crystal shutter array according to signals obtained by reading an original through a sensor and converting the information into signals.

The electrophotographic photosensitive member of the present invention may be not only applied in electrophotographic copying machines, but also widely used in the fields where electrophotography is applied, e.g., laser beam printers, CRT printers, LED printers, liquid-crystal printers and laser platemaking.

The present invention is described below in greater detail by giving Examples. In the following Examples, "part(s)" refers to "part(s) by weight".

Evaluation is described first.

As described previously, the energy level of highest occupied molecular orbital ($E_{HOMO}$) was found by structure optimization calculation making use of semiempirical molecular-orbital calculation made using PM3 parameter.

The running performance and variation of characteristics in repeated use of electrophotographic photosensitive members making use of high-molecular weight charge-transporting materials were evaluated using as an evaluation machine a copying machine GP40 (manufactured by CANON INC.) (contact charging system) which was so remodeled that the amount of imagewise exposure came to 0.6 $\mu J/cm^2$ as the amount of light on the electrophotographic photosensitive member surface.

To evaluate the running performance in repeated use of electrophotographic photosensitive members, copies were taken on 20,000 sheets in an intermittent mode in which A4-size plain paper is once stopped being fed for each copying on one sheet, and thereafter the electrophotographic photosensitive member layer thickness was measured to examine the depth of wear.

Light-area potential (Vl) was also measured before the evaluation of running performance (as light-area potential, shown in Tables) and after the 20,000-sheet copying, and a difference between them was evaluated as light-area potential variation, shown in Tables.

The light-area potential (surface potential) of each electrophotographic photosensitive member was measured at the position of developing assembly, changing the developing assembly for a jig which was so fastened that its potential-measuring probe was set at a position of 180 mm from the upper end of the electrophotographic photosensitive member.

In addition, sebum was made to adhere to the surfaces of fresh electrophotographic photosensitive members, which were then left for 72 hours, and whether or not any solvent cracking occurred was observed by microscopic observation (100 magnifications). Observation was made at 10 observation spots. A case in which no cracking was seen at the all observation spots was evaluated as "A"; and a case in which it was seen at observation spots, as "C".

EXAMPLES 1—1 TO 1-14, 2-1 TO 2-32, 3-1 TO 3-9, 4-1 TO 4-14 AND 5-1 TO 5-9

Electrophotographic photosensitive members of the respective Examples were each produced in the following way.

On an aluminum cylinder of 357 mm in length and 30 mm in diameter, a coating dispersion composed of the following materials was coated by dip coating, followed by heat curing at 140° C. for 30 minutes to form a conducting layer with a layer thickness of 15 $\mu$m.

| | |
|---|---|
| Conductive pigment: SnO$_2$-coated barium sulfate | 10 parts |
| Resistance-modifying pigment: Titanium oxide | 2 parts |
| Binder resin: Phenolic resin | 6 parts |
| Leveling agent: Silicone oil | 0.001 part |
| Solvent: Methanol/methoxypropanol = 2/8 | 20 parts |

Next, on this conducting layer, 3 parts of N-methoxymethylated nylon and 3 parts of copolymer nylon were dissolved in a mixed solvent of 65 parts of methanol and 30 parts of butanol to prepare a coating solution, and this was coated by dip coating, followed by drying to form an intermediate layer with a layer thickness of 0.5 $\mu$m.

Next, 4 parts of hydroxygallium phthalocyanine having strong peaks at 7.4° and 28.2° of diffraction angles (2θ±0.2°) in the CuKα X-ray diffraction spectrum, 2 parts of polyvinyl butyral resin (trade name: S-LEC BX-1; available from Sekisui Chemical Co., Ltd.) and 60 parts of cyclohexanone were dispersed for 4 hours by means of a sand mill using glass beads of 1 mm in diameter, followed by addition of 100 parts of ethyl acetate to prepare a charge generation layer coating dispersion. This was coated on the intermediate layer by dip coating, followed by drying to form a charge generation layer with a layer thickness of 0.2 $\mu$m.

Next, 6 parts of each high-molecular weight charge-transporting material shown in the following Tables 1 to 6 (Evaluation and Results) and 10 parts of each binder resin also shown in the following Tables 1 to 6 were dissolved in a mixed solvent of 30 parts of monochlorobenzene and 70 parts of dichloromethane to prepare a charge transport layer coating solution. This was coated on the charge generation layer by dip coating, followed by drying at 120° C. for 1 hour to form a charge transport layer with a layer thickness of 25 $\mu$m.

Thus, electrophotographic photosensitive members of the respective Examples were produced.

Comparative Examples 0-1 to 5-3

Electrophotographic photosensitive members of the respective Comparative Examples were produced in the same manner as in Examples except that as the high-molecular weight charge-transporting materials used in Examples one having a repeating structural unit represented by the following formula (7) or those shown in the following Tables 8 to 12 (Evaluation and Results) was/were used and as the binder resins those also shown in the following Tables 7 to 12 were used.

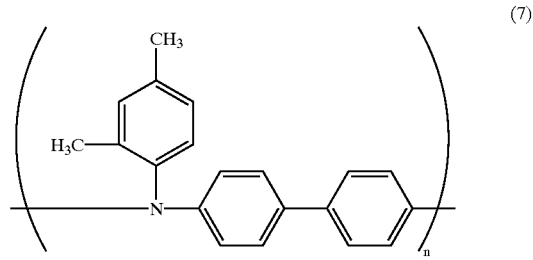

(7)

The results of evaluation in the respective Examples and Comparative Examples are shown in the following Tables 1 to 12.

In the following Tables, "Number of structural units" (n or m) means the average value of the number of structural units. "Molecular weight (Mw)" means the weight-average molecular weight (Mw). "Cracking" means whether or not the solvent cracking has occurred.

TABLE 1

Evaluation and Results

| Example | High-molecular weight charge-transporting material Structure | Number of structural units | Molecular weight (Mw) | $E_{HOMO}$ (eV) | Binder resin Structure | Molecular weight Mw | Depth of wear (μm) | Light-area potential (eV) | Light-area potential Variation (eV) | Cracking |
|---|---|---|---|---|---|---|---|---|---|---|
| 1-1 | 11-1 | n = 8 | 2,088 | −8.264 | 3-5 | 100,000 | 6.4 | −180 | +6 | A |
| 1-2 | 11-5 | n = 6 | 1,866 | −8.296 | 3-5 | 100,000 | 6.6 | −180 | +5 | A |
| 1-3 | 11-18 | n = 8 | 2,464 | −8.173 | 3-5 | 100,000 | 6.6 | −175 | +7 | A |
| 1-4 | 11-20 | n = 6 | 2,508 | −8.254 | 3-5 | 100,000 | 6.6 | −180 | +5 | A |
| 1-5 | 13-1 | n = 2, m = 8 | 2,466 | −8.100 | 3-5 | 100,000 | 6.4 | −160 | +13 | A |
| 1-6 | 13-2 | n = 2, m = 8 | 2,566 | −8.059 | 3-5 | 100,000 | 6.4 | −150 | +15 | A |
| 1-7 | 11-1 | n = 8 | 2,088 | −8.264 | 4-2 | 130,000 | 5 | −190 | +5 | A |
| 1-8 | 11-5 | n = 6 | 1,866 | −8.296 | 4-2 | 130,000 | 5.1 | −170 | +4 | A |
| 1-9 | 13-1 | n = 2, m = 8 | 2,464 | −8.100 | 4-2 | 130,000 | 4.8 | −160 | +12 | A |
| 1-10 | 13-2 | n = 2, m = 8 | 2,508 | −8.059 | 4-2 | 130,000 | 4.8 | −195 | +13 | A |
| 1-11 | 11-1 | n = 8 | 2,088 | −8.264 | (4-2)/(4-9) = 7/3 | 130,000 | 4.9 | −195 | +4 | A |
| 1-12 | 11-5 | n = 6 | 1,866 | −8.296 | (4-2)/(4-9) = 7/3 | 130,000 | 4.8 | −175 | +3 | A |
| 1-13 | 13-1 | n = 2, m = 8 | 2,464 | −8.100 | (4-2)/(4-9) = 7/3 | 130,000 | 4.7 | −175 | +11 | A |
| 1-14 | 13-2 | n = 2, m = 8 | 2,508 | −8.059 | (4-2)/(4-9) = 7/3 | 130,000 | 4.7 | −165 | +12 | A |

TABLE 2

Evaluation and Results

| Example | High-molecular weight charge-transporting material Structure | Number of structural units | Molecular weight (Mw) | $E_{HOMO}$ (eV) | Binder resin Structure | Molecular weight Mw | Depth of wear (μm) | Light-area potential (eV) | Light-area potential Variation (eV) | Cracking |
|---|---|---|---|---|---|---|---|---|---|---|
| 2-1 | 21-4 | n = 12 | 2,280 | −8.288 | 3-5 | 100,000 | 6.4 | −185 | +5 | A |
| 2-2 | 21-3 | n = 8 | 2,664 | −8.268 | 3-5 | 100,000 | 6.5 | −180 | +7 | A |
| 2-3 | 21-20 | n = 8 | 2,408 | −8.044 | 3-5 | 100,000 | 6.6 | −150 | +15 | A |
| 2-4 | 21-30 | n = 8 | 2,072 | −8.249 | 3-5 | 100,000 | 6.5 | −180 | +7 | A |
| 2-5 | 21-31 | n = 8 | 2,200 | −8.012 | 3-5 | 100,000 | 6.5 | −150 | +16 | A |
| 2-6 | 22-9 | n = 8 | 2,056 | −8.288 | 3-5 | 100,000 | 6.3 | −180 | +4 | A |
| 2-7 | 22-14 | n = 8 | 2,184 | −8.018 | 3-5 | 100,000 | 6.3 | −150 | +15 | A |
| 2-8 | 24-1 | n = 5, m = 5 | 2,640 | −8.154 | 3-5 | 100,000 | 6.4 | −160 | +9 | A |
| 2-9 | 24-6 | n = 2, m = 8 | 2,442 | −8.119 | 3-5 | 100,000 | 6.4 | −155 | +9 | A |
| 2-10 | 24-11 | n = 2, m = 8 | 2,494 | −8.082 | 3-5 | 100,000 | 6.2 | −150 | +11 | A |
| 2-11 | 25-5 | n = 5, m = 5 | 2,500 | −8.201 | 3-5 | 100,000 | 6.3 | −170 | +8 | A |
| 2-12 | 25-10 | n = 2, m = 8 | 2,490 | −8.056 | 3-5 | 100,000 | 6.3 | −150 | +10 | A |
| 2-13 | 21-4 | n = 12 | 2,280 | −8.288 | 4-2 | 130,000 | 5 | −190 | +4 | A |
| 2-14 | 21-30 | n = 8 | 2,072 | −8.249 | 4-2 | 130,000 | 4.9 | −190 | +6 | A |
| 2-15 | 21-31 | n = 8 | 2,200 | −8.012 | 4-2 | 130,000 | 5.1 | −160 | +15 | A |

TABLE 3

Evaluation and Results

| Example | High-molecular weight charge-transporting material Structure | Number of structural units | Molecular weight (Mw) | $E_{HOMO}$ (eV) | Binder resin Structure | Molecular weight Mw | Depth of wear (μm) | Light-area potential (eV) | Light-area potential Variation (eV) | Cracking |
|---|---|---|---|---|---|---|---|---|---|---|
| 2-16 | 22-9 | n = 8 | 2,056 | −8.288 | 4-2 | 130,000 | 5.0 | −190 | +3 | A |
| 2-17 | 22-14 | n = 8 | 2,184 | −8.018 | 4-2 | 130,000 | 5.0 | −160 | +14 | A |
| 2-18 | 24-1 | n = 5, m = 5 | 2,640 | −8.154 | 4-2 | 130,000 | 4.9 | −170 | +8 | A |
| 2-19 | 24-6 | n = 2, m = 8 | 2,442 | −8.119 | 4-2 | 130,000 | 4.9 | −165 | +8 | A |
| 2-20 | 24-11 | n = 2, m = 8 | 2,494 | −8.082 | 4-2 | 130,000 | 4.8 | −160 | +10 | A |
| 2-21 | 25-5 | n = 5, m = 5 | 2,500 | −8.201 | 4-2 | 130,000 | 4.8 | −180 | +7 | A |
| 2-22 | 25-10 | n = 2, m = 8 | 2,490 | −8.056 | 4-2 | 130,000 | 4.8 | −160 | +8 | A |
| 2-23 | 21-4 | n = 12 | 2,280 | −8.288 | (4-2)/(4-9) = 7/3 | 130,000 | 4.8 | −195 | +3 | A |
| 2-24 | 21-30 | n = 8 | 2,072 | −8.249 | (4-2)/(4-9) = 7/3 | 130,000 | 4.7 | −195 | +5 | A |

TABLE 3-continued

Evaluation and Results

| Example | High-molecular weight charge-transporting material Structure | Number of structural units | Molecular weight (Mw) | $E_{HOMO}$ (eV) | Binder resin Structure | Molecular weight Mw | Depth of wear (μm) | Light-area potential (eV) | Light-area potential Variation (eV) | Cracking |
|---|---|---|---|---|---|---|---|---|---|---|
| 2-25 | 21-31 | n = 8 | 2,200 | −8.012 | (4-2)/(4-9) = 7/3 | 130,000 | 4.7 | −165 | +13 | A |
| 2-26 | 22-9 | n = 8 | 2,056 | −8.288 | (4-2)/(4-9) = 7/3 | 130,000 | 4.6 | −195 | +3 | A |
| 2-27 | 22-14 | n = 8 | 2,184 | −8.018 | (4-2)/(4-9) = 7/3 | 130,000 | 4.7 | −165 | +12 | A |
| 2-28 | 24-1 | n = 5, m = 5 | 2,640 | −8.154 | (4-2)/(4-9) = 7/3 | 130,000 | 4.6 | −175 | +7 | A |
| 2-29 | 24-6 | n = 2, m = 8 | 2,442 | −8.119 | (4-2)/(4-9) = 7/3 | 130,000 | 4.7 | −170 | +7 | A |
| 2-30 | 24-11 | n = 2, m = 8 | 2,494 | −8.082 | (4-2)/(4-9) = 7/3 | 130,000 | 4.6 | −165 | +8 | A |
| 2-31 | 25-5 | n = 5, m = 5 | 2,500 | −8.201 | (4-2)/(4-9) = 7/3 | 130,000 | 4.6 | −185 | +7 | A |
| 2-32 | 25-10 | n = 2 m = 8 | 2,490 | −8.059 | (4-2)/(4-9) = 7/3 | 130,000 | 4.5 | −165 | +7 | A |

TABLE 4

Evaluation and Results

| Example | High-molecular weight charge-transporting material Structure | Number of structural units | Molecular weight (Mw) | $E_{HOMO}$ (eV) | Binder resin Structure | Molecular weight Mw | Depth of wear (μm) | Light-area potential (eV) | Light-area potential Variation (eV) | Cracking |
|---|---|---|---|---|---|---|---|---|---|---|
| 3-1 | 31-1 | n = 10 | 1,690 | −8.274 | 3-5 | 100,000 | 6.5 | −180 | +5 | A |
| 3-2 | 31-9 | n = 10 | 1,690 | −8.171 | 3-5 | 100,000 | 6.5 | −170 | +8 | A |
| 3-3 | 33-1 | n = 5, m = 5 | 2,060 | −8.176 | 3-5 | 100,000 | 6.3 | −170 | +8 | A |
| 3-4 | 33-5 | n = 5, m = 5 | 2,060 | −8.124 | 3-5 | 100,000 | 6.3 | −160 | +10 | A |
| 3-5 | 33-8 | n = 2, m = 8 | 2,434 | −8.165 | 3-5 | 100,000 | 6.4 | −165 | +10 | A |
| 3-6 | 31-1 | n = 10 | 1,690 | −8.274 | 4-2 | 130,000 | 5.0 | −190 | +4 | A |
| 3-7 | 33-1 | n = 5, m = 5 | 2,060 | −8.176 | 4-2 | 130,000 | 5.0 | −180 | +7 | A |
| 3-8 | 31-1 | n = 10 | 1,690 | −8.274 | (4-2)/(4-9) = 7/3 | 130,000 | 4.8 | −195 | +4 | A |
| 3-9 | 33-1 | n = 5, m = 5 | 2,060 | −8.176 | (4-2)/(4-9) = 7/3 | 130,000 | 4.7 | −185 | +6 | A |

TABLE 5

Evaluation and Results

| Example | High-molecular weight charge-transporting material Structure | Number of structural units | Molecular weight (Mw) | $E_{HOMO}$ (eV) | Binder resin Structure | Molecular weight Mw | Depth of wear (μm) | Light-area potential (eV) | Light-area potential Variation (eV) | Cracking |
|---|---|---|---|---|---|---|---|---|---|---|
| 4-1 | 41-4 | n = 5 | 1,665 | −8.028 | 3-5 | 100,000 | 6.4 | −145 | +15 | A |
| 4-2 | 41-9 | n = 5 | 1,745 | −8.081 | 3-5 | 100,000 | 6.4 | −155 | +11 | A |
| 4-3 | 41-11 | n = 8 | 1,960 | −8.268 | 3-5 | 100,000 | 6.6 | −180 | +5 | A |
| 4-4 | 43-3 | n = 5, m = 5 | 2,890 | −8.085 | 3-5 | 100,000 | 6.3 | −155 | +12 | A |
| 4-5 | 43-8 | n = 2, m = 8 | 2,642 | −8.068 | 3-5 | 100,000 | 6.3 | −150 | +12 | A |
| 4-6 | 43-11 | n = 8, m = 2 | 2,448 | −8.260 | 3-5 | 100,000 | 6.4 | −180 | +6 | A |
| 4-7 | 41-4 | n = 5 | 1,665 | −8.028 | 4-2 | 130,000 | 5.0 | −155 | +13 | A |
| 4-8 | 41-9 | n = 5 | 1,745 | −8.081 | 4-2 | 130,000 | 5.1 | −165 | +10 | A |
| 4-9 | 43-3 | n = 5, m = 5 | 2,890 | −8.085 | 4-2 | 130,000 | 5.0 | −165 | +10 | A |
| 4-10 | 43-8 | n = 2, m = 8 | 2,642 | −8.068 | 4-2 | 130,000 | 4.9 | −160 | +9 | A |
| 4-11 | 41-4 | n = 5 | 1,665 | −8.028 | (4-2)/(4-9) = 7/3 | 130,000 | 4.8 | −160 | +12 | A |
| 4-12 | 41-9 | n = 5 | 1,745 | −8.081 | (4-2)/(4-9) = 7/3 | 130,000 | 4.7 | −170 | +10 | A |
| 4-13 | 43-3 | n = 5, m = 5 | 2,890 | −8.085 | (4-2)/(4-9) = 7/3 | 130,000 | 4.8 | −170 | +10 | A |
| 4-14 | 43-8 | n = 2, m = 8 | 2,642 | −8.068 | (4-2)/(4-9) = 7/3 | 130,000 | 4.7 | −165 | +9 | A |

TABLE 6

Evaluation and Results

| Example | High-molecular weight charge-transporting material | | | | Binder resin | | Depth of wear ($\mu$m) | Light-area potential (eV) | Light-area potential Variation (eV) | Cracking |
|---|---|---|---|---|---|---|---|---|---|---|
| | Structure | Number of structural units | Molecular weight (Mw) | $E_{HOMO}$ (eV) | Structure | Molecular weight Mw | | | | |
| 5-1 | 51-3 | n = 6 | 2,028 | −8.274 | 3-5 | 100,000 | 6.5 | −180 | +3 | A |
| 5-2 | 51-8 | n = 6 | 2,106 | −8.295 | 3-5 | 100,000 | 6.4 | −180 | +2 | A |
| 5-3 | 57-26 | n = 5, m = 5 | 3,040 | −8.279 | 3-5 | 100,000 | 6.4 | −180 | +5 | A |
| 5-4 | 51-3 | n = 6 | 2,028 | −8.274 | 4-2 | 130,000 | 5.1 | −190 | +3 | A |
| 5-5 | 51-8 | n = 6 | 2,106 | −8.295 | 4-2 | 130,000 | 5.0 | −190 | +2 | A |
| 5-6 | 57-26 | n = 5, m = 5 | 3,040 | −8.279 | 4-2 | 130,000 | 5.0 | −190 | +4 | A |
| 5-7 | 51-3 | n = 6 | 2,028 | −8.274 | (4-2)/(4-9) = 7/3 | 130,000 | 4.8 | −195 | +3 | A |
| 5-8 | 51-8 | n = 6 | 2,106 | −8.295 | (4-2)/(4-9) = 7/3 | 130,000 | 4.7 | −195 | +2 | A |
| 5-9 | 57-26 | n = 5, m = 5 | 3,040 | −8.279 | (4-2)/(4-9) = 7/3 | 130,000 | 4.7 | −195 | +4 | A |

TABLE 7

Evaluation and Results

| Comparative Example | High-molecular weight charge-transporting material | | | | Binder resin | | Depth of wear ($\mu$m) | Light-area potential (eV) | Light-area potential Variation (eV) | Cracking |
|---|---|---|---|---|---|---|---|---|---|---|
| | Structure | Number of structural units | Molecular weight (Mw) | $E_{HOMO}$ (eV) | Structure | Molecular weight Mw | | | | |
| 0-1 | 7 | n = 2 | 486 | −8.208 | 3-5 | 100,000 | 8.2 | −180 | +10 | C |
| 0-2 | 7 | n = 8 | 1,944 | −7.946 | 3-5 | 100,000 | 7.5 | −130 | +75 | A |

TABLE 8

Evaluation and Results

| Comparative Example | High-molecular weight charge-transporting material | | | | Binder resin | | Depth of wear ($\mu$m) | Light-area potential (eV) | Light-area potential Variation (eV) | Cracking |
|---|---|---|---|---|---|---|---|---|---|---|
| | Structure | Number of structural units | Molecular weight (Mw) | $E_{HOMO}$ (eV) | Structure | Molecular weight Mw | | | | |
| 1-1 | 11-1 | n = 2 | 522 | −8.379 | 3-5 | 100,000 | 8.2 | −250 | +2 | C |
| 1-2 | 13-2 | n = 8, m = 2 | 2,556 | −8.560 | 3-5 | 100,000 | 6.4 | −280 | +2 | A |
| 1-3 | 13-1 | n = 1, m = 19 | 4,878 | −7.922 | 3-5 | 100,000 | 6.3 | −130 | +78 | A |
| 1-4 | 11-1 | n = 2 | 522 | −8.379 | 4-2 | 130,000 | 6.6 | −270 | +2 | C |
| 1-5 | 11-2 | n = 2 | 522 | −8.379 | (4-2)/(4-9) = 7/3 | 130,000 | 6.3 | −280 | +2 | C |

TABLE 9

Evaluation and Results

| Comparative Example | High-molecular weight charge-transporting material | | | | Binder resin | | Depth of wear ($\mu$m) | Light-area potential (eV) | Light-area potential Variation (eV) | Cracking |
|---|---|---|---|---|---|---|---|---|---|---|
| | Structure | Number of structural units | Molecular weight (Mw) | $E_{HOMO}$ (eV) | Structure | Molecular weight Mw | | | | |
| 2-1 | 21-4 | n = 2 | 570 | −8.284 | 3-5 | 100,000 | 8.3 | −180 | +7 | C |
| 2-2 | 21-3 | n = 2 | 666 | −8.314 | 3-5 | 100,000 | 8.4 | −230 | +5 | C |
| 2-3 | 21-30 | n = 2 | 602 | −8.253 | 3-5 | 100,000 | 8.3 | −180 | +7 | C |
| 2-4 | 24-1 | n = 1, m = 9 | 2,472 | −7.941 | 3-5 | 100,000 | 6.5 | −130 | +37 | A |
| 2-5 | 24-11 | n = 1, m = 19 | 4,892 | −7.990 | 3-5 | 100,000 | 6.4 | −135 | +36 | A |
| 2-6 | 21-3 | n = 2 | 666 | −8.314 | 4-2 | 130,000 | 6.6 | −250 | +4 | C |

TABLE 9-continued

Evaluation and Results

| Comparative Example | High-molecular weight charge-transporting material | | | | Binder resin | | Depth of wear (μm) | Light-area potential (eV) | Light-area potential Variation (eV) | Cracking |
| --- | --- | --- | --- | --- | --- | --- | --- | --- | --- | --- |
| | Structure | Number of structural units | Molecular weight (Mw) | $E_{HOMO}$ (eV) | Structure | Molecular weight Mw | | | | |
| 2-7 | 21-3 | n = 2 | 666 | −8.314 | (4-2)/(4-9) = 7/3 | 130,000 | 6.4 | −260 | +4 | C |

TABLE 10

Evaluation and Results

| Comparative Example | High-molecular weight charge-transporting material | | | | Binder resin | | Depth of wear (μm) | Light-area potential (eV) | Light-area potential Variation (eV) | Cracking |
| --- | --- | --- | --- | --- | --- | --- | --- | --- | --- | --- |
| | Structure | Number of structural units | Molecular weight (Mw) | $E_{HOMO}$ (eV) | Structure | Molecular weight Mw | | | | |
| 3-1 | 31-1 | n = 2 | 490 | −9.394 | 3-5 | 100,000 | 8.3 | −430 | +2 | C |
| 3-2 | 33-8 | n = 8, m = 2 | 2,446 | −8.391 | 3-5 | 100,000 | 6.3 | −260 | +2 | A |
| 3-3 | 31-1 | n = 2 | 490 | −9.394 | 4-2 | 130,000 | 6.6 | −450 | +2 | C |
| 3-4 | 31-1 | n = 2 | 490 | −9.394 | (4-2)/(4-9) = 7/3 | 130,000 | 6.4 | −470 | +2 | C |

TABLE 11

Evaluation and Results

| Comparative Example | High-molecular weight charge-transporting material | | | | Binder resin | | Depth of wear (μm) | Light-area potential (eV) | Light-area potential Variation (eV) | Cracking |
| --- | --- | --- | --- | --- | --- | --- | --- | --- | --- | --- |
| | Structure | Number of structural units | Molecular weight (Mw) | $E_{HOMO}$ (eV) | Structure | Molecular weight Mw | | | | |
| 4-1 | 41-4 | n = 2 | 666 | −8.168 | 3-5 | 100,000 | 8.3 | −160 | +8 | C |
| 4-2 | 41-4 | n = 10 | 3,330 | −7.908 | 3-5 | 100,000 | 6.4 | −130 | +55 | A |
| 4-3 | 41-4 | n = 2 | 666 | −8.168 | 4-2 | 130,000 | 6.6 | −170 | +8 | C |
| 4-4 | 41-4 | n = 2 | 666 | −8.168 | (4-2)/(4-9) = 7/3 | 130,000 | 6.4 | −175 | +7 | C |

TABLE 12

Evaluation and Results

| Comparative Example | High-molecular weight charge-transporting material | | | | Binder resin | | Depth of wear (μm) | Light-area potential (eV) | Light-area potential Variation (eV) | Cracking |
| --- | --- | --- | --- | --- | --- | --- | --- | --- | --- | --- |
| | Structure | Number of structural units | Molecular weight (Mw) | $E_{HOMO}$ (eV) | Structure | Molecular weight Mw | | | | |
| 5-1 | 51-3 | n = 2 | 676 | −8.596 | 3-5 | 100,000 | 7.8 | −270 | +55 | C |
| 5-2 | 51-3 | n = 2 | 676 | −8.596 | 4-2 | 130,000 | 6.6 | −290 | +53 | C |
| 5-3 | 51-3 | n = 2 | 676 | −8.596 | (4-2)/(4-9) = 7/3 | 130,000 | 6.4 | −300 | +50 | C |

As can be seen from the foregoing, the electrophotographic photosensitive members of Comparative Examples, compared with those of Examples, cause chemical deterioration to have caused a great variation of light-area potential.

As can also be seen from the foregoing, the electrophotographic photosensitive members of Examples, compared with those of Comparative Examples, have superior running performance in repeated use (mechanical strength and resistance to wear).

In comparison of cases in which the same binder resin is used in the charge transport layer, the electrophotographic photosensitive members of Examples, compared with those of Comparative Examples, are seen to have been improved in the resistance to wear in all cases.

The use of the high-molecular weight charge-transporting material according to the present invention also shows the results that the solvent cracking can be kept from occurring.

Thus, when the high-molecular weight charge-transporting material having the specific repeating structural unit and also having the specific energy level of highest occupied molecular orbital ($E_{HOMO}$) is used as the charge-transporting material, the electrophotographic photosensitive member can be provided which has high mechanical strength and also can not easily cause chemical deterioration even in repeated use and has stable electrophotographic performance.

What is claimed is:

1. An electrophotographic photosensitive member comprising a support and provided thereon a photosensitive layer, wherein;

said photosensitive layer contains a high-molecular weight charge-transporting material having a repeating structural unit represented by the following formula (22): and the high-molecular weight charge-transporting material has:

a weight-average molecular weight Mw of 1,500 or more; and an energy level of highest occupied molecular orbital, $E_{HOMO}$, of from −8.3 eV or more to −8.0 eV or less as found by semiempirical molecular-orbital calculation:

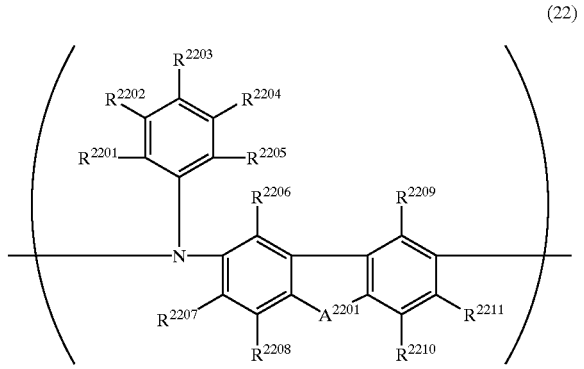

(22)

wherein $R^{2201}$ to $R^{2211}$ each independently represent a hydrogen atom, a substituted or unsubstituted alkyl group, a substituted or unsubstituted aryl group, a substituted or unsubstituted alkoxyl group or an electron-attracting group; and $A^{2201}$ represents a Group 14 element having a hydrogen atom, a substituted or unsubstituted alkyl group, a substituted or unsubstituted aryl group, a substituted or unsubstituted alkoxyl group or an electron-attracting group, or a Group 16 element.

2. An electrophotographic photosensitive member comprising a support and provided thereon a photosensitive layer, wherein;

said photosensitive layer contains a high-molecular weight charge-transporting material having a repeating structural unit represented by the following formula (31): and the high-molecular weight charge-transporting material has:

a weight-average molecular weight Mw of 1,500 or more; and an energy level of highest occupied molecular orbital, $E_{HOMO}$, of from −8.3 eV or more to −8.0 eV or less as found by semiempirical molecular-orbital calculation:

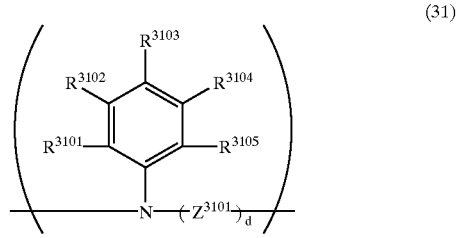

(31)

wherein $R^{3101}$ to $R^{3105}$ each independently represent a hydrogen atom, a substituted or unsubstituted alkyl group, a substituted or unsubstituted aryl group, a substituted or unsubstituted alkoxyl group or an electron-attracting group; and $Z^{3101}$ represents a substituted or unsubstituted divalent heterocyclic ring group; and letter symbol d represents an integer of 1 or more, provided that, when d is two or more, the two or more $Z^{3101}$'s may be the same or different.

3. An electrophotographic photosensitive member comprising a support and provided thereon a photosensitive layer, wherein;

said photosensitive layer contains a high-molecular weight charge-transporting material having a repeating structural unit represented by the following formula (41): and the high-molecular weight charge-transporting material has:

a weight-average molecular weight Mw of 1,500 or more; and an energy level of highest occupied molecular orbital, $E_{HOMO}$, of from −8.3 eV or more to −8.0 eV or less as found by semiempirical molecular-orbital calculation:

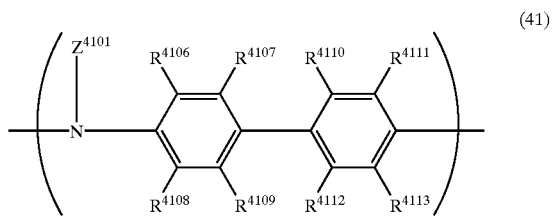

(41)

wherein $Z^{4101}$ represents a substituted or unsubstituted monovalent heterocyclic ring group; and $R^{4106}$ to $R^{4113}$ each independently represent a hydrogen atom, a substituted or unsubstituted alkyl group, a substituted or unsubstituted aryl group, a substituted or unsubstituted alkoxyl group or an electron-attracting group.

4. An electrophotographic photosensitive member comprising a support and provided thereon a photosensitive layer, wherein;

said photosensitive layer contains a high-molecular weight charge-transporting material having a repeating structural unit represented by the following formula (51): and the high-molecular weight charge-transporting material has:

a weight-average molecular weight Mw of 1,500 or more; and an energy level of highest occupied molecular orbital, $E_{HOMO}$, of from −8.3 eV or more to −8.0 eV or less as found by semiempirical molecular-orbital calculation:

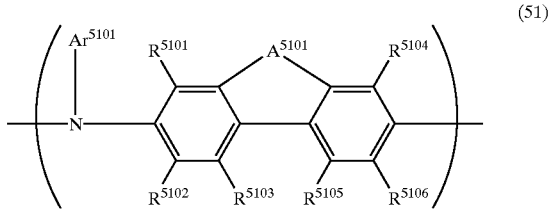
(51)

wherein $Ar^{5101}$ represents an aromatic ring group substituted with at least one electron-attracting group, or a substituted or unsubstituted heterocyclic ring group; $R^{5101}$ to $R^{5106}$ each independently represent a hydrogen atom, a substituted or unsubstituted alkyl group, a substituted or unsubstituted aryl group, a substituted or unsubstituted alkoxyl group or an electron-attracting group; $R^{5103}$ and $R^{5105}$ may combine through a chemical species having at least one atom, to form a ring structure; and $A^{5101}$ represents a Group 14 element having a hydrogen atom, a substituted or unsubstituted alkyl group, a substituted or unsubstituted aryl group, a substituted or unsubstituted alkoxyl group or an electron-attracting group, or a Group 15 element having a hydrogen atom, a substituted or unsubstituted alkyl group, a substituted or unsubstituted aryl group or an electron-attracting group, or a Group 16 element.

5. The electrophotographic photosensitive member according to claim 4, wherein said high-molecular weight charge-transporting material has a repeating structural unit represented by the following formula (52):

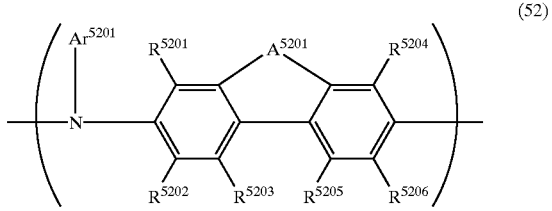
(52)

wherein $Ar^{5201}$ represents a substituted or unsubstituted monovalent aromatic ring or a substituted or unsubstituted monovalent heterocyclic ring group; $R^{5201}$ to $R^{5206}$ each independently represent a hydrogen atom, a substituted or unsubstituted alkyl group, a substituted or unsubstituted aryl group, a substituted or unsubstituted alkoxyl group or an electron-attracting group: $R^{5203}$ and $R^{5205}$ may combine through a chemical species having at least one atom, to form a ring structure; and $A^{5201}$ represents a Group 14 element having a hydrogen atom, a substituted or unsubstituted alkyl group, a substituted or unsubstituted aryl group, a substituted or unsubstituted alkoxyl group or an electron-attracting group, or a Group 15 element having a hydrogen atom, a substituted or unsubstituted alkyl group, a substituted or unsubstituted aryl group or an electron-attracting group, or a Group 16 element; provided that a case or cases in which the units represented by the formulas (51) and (52) have the same structure is/are excluded.

6. A process cartridge comprising an electrophotographic photosensitive member and a means selected from the group consisting of a charging means, a developing means and a cleaning means which are integrally supported, and being detachably mountable to the body of an electrophotographic apparatus;

said electrophotographic photosensitive member comprising a support and provided thereon a photosensitive layer, wherein;

said photosensitive layer contains a high-molecular weight charge-transporting material having a repeating structural unit represented by the following formula (22); and the high-molecular weight charge-transporting material has:

a weight-average molecular weight Mw of 1,500 or more; and an energy level of highest occupied molecular orbital, $E_{HOMO}$, of from $-8.3$ eV or more to $-8.0$ eV or less as found by semiempirical molecular-orbital calculation:

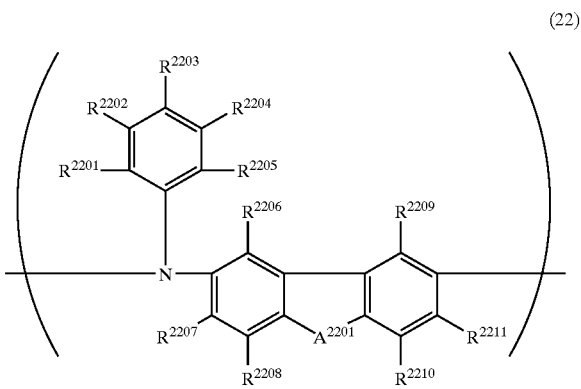
(22)

wherein $R^{2201}$ to $R^{2211}$ each independently represent a hydrogen atom, a substituted or unsubstituted alkyl group, a substituted or unsubstituted aryl group, a substituted or unsubstituted alkoxyl group or an electron-attracting group; and $A^{2201}$ represents a Group 14 element having a hydrogen atom, a substituted or unsubstituted alkyl group, a substituted or unsubstituted aryl group, a, substituted or unsubstituted alkoxyl group or an electron-attracting group, or a Group 16 element.

7. An electrophotographic apparatus comprising an electrophotographic photosensitive member, a charging means, an exposure means, a developing means and a transfer means;

said electrophotographic photosensitive member comprising a support and provided thereon a photosensitive layer, wherein;

said photosensitive layer contains a high-molecular weight charge-transporting material having a repeating structural unit represented by the following formula (22); and the high-molecular weight charge-transporting material has:

a weight-average molecular weight Mw of 1,500 or more; and an energy level of highest occupied molecular orbital, $E_{HOMO}$, of from $-8.3$ eV or more to $-8.0$ eV or less as found by semiempirical molecular-orbital calculation:

(22)

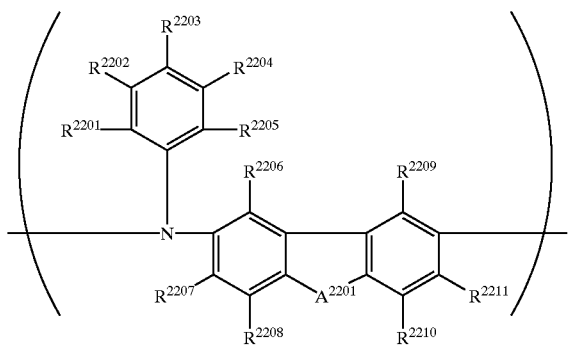

wherein $R^{2201}$ to $R^{2211}$ each independently represent a hydrogen atom, a substituted or unsubstituted alkyl group, a substituted or unsubstituted aryl group, a substituted or unsubstituted alkoxyl group or an electron-attracting group; and $A^{2201}$ represents a Group 14 element having a hydrogen atom, a substituted or unsubstituted alkyl group, a substituted or unsubstituted aryl group, a, substituted or unsubstituted alkoxyl group or an electron-attracting group, or a Group 16 element.

8. A process cartridge comprising an electrophotographic photosensitive member and a means selected from the group consisting of a charging means, a developing means and a cleaning means which are integrally supported, and being detachably mountable to the body of an electrophotographic apparatus;

said electrophotographic photosensitive member comprising a support and provided thereon a photosensitive layer, wherein;

said photosensitive layer contains a high-molecular weight charge-transporting material having a repeating structural unit represented by the following formula (31); and the high-molecular, weight charge-transporting material has:

a weight-average molecular weight Mw of 1,500 or more; and an energy level of highest occupied molecular orbital, $E_{HOMO}$, of from −8.3 eV or more to −8.0 eV or less as found by semiempirical molecular-orbital calculation:

(31)

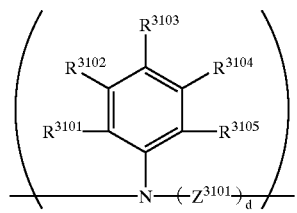

wherein $R^{3101}$ to $R^{3105}$ each independently represent a hydrogen atom, a substituted or unsubstituted alkyl group, a substituted or unsubstituted aryl group, a substituted or unsubstituted alkoxyl group or an electron-attracting group; and $Z^{3101}$ represents a substituted or unsubstituted divalent heterocyclic ring group; and letter symbol d represents an integer of 1 or more, provided that, when d is two or more, the two or more $Z^{3101}$'s may be the same or different.

9. A process cartridge comprising an electrophotographic photosensitive member and a means selected from the group consisting of a charging means, a developing means and a cleaning means which are integrally supported, and being detachably mountable to the body of an electrophotographic apparatus;

said electrophotographic photosensitive member comprising a support and provided thereon a photosensitive layer, wherein;

said photosensitive layer contains a high-molecular weight charge-transporting material having a repeating structural unit represented by the following formula (41); and the high-molecular weight charge-transporting material has:

a weight-average molecular weight Mw of 1,500 or more; and an energy level of highest occupied molecular orbital, $E_{HOMO}$, of from −8.3 eV or more to −8.0 eV or less as found by semiempirical molecular-orbital calculation:

(41)

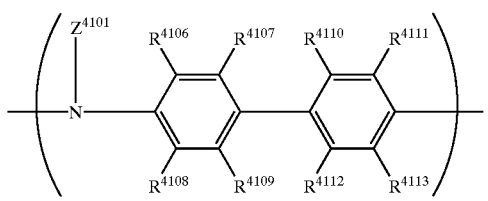

wherein $Z^{4101}$ represents a substituted or unsubstituted monovalent heterocyclic ring group; and $R^{4106}$ to $R^{4113}$ each independently represent a hydrogen atom, a substituted or unsubstituted alkyl group, substituted or unsubstituted aryl group, a substituted or unsubstituted alkoxyl group or an electron-attracting group.

10. A process cartridge comprising an electrophotographic photosensitive member and a means selected from the group consisting of a charging means, a developing means and a cleaning means which are integrally supported, and being detachably mountable to the body of an electrophotographic apparatus;

said electrophotographic photosensitive member comprising a support and provided thereon a photosensitive layer, wherein;

said photosensitive layer contains a high-molecular weight charge-transporting material having a repeating structural unit represented by the following formula (51); and the high-molecular weight charge-transporting material has:

a weight-average molecular weight Mw of 1,500 or more; and an energy level of highest occupied molecular orbital, $E_{HOMO}$, of from −8.3 eV or more to −8.0 eV or less as found by semiempirical molecular-orbital calculation:

(51)

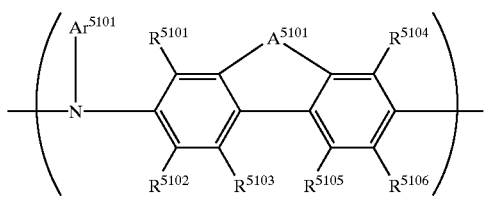

wherein $Ar^{5101}$ represents an aromatic ring group substituted with at least one electron-attracting group, or a substituted or unsubstituted heterocyclic ring group; $R^{5101}$ to $R^{5106}$ each independently represent a hydrogen atom, a substituted or unsubstituted alkyl group, a substituted or unsubstituted aryl group, a substituted or unsubstituted alkoxyl group or an electron-attracting group; $R^{5103}$ and $R^{5105}$ may combine through a chemical species having at least one atom, to form a ring structure; and $A^{5101}$ represents a Group 14 element having a hydrogen atom, a substituted or unsubstituted alkyl group, a substituted or unsubstituted aryl group, a substituted or unsubstituted alkoxyl group or an electron-attracting group, or a Group 15 element having a hydrogen atom, a substituted or unsubstituted alkyl group a substituted or unsubstituted aryl group or an electron-attracting group, or a Group 16 element.

11. An electrophotographic apparatus comprising an electrophotographic photosensitive member, a charging means, an exposure means, a developing means and a transfer means;

said electrophotographic photosensitive member comprising a support and provided thereon a photosensitive layer, wherein;

said photosensitive layer contains a high-molecular weight charge-transporting material having a repeating structural unit represented by the following formula (31); and the high-molecular weight charge-transporting material has:

a weight-average molecular weight Mw of 1,500 or more; and an energy level of highest occupied molecular orbital, $E_{HOMO}$, of from −8.3 eV or more to −8.0 eV or less as found by semiempirical molecular-orbital calculation:

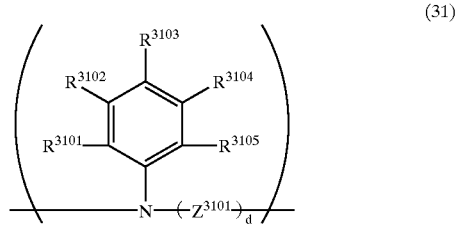

(31)

wherein $R^{3101}$ to $R^{3105}$ each independently represent a hydrogen atom, a substituted or unsubstituted alkyl group, a substituted or unsubstituted aryl group, a substituted, or unsubstituted alkoxyl group or an electron-attracting group; and $Z^{3101}$ represents a substituted or unsubstituted divalent heterocyclic ring group; and letter symbol d represents an integer of 1 or more, provided that, when d is two or more, the two or more $Z^{3101}$'s may be the same or different.

12. An electrophotographic apparatus comprising an electrophotographic photosensitive member, a charging means, an exposure means, a developing means and a transfer means;

said electrophotographic photosensitive member comprising a support and provided thereon a photosensitive layer, wherein;

said photosensitive layer contains a high-molecular weight charge-transporting material having a repeating structural unit represented by the following formula (41); and the high-molecular weight charge-transporting material has:

a weight-average molecular weight Mw of 1,500 or more; and an energy level of the highest occupied molecular orbital, $E_{HOMO}$, of from −8.3 eV or more to −8.0 eV or less as found by semiempirical molecular-orbital calculation:

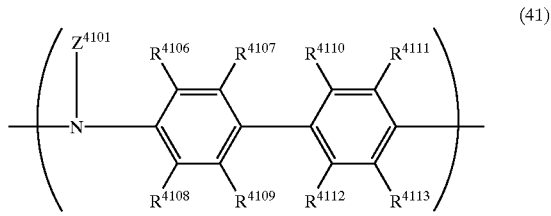

(41)

wherein $Z^{4101}$ represents a substituted or unsubstituted monovalent heterocyclic ring group; and $R^{4106}$ to $R^{4113}$ each independently represent a hydrogen atom, a substituted or unsubstituted alkyl group, a substituted or unsubstituted aryl group, a substituted or unsubstituted alkoxyl group or an electron-attracting group.

13. An electrophotographic apparatus comprising an electrophotographic photosensitive member, a charging means, an exposure means, a developing means and a transfer means;

said electrophotographic photosensitive member comprising a support and provided thereon a photosensitive layer, wherein;

said photosensitive layer contains a high-molecular weight charge-transporting material having a repeating structural unit represented by the following formula (51); and the high-molecular weight charge-transporting material has:

a weight-average molecular weight Mw of 1,500 or more; and an energy level of highest occupied molecular orbital, $E_{HOMO}$, of from −8.3 eV or more to −8.0 eV or less as found by semiempirical molecular-orbital calculation:

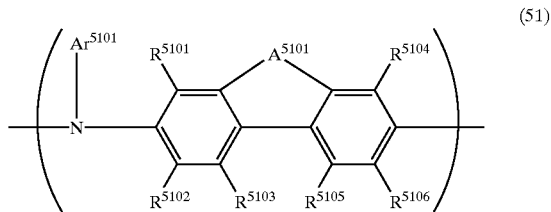

(51)

wherein $Ar^{5101}$ represents an aromatic ring group substituted with at least one electron-attracting group, or a substituted or unsubstituted heterocyclic ring group; $R^{5101}$ to $R^{5106}$ each independently represent a hydrogen atom, a substituted or unsubstituted alkyl group, a substituted or unsubstituted aryl group, a substituted or unsubstituted alkoxyl group or an electron-attracting group; $R^{5103}$ and $R^{5105}$ may combine through a chemical species having at least one atom, to form a ring structure; and $A^{5101}$ represents a Group 14 element having a hydrogen atoms, a substituted or unsubstituted alkyl group, a substituted or unsubstituted aryl group, a substituted or unsubstituted alkoxyl group or an electron-attracting group, or a Group 15 element having a hydrogen atom, a substituted or unsubstituted alkyl group a substituted or unsubstituted aryl group or an electron-attracting group, or a Group 16 element.

* * * * *